(12) United States Patent
Kudrolli et al.

(10) Patent No.: US 6,279,018 B1
(45) Date of Patent: Aug. 21, 2001

(54) ABBREVIATING AND COMPACTING TEXT TO COPE WITH DISPLAY SPACE CONSTRAINT IN COMPUTER SOFTWARE

(75) Inventors: Abdus Samad Kudrolli; Parvez Kudrolli; Feroz Kudrolli, all of Mumbai (IN)

(73) Assignee: Kudrollis Software Inventions PVT. Ltd., Mumbai (IN)

( * ) Notice: Subject to any disclaimer, the term of this patent is extended or adjusted under 35 U.S.C. 154(b) by 0 days.

(21) Appl. No.: 09/256,286

(22) Filed: Feb. 23, 1999

(30) Foreign Application Priority Data

Dec. 21, 1998 (IN) .......................... 827/BOM/1998

(51) Int. Cl.⁷ .............................. G06F 17/22; G06F 17/27
(52) U.S. Cl. ................................. 707/540; 704/1; 704/9
(58) Field of Search ........................ 707/534, 104, 707/4, 6, 540; 704/9, 1; 345/357; 711/1

(56) References Cited

U.S. PATENT DOCUMENTS

| | | | |
|---|---|---|---|
| 4,486,857 | 12/1984 | Heckel | 707/508 |
| 4,760,528 | 7/1988 | Levin | 707/534 |
| 4,969,097 | 11/1990 | Levin | 707/534 |
| 5,111,398 * | 5/1992 | Nunberg et al. | 704/9 |
| 5,231,579 | 7/1993 | Tsuchiya et al. | 707/508 |
| 5,303,150 * | 4/1994 | Kameda | 704/9 |
| 5,305,205 | 4/1994 | Weber et al. | 707/531 |
| 5,450,538 | 9/1995 | Glaser et al. | 707/508 |
| 5,623,406 | 4/1997 | Ichbiah | 704/3 |
| 5,640,587 * | 6/1997 | Davis et al. | 345/438 |
| 5,691,708 | 11/1997 | Batchelder et al. | 340/825.44 |
| 5,704,060 * | 12/1997 | Del Monte | 707/104 |
| 5,805,832 * | 9/1998 | Brown et al. | 711/1 |
| 5,848,385 * | 12/1998 | Poznanski et al. | 707/4 |
| 5,864,848 * | 1/1999 | Horvitz et al. | 707/6 |
| 5,867,164 * | 2/1999 | Bornstein et al. | 345/357 |
| 6,009,382 * | 12/1999 | Martino et al. | 704/1 |

OTHER PUBLICATIONS

Abbreviated Typing For Word Processing, IBM Technical Disclosure Bulletin, vol. 21, Issue 9, pp. 3796–3797, Feb. 1979.*

Anquetil, Nicolas et al., Extracting concepts from file names:a new file clustering criterion, ACM Proceedings of the 1998 international conference on Software engineering, pp. 84–93, Apr. 1998.*

Automatic Determination of the True Case of a Word, IBM Technical Disclosure Bulletin, vol. 37, Issue 2B, pp. 711–712, Feb. 1994.*

McKeown, Kathleen et al., Generating summaries of multiple news articles, Proceedings of the 18th annual international ACM SIGIR conference on Research and development in informational retrieval. pp. 74–82, Jul. 1995.*

* cited by examiner

*Primary Examiner*—Stephen S. Hong
*Assistant Examiner*—William L. Bashore
(74) *Attorney, Agent, or Firm*—Jay P. Kesan

(57) ABSTRACT

This invention relates to text abbreviation methods to cope with display or print space constraint in computer software. In particular, abbreviation of text into predetermined field widths (with single or multiple rows), utilizing an operating system (121), an application program (122), and an abbreviation control data program (123), along with combinations of prioritized shortening methods in preference to or in addition to glossaries of acronyms and word abbreviations using an abbreviation function (127) are disclosed. The special handling of segments of input contained within pairs of pre-defined characters, as well as omission of spaces, and conversion of enumeration word or word sequences to numbers utilizing an abbreviation data file (124), a parameters sets file (125), and a parameters list (126), are also disclosed. The omission of spaces and phonetically less significant characters compacts word sequences, which saves display space and enables use of larger type sizes.

51 Claims, 16 Drawing Sheets

String Output:                                    PrmSet=sa1, AbrDtaFN=abdata2

| ACc | Abs | Pri | Pro | AbB | TWd | CAc | CAb | EWN | ESq | ISq | RCd | LAd | NAc | NAb | Trn | Fnl |
|-----|-----|-----|-----|-----|-----|-----|-----|-----|-----|-----|-----|-----|-----|-----|-----|-----|
| Y   | T   | Y   | Y   | Y   | Y   | Y   | Y   | Y   | Y   | Y   | Y   | Y   | Y   | Y   | P   | Y   |

| PndStrng | LAdStrng | NDSStrng | MnWdL | MnTrL | MxPNWds | PNFWdL | OtptL | StrRws |
|----------|----------|----------|-------|-------|---------|--------|-------|--------|
| , ;      | aeiour   | #$%+-@/  | 03    | 02    | 03      | 08     |       | 01     |

```
00  The Federal Reserve will be releasing the figures by 6:30 this
    evening
13g The Federal Reserve Will Be Releasing The Figures By 6:30 This
    Evening
29a The Fed Will Be Releasing The Figures By 6:30 This Evening
18  The Fed Will Be ReleasG The Figures By 6:30 This EvenG
20  The Fed WiL Be ReleasG The Figures By 6:30 This EvenG
21  The Fed WiL Be RlsG The Fgs By 6:30 Ths EvnG
22  The Fed Wil Be Rlsg The Fgs By 6:30 Ths Evng
 9a TheFedWilBeRlsgTheFgsBy6:30ThsEvng                    Rdctn%=51
```

FIG. 11

String Output:                                    PrmSet=sa1, AbrDtaFN=abdata2

| ACc | Abs | Pri | Pro | AbB | TWd | CAc | CAb | EWN | ESq | ISq | RCd | LAd | NAc | NAb | Trn | Fnl |
|-----|-----|-----|-----|-----|-----|-----|-----|-----|-----|-----|-----|-----|-----|-----|-----|-----|
| X   | D   | Y   | Y   | Y   | Y   | Y   | Y   | Y   | Y   | Y   | Y   | Y   | Y   | Y   | P   | Y   |

| PndStrng | LAdStrng | NDSStrng | MnWdL | MnTrL | MxPNWds | PNFWdL | OtptL | StrRws |
|----------|----------|----------|-------|-------|---------|--------|-------|--------|
| , ;      | aeiour   | #$%+-@/  | 03    | 02    | 03      | 08     | 30    | 01     |

```
00  The document may be executed by the corporation any day now
13g The Document May Be Executed By The Corporation Any Day Now
29b The Document May Be Executed By The Corp Any Day Now
29d The Doc:Document May Be Executed By The Corp Any Day Now
29c The Doc:Document May Be Executed By The Corp ADN:Any Day Now
18  The Doc:DocuMT May Be Executed By The Corp ADN:Any Day Now
21  The Doc:DcMT May Be Exctd By The Corp ADN:Any Day Now
22  The Doc:Dcmt May Be Exctd By The Corp ADN:Any Day Now
23  The Dcmt May Be Exctd By The Corp ADN
 9a TheDcmtMayBeExctdByTheCorpADN                         Rdctn%=51
```

FIG. 12

String Output: PrmSet=sa1, AbrDtaFN=abdata2

| ACc | Abs | Pri | Pro | AbB | TWd | CAc | CAb | EWN | ESq | ISq | RCd | LAd | NAc | NAb | Trn | Fnl |
|---|---|---|---|---|---|---|---|---|---|---|---|---|---|---|---|---|
|  | Y | T | Y | Y | Y | Y | Y | Y | Y | Y | Y | Y | Y | Y | P | Y |
| PndStrng | LAdStrng | | NDSStrng | | MnWdL | MnTrL | | MxPNWds | | PNFWdL | | OtptL | | StrRws | | |
| , ; | aeiour | | #$%+-@/ | | 02 | 02 | | 03 | | 08 | | 10 | | 01 | | |

```
00  Property, plant and equipment net of depreciation {Net Fixed
    Assets}
 6b Property, plant and equipment net of depreciation
 7  Property plant and equipment net of depreciation
13g Property Plant And Equipment Net Of Depreciation
15b Property Plant & Equipment Net Of Depreciation
18  Property Plant & EquipMT Net Of Depreciation
21  Ppty Plnt & EqpMT Nt Of Dpctn
22  Ppty Plnt & Eqpmt Nt Of Dpctn
24  Property, plant and equipment net of depreciation {Net Fixed
    Assets}
 6b Net Fixed Assets
20  Net Fixed ASets
21  Net Fxd ASts
22  Net Fxd Asts
 9a NetFxdAsts                                           Rdctn%=85
```

FIG. 13

String Output: PrmSet=sa1, AbrDtaFN=abdata2

| ACc | Abs | Pri | Pro | AbB | TWd | CAc | CAb | EWN | ESq | ISq | RCd | LAd | NAc | NAb | Trn | Fnl |
|---|---|---|---|---|---|---|---|---|---|---|---|---|---|---|---|---|
|  | X | T | Y | Y | Y | Y | Y | Y | Y | Y | Y | Y | Y | Y | P | Y |
| PndStrng | LAdStrng | | NDSStrng | | MnWdL | MnTrL | | MxPNWds | | PNFWdL | | OtptL | | StrRws | | |
| , ; | aeiour | | #$%+-@/ | | 04 | 02 | | 03 | | 08 | | | | 01 | | |

```
00  [Rupiah] fourteen hundred billion.three crore twenty thousand
    and hundred seventeen due
13g Rupiah Fourteen Hundred Billion Three Crore Twenty Thousand And
    Hundred Seventeen Due
15b Rupiah Fourteen Hundred Billion Three Crore Twenty Thousand &
    Hundred Seventeen Due
16a Rupiah 14 00 Bn 3 Cr 20 Th & 00 17 Due
16b Rupiah 14 00 ; 3 ;00; 20 , & 00 17 Due
16c 1400;3;00;20,0017
16g 1400;3;00;20,10017
16j 1400;3;00;20,117
16n 1400;03;00;20,117
16t 1400,03,00,20,117
16w Rupiah 1400,03,00,20,117 Due
 9a Rupiah1400,03,00,20,117Due                            Rdctn%=70
```

FIG. 14

String Output: PrmSet=sa1, AbrDtaFN=abdata2

| ACc | Abs | Pri | Pro | AbB | TWd | CAc | CAb | EWN | ESq | ISq | RCd | LAd | NAc | NAb | Trn | Fnl |
|---|---|---|---|---|---|---|---|---|---|---|---|---|---|---|---|---|
| X | D | Y | Y | Y | Y | Y | Y | Y | Y | Y | Y | Y | Y | Y | P | Y |
| PndStrng | LAdStrng | NDSStrng | MnWdL | MnTrL | MxPNWds | PNFWdL | OtptL | StrRws | | | | | | | | |
| , ; | aeiour | #$%+-@/ | 02 | 02 | 03 | 06 | 12 | 01 | | | | | | | | |

```
00  Dr Carrington, Joel Peter Philip[,Phd]|is ranked third at|
    Symbiotics Inc, (Alabama)
 5d Dr Carrington, Joel Peter Philip[,Phd]
 7  Dr Carrington Joel Peter Philip[,Phd]
 8b Carrington Joel Peter Philip[,Phd]
13g Carrington Joel Peter Philip ,Phd
14a Carrin J P ,Phd
 9a CarrinJP,Phd
 5d is ranked third at
13g Is Ranked Third At
16a Is Ranked 3rd At
21  Is Rankd 3rd At
 9a IsRankd3rdAt
 9d CarrinJP,Phd|IsRankd3rdAt
 5e Symbiotics Inc, (Alabama)
 6c Symbiotics Inc,
 7  Symbiotics Inc
21  Symbiotcs Inc                          Rdctn%=57   CarrinJP,Phd
 9a SymbiotcsInc                                       IsRankd3rdAt
 9d CarrinJP,Phd|IsRankd3rdAt|SymbiotcsInc             SymbiotcsInc
```

FIG. 15

| String Output: | | | | | | | | | | | | | | PrmSet=sa1, AbrDtaFN=abdata2 | |
|---|---|---|---|---|---|---|---|---|---|---|---|---|---|---|---|
| ACc | Abs | Pri | Pro | AbB | TWd | CAc | CAb | EWN | ESq | ISq | RCd | LAd | NAc | NAb | Trn | Fnl |
|  | Y | T | Y | Y | Y | Y | Y | X | Y | Y | Y | Y | Y | Y | P | Y |
| PndStrng | LAdStrng | NDSStrng | MnWdL | MnTrL | MxPNWds | PNFWdL | OtptL | StrRws |
| , ; | aeiour | #$%+-@/ | 02 | 02 | 03 | 06 | 06 | 04 |

```
00  Cash, cash equivalents and restricted cash
 7  Cash cash equivalents and restricted cash
13g Cash Cash Equivalents And Restricted Cash
15b Cash Cash Equivalents & Restricted Cash
17  Cash Cash| Equivalents|[&] [Restr]|[ctd] Cash
 5d Cash Cash
21  Csh Csh
 9a CshCsh
 5d Equivalents
21  Eqvlnts
26a Eqvlnt
 9d CshCsh|Eqvlnt
 5d [&] [Restr]
13g & Restr
 9a &Restr
 9d CshCsh|Eqvlnt|&Restr
 5e [ctd] Cash
13g ctd Cash                                    Rdctn%=43    CshCsh
21  ctd Csh                                                  Eqvlnt
 9a ctdCsh                                                   &Restr
 9d CshCsh|Eqvlnt|&Restr|ctdCsh                              ctdCsh
```

FIG. 16

Before Abbreviating:

PROGRAM INC.                                             ASSETS AS ON MARCH 31, 1998
------------------------------------------------------------------------
                                                             Millions Of $
                                                             -------------
                                                             1998    1997
                                                             ------  ------
Cash, cash equivalents and restricted cash                    90      40
Investment securities available for sale at fair               -      13
  value
Accounts Receivable                                           206     97
Inventories, at cost                                            5      3
Prepaid expenses and other assets                              15     16
Total Current Assets                                          316    169
Property, Plant and equipment - net                           792    598
TOTAL ASSETS                                                 1108    767

String Output:                             PrmSet=sa1, AbrDtaFN=abdata2

ACc  Abs  Pri  Pro  AbB  TWd  CAc  CAb  EWN  ESq  ISq  RCd  LAd  NAc  NAb  Trn  Fnl
Y    Y    T    Y    Y    Y    Y    Y    X    Y    Y    Y    Y    Y    Y    P    Y
PndStrng  LAdStrng  NDSStrng  MnWdL  MnTrL  MxPNWds  PNFWdL  OtptL  StrRws
,;:       aeiou     #$%+-@/   02     02     03       08      25     01

After Abbreviating (with Parameter set as hereinabove):

PROGRAM INC.                             ASSETS AS ON MARCH 31, 1998
------------------------------------------------------------------------
                         Millions of $              Proportions%
                         -------------              ------------
                         1998    1997    Grwth%     1998    1997
                         ------  ------  ------     -----   -----
CashCshEqvlnts&RstrctdCsh   90     40    125.0       8.1     5.2
InvstmtScrtAvlbFrSlAtFrVl    -     13      -          -      1.7
Accounts Receivable        206     97    112.4      18.6    12.6
Inventories at cost          5      3     66.6       0.5     0.4
PrepaidExpenses&OtherAsts   15     16     -6.3       1.4     2.1
Total Current Assets       316    169     87.0      28.5    22.0
PropertyPlant&Equipmt-Net  792    598     32.4      71.5    78.0
TOTAL ASSETS              1108    767     44.4     100.0   100.0

FIG. 17

```
String Output:                        PrmSet=sa1, AbrDtaFN=abdata2
ACc  Abs  Pri  Pro  AbB  TWd  CAc  CAb  EWN  ESq  ISq  RCd  LAd  NAc  NAb  Trn  Fnl
 Y    T    Y    Y    Y    Y    Y    Y    X    Y    Y    Y    Y    Y    Y    P    Y
PndStrng  LAdStrng  NDSStrng  MnWdL  MnTrL  MxPNWds  PNFWdL  OtptL  StrRws
 ,;:        aeiou   #$%+-@/    02     02      03      08      06     04
```

ASSETS LIST OF TOP 50 CORPORATIONS AS ON MARCH 31, 1998

ASSETS:                                                          Millions of $

| Rk No | NameOf Corpor ation | CshCsh Eqvlnt &Restr ctdCsh | InvsSc rtsAvl FrSlAt FairVl | Accoun tsReci evable | Invent ories AtCost | Prepd Expnss &Other Assets | Total Curent Assets | Prprty Plant& Equipm nt-Net | TOTAL ASSETS |
|---|---|---|---|---|---|---|---|---|---|
| 1 to | Progrm | 90 | - | 206 | 5 | 15 | 316 | 792 | 1108 |
| 50 | Systms | 100 | - | 35 | 1 | 28 | 164 | 111 | 275 |

FIG. 18

Gettysburg Address(part), by Abraham Lincoln in 1863.

"Four score and seven years ago our fathers brought forth on this continent, a new nation, conceived in liberty, and dedicated to the proposition that all men are created equal. Now we are engaged in a great civil war, testing whether that nation, or any nation so conceived and so dedicated, can long endure. We are met on a great battle field of that war. We have come to dedicate a portion of that field, as a final resting place for those who here gave their lives that that nation might live. It is altogether fitting and proper that we should do this."
<div align="right">InputLns=16</div>

Text Output:          PrmSet=ta1, AbrDtaFN=abdata2

| ACc | Pri | Pro | AbB | CAc | CAb | EWN | ESq | ISq | RCd | LAd | NAc | NAb | ISd | LBj |
|---|---|---|---|---|---|---|---|---|---|---|---|---|---|---|
|   |   |   | Y |   |   | Y | Y | Y | Y | Y |   |   | Y |   |
| LAdStrng | MnWdL | InputFN | OutptFN | OtptL | InptL | | | | | | | | | |
| aeiou | 04 | getty | tt2 | 045 | 045 | | | | | | | | | |

GtysbrgAdrs(Part),ByAbrahamLincolnIn1863.

"4Scor&7YearsAgoOurFthrsBrghtFrthOnThis Cntnt,ANewNatn,CncvdInLbrty,&DdctdToThePrpstn ThatAllMenAreCrtdEqual.NowWeAreEnggdInAGreat CivlWar,TstgWhthrThatNatn,OrAnyNatnSoCncvd&So Ddctd,CanLongEndr.WeAreMetOnAGreatBatlFieldOf ThatWar.WeHaveComeToDdctAPrtnOfThatField,AsA FinlRstgPlacForThosWhoHereGaveTheirLivsThat ThatNatnMghtLive.ItIsAltgthrFitg&PrprThatWe ShldDoThis."
<div align="right">RdctnPc=31%, OutptLns=11</div>

<div align="center">FIG. 19</div>

Four score and seven years ago our fathers brought forth on this continent, a new nation, conceived in liberty, and dedicated to the proposition that all men are created equal. Now we are engaged in a great civil war, testing whether that nation, or any nation so conceived and so dedicated, can long endure. We are met on a great battle field of that war. We have come to dedicate a portion of that field, as a final resting place for those who here gave their lives that that nation might live. It is altogether fitting and proper that we should do this.

4Scor&7YearsAgoOurFthrsBrghtFrthOnThisCntnt,ANew
Natn,CncvdInLbrty,&DdctdToThePrpstnThatAllMenAreCrtd
Equal.NowWeAreEnggdInAGreatCivlWar,TstgWhthrThatNatn,
OrAnyNatnSoCncvd&SoDdctd,CanLongEndr.WeAreMetOnA
GreatBatlFieldOfThatWar.WeHaveComeToDdctAPrtnOfThat
Field,AsAFinlRstgPlacForThosWhoHereGaveTheirLivsThatThat
NatnMghtLive.ItIsAltgthrFitg&PrprThatWeShldDoThis.

4Scor&7YearsAgoOurFthrsBrghtFrthOnThisCntnt,
ANewNatn,CncvdInLbrty,&DdctdToThePrpstnThat
AllMenAreCrtdEqual.NowWeAreEnggdInAGreatCivl
War,TstgWhthrThatNatn,OrAnyNatnSoCncvd&SoDdc-
td,CanLongEndr.WeAreMetOnAGreatBatlFieldOfThat
War.WeHaveComeToDdctAPrtnOfThatField,AsAFinl
RstgPlacForThosWhoHereGaveTheirLivsThatThatNatn
MghtLive.ItIsAltgthrFitg&PrprThatWeShldDoThis.

FIG. 20

ABBREVIATING AND COMPACTING TEXT TO COPE WITH DISPLAY SPACE CONSTRAINT IN COMPUTER SOFTWARE

FIELD OF THE INVENTION

This invention relates to a method and system for abbreviating text to predetermined or undefined length through user controlled and selective methods such as deletion of alphabets in words, replacement of sequences of alphabets in words with representative shorter sequences, replacement of phrases and words with acronyms and word abbreviations respectively and truncation of words and text to make up for the spatial limitations of the display screen or the printed page within any computer software. The methods are effective for language scripts which use capital letters apart from lower case and separate alphabets for consonants and vowels.

BACKGROUND OF THE INVENTION

Human beings have devised words in script form for representing the contents of their vocal communication and intellectual pursuits. The computer with its binary code can hold, process and reproduce information in audio-visual form avoiding the written word. Audio-visual form may be more convenient than the written word for many purposes. However, the written word may not yet be avoidable altogether and may well be more practical in many situations.

Newspapers and periodicals continue to be popular, though with crowding of information, type sizes tend to be reduced. Reading fine print is strainful to the eyes, especially within transportation systems which are not vibration free or with advancing age.

In the world of commerce, industry, business, management and other professions there is an increasing tendency to tabulate and present information in sets of predesigned forms. A tabulated display of text (including numeric values) on screen, unlike a serial replay of voice file or audio-video recording, allows the user to skim across the display screen at his or her own pace to spot, read and comprehend portions in isolation or to read related portions back and forth recurrently for overall comprehension without changing the display. Forms essentially entail demarcation of columns or rows to predetermined sizes—e.g., in spreadsheets, database files or other application packages. Accommodation of text strings of varying length into predetermined columns or rows of fixed length is problematic. Some solutions offered in computer software are:
a) manual editing for abbreviation,
b) change or adjustment of column width or row height and
c) synonym search and replacement with any shorter synonym.
These solutions require user interference with discretion and the results may not be uniform, at each occurrence of the same problem.

There is increasing use of computers for word processing and for a variety of other applications with precise and consistent fonts. The miniaturization of computers is leading to hand-held personal computers packed with tremendous inbuilt or accessible computing power and a variety of software applications with stored data apart from direct and instant access to the information highway. However, the display unit cannot be subjected to unlimited miniaturization due to the physical limitations of the human eye in reading text or graphics. The display space is proving to be a serious constraint; and methods apart from miniaturization need to be found to overcome the display unit constraint.

Conventional methods and prior art which are being used to accommodate more text in display or print include:
a) use of glossaries for replacement of words or phrases with word abbreviations or acronyms,
b) deletion of blank spaces separating words (in excess of one),
c) deletion of all blank spaces separating any two words in a line, after capitalizing the initial of the second word,
d) deletion of blank space(s) around punctuation characters,
e) deletion of all vowels from word,
f) deletion of all vowels from word, excluding the first character,
g) truncation of word or text string,
h) reduction of space between lines of text,
i) finer crafting of fonts, using proportional spacing,
j) compression, size reduction or congesting of characters and
k) vertical or horizontal scrolling of text interactively (in display).

U.S. Pat. No. 5,691,708 includes an abbreviation command, controlled by five parameters, used prior to placement of text message in buffer for abstraction. The first parameter allows use of word abbreviation or acronyms from an abbreviation text file which is a common practice. There are no control features to prioritize acronym replacement over word abbreviation replacement, to prioritize commonly used acronyms or word abbreviations over those which are less commonly used and to use less commonly used acronyms or word abbreviations only if other methods do not yield the desired reduction. The second and the third parameters allow deletion of all vowels from words excluding or including the first characters. There are no control features to ensure that deletion of vowels from words does not render them unrecognizable, nor to allow the user to be selective as to which vowels or other less significant alphabets are open for deletion.

U.S. Pat. No. 4,486,857 is a "Display System For The Suppression And Regeneration Of Characters In A Series Of Fields In A Stored Record". "Suppression" comprises the methods of vowel deletion and truncation. There are no control features to ensure that the use of these methods does not render the contents of the fields unrecognizable.

Certain rules for development of abbreviations as speedy inputs to computers to obtain the full text are contained in U.S. Pat. Nos. 5,623,406, 5,305,205, 4,969,097 and 4,760,528. But these abbreviation rules are mechanistic and suitable only for computer processing and not for easy recognition by the users.

The method of expansion and resizing of data fields in forms as contained in U.S. Pat. No. 5,450,538 may not always be practicable or convenient.

U.S. Pat. No. 5,231,579 covers methods of compression, size reduction or congesting of characters; and these methods are strainful to the eyes.

Modern word processors with finely crafted fonts and using proportional spacing have fairly exhausted further scope for compacting of screen fonts and printer fonts.

Unlike the optical faculty which cannot be stretched beyond a point, the intellectual faculty to associate symbols or words with concepts, to interpret occurrences of words according to context and to recognize words in abbreviated forms can be cultivated almost without bounds. Such cultivation, training or practice through conscious and deliberate effort results in accrual to subconscious (and hence effortless) competencies.

Word abbreviations are recognized by common usage and repetitive association with the original words. A reader or writer is capable of associating printed or written symbols with spoken sounds. A listener is capable of associating spoken sounds with the objects, processes and concepts they represent. A silent reader is capable of directly associating printed or written symbols with the objects, processes or concepts they represent.

The spoken word is often a combination of several sounds. In many written languages each alphabet represents a single basic sound—though in English some alphabets—e.g., c, g, h, n, r and the vowels—are pronounced differently or are silent depending on their context. Phonetically all sounds are not equally significant and it is possible to classify each alphabet based on its usual phonetic significance. This would provide a criterion for prioritizing deletion of less significant alphabets from within words for progressive abbreviation with minimal loss of phonetic content. Such a criterion together with other complementary criteria can provide an alternative of automated phonetic abbreviation to the commonly used word or phrase abbreviation which may not necessarily be phonetic abbreviation.

Phonetic abbreviations would be quite convenient to users, when commonly used acronyms or word abbreviations are not well established or are not known to the users. By and large, only a few of all the words in any language have commonly used abbreviations; and it is necessary to devise alternate methods of word abbreviation for wider application.

Consequently, there is a clear and urgent need:
a) to devise phonetic abbreviation criteria, rules and methods to be used in preference to or in addition to the conventional or known abbreviation methods,
b) to devise fine controls for abbreviation methods including for conventional or known abbreviation methods, and
c) to allow the end user to make intelligent and optimal use of these methods and controls in accordance with personal or knowledge domain specific preferences, without requiring any programming skills. The preferences may be as regards predefinition of abbreviation database, choice of abbreviation options and control parameters and delimitation of segments for special handling. Each individual user should be able to instantly abbreviate text from any source entirely in accordance with his or her own personal preferences.

SUMMARY OF THE INVENTION

It is therefore an object of the invention to provide a comprehensive set of fully automated methods for abbreviation of text in any computer software.

Another object of the invention is to provide fine controls for the methods of the invention through user editable means. For example, the user editable means include abbreviation data lists, abbreviation options and abbreviation control parameters. Sets of the user editable means may be stored in data files so that appropriate sets may be recurrently and readily used in a variety of software applications in accordance with the context—viz. the language and or subject of the text, structure or length of text and space constraints within which the abbreviated text is to be placed.

An applications design related object of the invention is to provide for a versatile abbreviation function which can be used for instant abbreviation of any addressable text (entered through keyboard, voice recognition input device or other input device) for placement within the space constraints of any single or multiple row field with minimal loss of phonetic content and without splitting words between rows except to minimize word truncation.

An overall object of the invention is to provide maximum optical facility by abbreviating text and enabling use of larger types or precluding the use of smaller types, in display and print.

Another overall object of the invention is to accommodate more text by abbreviation in the available display space, thus overcoming the display unit constraint in computers and hand-held devices.

The abbreviation methods in this invention include the following steps:
1. selecting one or more abbreviatable words from the text,
2. prioritizing replacement of commonly used acronyms and word abbreviations over less commonly used acronyms and word abbreviations,
3. using the less commonly used acronyms and word abbreviations only if the other abbreviation methods do not yield the required reduction,
4. converting sequences of enumeration words in the text into sequences comprising numeric characters and punctuations,
5. replacing a sequence of alphabets in any abbreviatable word with a corresponding shorter sequence,
6. deleting one or more alphabets from any abbreviatable word,
7. checking length of abbreviatable words to ensure that abbreviatable words with length greater than a predetermined minimum word length limit are subject to abbreviation,
8. truncating abbreviatable words and text, if necessary,
9. dealing with pre-defined delimited segments in an exceptional manner, for example:
   a) abbreviating only the delimited segment containing an abstract after deleting the rest of the text,
   b) protecting the delimited segment from abbreviation,
   c) prioritizing deletion of the delimited segment before abbreviating the rest of the text, and
   d) prioritizing truncation of the delimited segment before truncating the rest of the text,
10. determining the points of separation while abbreviating text into predetermined number of rows of predetermined row width, if the points of separation have not been pre-defined before abbreviating text,
11. controlling abbreviation of text in accordance with abbreviation control parameters, The abbreviation means used in this invention include the following:
1. abbreviation data list means:
   a) a list of words barred from abbreviation,
   b) a list of enumeration words and their abbreviations,
   c) a list of phrases and their commonly used acronyms,
   d) a list of words and their commonly used word abbreviations,
   e) a list of phrases and their less commonly used acronyms, and
   f) a list of alphabet sequences and their shorter sequence for replacement in words,
2. abbreviation option means:
   a) an option for prioritized deletion or truncation of delimited segments in the text,
   b) an option for protection of delimited segments from abbreviation in the text,
   c) an option for barring pre-defined words from abbreviation in the text,
   d) an option for compulsorily replacing phrases with their commonly used acronyms in the text,
   e) an option for compulsorily replacing words with their commonly used abbreviations in the text,
   f) an option for abbreviating enumeration word sequences into sequences comprising numeric characters and punctuations in the text, g) an option for replacing ending sequences of alphabets in words with shorter sequences, h) an option for replacing intervening sequences of alphabets in words with shorter sequences, i) an option for replacing sequences of a contiguously repeating consonant in words with one such consonant, j) an option for deleting less significant alphabets in words, k) an option for need based replacement of phrases with their less commonly used acronyms in the text, l) an option for truncating words in the text, and m) an option for final truncation of the text, 3. abbreviation control parameter means:

a) a group of punctuations for deletion in the text, b) a group of less significant alphabets for deletion in words, c) a group of non-deletable symbols, d) a minimum word length limit, e) a minimum truncated word length limit, f) an abbreviated text length limit, g) a separated row output width value, and h) a number of separated output rows value.

4. enumeration words conversion means:

A system for converting any continuous sequence of enumeration words in any text into a sequence containing numeric characters comprising:

a) means for replacing enumeration words with their corresponding abbreviations, b) means for handling variations in style of expressing enumeration words sequences, c) means for obtaining valid converted sequence suitable for arithmetic manipulation, d) means for inserting into the converted sequence punctuation characters if required, e) means for inserting into the converted sequence one or more numeric characters representing zero if required, f) means for inserting into the converted sequence numeric character representing one if required, and g) means for deleting occurrences of connecting word abbreviation such as "and" from the converted sequence, if superfluous.

How the Objects are Achieved

Phonetic abbreviation is achieved by selective deletion of blank spaces (after capitalizing the initials of words), deletion of pre-defined insignificant non-alphabet characters, replacement of sequences of alphabets within words with representative shorter sequences, deletion of pre-defined alphabets considered to be less significant for word recognition—i.e., phonetically or optically. Phonetic abbreviation results in minimal loss of phonetic content, saves display space and enables use of larger type sizes maximizing optical facility. The result is: maximum optical facility added concised script (abbreviated as Mofacs).

This invention is suitable for abbreviation of:

a) Text, comprising a string, into abbreviated text string of predetermined or undefined abbreviated text length.

b) Text, comprising a string delimited into several portions with user supplied row separator(s) (i.e., a unique delimitation character such as a vertical bar), into an abbreviated text string comprising several rows of predetermined equal length.

c) Text, comprising a string without any user supplied row separator(s), into an abbreviated string comprising predetermined number of rows of predetermined equal length, without splitting of words between rows except to minimize word truncation.

d) Text, comprising long multiple line textual matter (e.g., newspaper reports, essays, speeches and the like), into abbreviated text of predetermined width.

In the preferred embodiment of the invention described hereinafter, multiple line text is read from an ASCII text file and abbreviated output text is written to an ASCII text file. However the users of this invention may read multiple line text from any other type of file or from a memo field and abbreviated output text may be written to any other type of file or to a memo field.

In the preferred embodiment, abbreviation methods are always carried out on text strings. If a long multiple line text is input for abbreviation, smaller strings are picked up from the long text in sequence and abbreviated one at a time. Hereinafter, the text which is to be abbreviated is referred. to as either "text" or "text string".

The methods of acronym and word abbreviation replacement, deletion of alphabets (generally vowels) and truncation are known methods as outlined in the Background Of The Invention. In this invention, these methods are improved as explained below:

1. Improved acronym and word abbreviation replacement method:

This invention has two types of acronyms and word abbreviations namely, commonly used acronyms and word abbreviations and less commonly used acronyms and word abbreviations.

Replacement of commonly used acronyms and word abbreviation is compulsory and is prioritized before replacement of less commonly used acronyms and word abbreviations.

Replacement of less commonly used acronyms and word abbreviation is done only if necessary and if the other abbreviation methods yield lesser reduction.

2. Improved alphabets deletion method:

In this invention deletion of alphabets from words is subject to a minimum word length limit. Alphabets are not deleted from words if the word length does not exceed the minimum word length limit. Because of this control feature there is minimal loss of word recognition facility.

3. Improved truncation methods:

In this invention truncating methods are executed in stages in a controlled manner to minimize loss of word recognition facility. In the earlier stage words are truncated only if the word length exceeds a minimum truncated word length limit. In the later stage of truncation of text from the right end, the initials of words, numeric characters, decimal point, pre-defined non-deletable symbols and pre-defined protected segments are not truncated.

The prioritized and selective methods of the invention pertain to five broad groups:

1. Delimitation of segments with unique characters for special handling—namely:

a) Identifying a segment of a text string as being an intellectual abstract of the rest of the text string, so that the abstract may be abbreviated if the text string in itself or excluding the delimited segment cannot be abbreviated to the desired output length limit without resorting to word truncation.

Hereinafter, the desired output length limit is also referred to as the abbreviated text length limit.

b) Prioritizing segment(s) in a text string for deletion or truncation before abbreviation of the rest of the text string.

c) Protecting segment(s) in a text string from abbreviation and truncation until the final truncation of the text string.

2. Phonetic abbreviation methods:
   a) Deleting blank spaces and pre-defined non-alphabet characters having no phonetic content.
   b) Shortening of words with minimal loss of phonetic content by:
      i) replacement of frequently occurring sequences of lower-case alphabets with representative shorter sequences,
      ii) replacing occurrences of contiguously repeating consonants with one such consonant—repeating consonants being largely redundant phonetically,
      iii) deletion of less significant alphabets in accordance with item 10 of the section entitled, "Logical criteria for abbreviation of text string or text file", presented later herein,
      subject to a predetermined minimum word length limit.

3. Enumeration words conversion methods:
   Converting enumeration words sequence to a sequence, comprising numeric digits and punctuations, without loss of phonetic content, the numeric sequence being a phonetic equivalent (e.g., 'One Thousand' and '1,000' are both pronounced identically).

4. Abbreviation replacement methods:
   after searching separate glossaries for:
      a) commonly used phrases and corresponding acronyms,
      b) commonly used words and corresponding word abbreviations,
      c) less commonly used phrases and corresponding acronyms, and
      d) less commonly used words and corresponding word abbreviations,
   Generally, the following rules are observed:
      a) Acronym replacement is prioritized over word abbreviation replacement.
      b) Commonly used phrases and words are replaced compulsorily before phonetic shortening methods.
      c) Less commonly used phrases and words are replaced before resorting to truncation methods, but after exhausting phonetic shortening methods.
      d) While commonly used acronyms and word abbreviations, if opted for, will compulsorily replace corresponding phrases and words, the less commonly used acronyms and word abbreviations, if opted for, will replace corresponding phrases and words only if needed—i.e., only if the text cannot be reduced to desired output length limit without use of these acronyms and word abbreviations.

5. Truncation methods:
   optionally deleting characters from word, abbreviated word or any sequence of characters.
   The options include:
   a) In personal name text string:
      i) optional deletion of title word,
      ii) truncation of all abbreviatable words (ignoring undeleted title word, if any), except the first word, to bare initials and
      iii) truncation of the first word (ignoring undeleted title word, if any) from the right end to a predetermined minimum length.
   b) In segment(s) of text string prioritized for deletion or truncation using pre-defined delimitation characters:
      i) deletion of each prioritized segment, starting from the right end until the desired output length limit is reached or all the segments are dealt with,
      ii) truncation of abbreviatable or shortened abbreviatable word to bare initials, starting from the right end until the desired output length limit is reached or all the words are dealt with or
      iii) truncation of abbreviatable or shortened abbreviatable word to a predetermined minimum truncated word length limit, starting from the right end until the desired output length limit is reached or all the words are dealt with.
   c) In text string (excluding prioritized segments):
      i) truncation of abbreviatable or shortened abbreviatable word, such that a uniform proportion of the length of word which is in excess of the predetermined minimum truncated word length limit is deleted starting from the right end until the desired output length limit is reached or all the words are dealt with or
      ii) truncation of abbreviatable or shortened abbreviatable word to a predetermined minimum truncated word length limit, starting from the right end until the desired output length limit is reached or all the words are dealt with.
   d) In text string for final truncation: truncation of the text string, starting from the right end, but excluding:
      i) bare initial of each word,
      ii) pre-defined non-deletable symbols,
      iii) numeric digit,
      iv) decimal point and
      v) segment protected from abbreviation and truncation by delimitation with any pair of pre-defined unique characters (if so opted),
      until the desired output length limit is reached or all the words (or basic elements) are dealt with.

For abbreviation of text comprising of the input text string, all the opted methods are used in sequence, but the phonetic shortening and need based abbreviation replacement methods are stopped as soon as the predetermined desired output length limit is reached. The truncation methods are used last, if and to the extent required.

As a special option, a single row text string may be processed using all the opted methods, barring truncation and without any length limit if the desired output length limit is passed as zero (i.e., undefined). Thus, phonetic shortening options and need based abbreviation replacement options are fully exhausted but truncation methods are avoided altogether.

For abbreviation of multiple line text, compulsory abbreviation replacement methods are used first, if opted, followed by enumeration words conversion and all the opted word shortening methods. This is followed by need based abbreviation replacement methods, if opted and if these provide greater shortening. Punctuation deletion methods and truncation methods are generally not used while abbreviating multiple line text.

Generally, the punctuation deletion parameter is validated with reference to a system fixed comprehensive group of punctuations—e.g., ! ; ' \ , _ : " ?. The less significant alphabet deletion parameter consists of lower-case alphabets for deletion and is validated with reference to a system fixed comprehensive group of low case alphabets, as appropriate to each input language. The truncation methods are controlled with a non-deletable symbols parameter. Generally, the non-deletable symbols parameter is validated with reference to a system fixed comprehensive group of symbols—e.g., @ # $ % + − \. This comprehensive group of symbols and the comprehensive group of punctuations, mentioned hereinbefore, are generally mutually exclusive. The other parameters of the function also control the abbreviation methods in several ways, as can be seen from the detailed description of the methods of the preferred embodiment hereinafter.

The delimited segments special handling, phonetic shortening, abbreviation replacement, enumeration words conversion and truncation methods of this invention are fully automated. The text for abbreviation may be accessed from addressable fields in databases, spreadsheets or other applications or from text or other files (or memo fields). The text may also be obtained by keyboard inputs or through special devices such as a voice recognition (to written or printed word) system. If the methods are used as a function, the abbreviated text string is returned for placement within any desired field in database, spreadsheet or other applications or the abbreviated text is appended to a text or other file. Generally, the names of the source and output files are defined and included in the parameter list.

In the preferred embodiment, repetitive use of the Abbreviate function is facilitated by predefining sets of choices of:
a) user created abbreviation data file version,
b) control options and
c) other control parameters
preferably into a data file.

Consistently abbreviated results will be obtained if the same pre-defined set of choices is used. However, appropriate sets of choices may have to be carefully pre-defined and chosen to optimize the results of the methods, in tune with the language of text abbreviated, personal preferences and specific knowledge domain. With its several optional features the abbreviate function as it applies to text files can be a useful component of any word processing application.

Uses of the Invention

The abbreviated text obtained using the methods and means of this invention may be used to overcome display space constraint or for greater optical facility (with use of larger types) in computers.

Busy officials and business executives may develop a preference for internal reports in Mofacs (maximum optical facility added concised script) for fast personal reading.

After the abbreviation data file and parameters list have been defined or determined and the abbreviation function (i.e., this invention) is called, the text is abbreviated in a fully automated manner without user intervention.

This invention can be used for many language scripts apart from English.

Some of the uses of the invention are as follows:

1. In computer screens:
    In computer applications—e.g., spreadsheet package, database package, database management system (DBMS) or any other standard or customized application—screen form layout entails demarcation of columns and rows to predetermined sizes. Certain columns or rows in the layout contain fixed information (i.e., names or titles of items of information, but not the information itself) with which users develop familiarity. The invention can help to reduce the area allocated for such fixed information, thus saving space for variable information, which in fact is the subject matter for careful, selective and focused reading. The variable information also can be automatically abbreviated to predetermined field widths.

The methods of the invention may be used in menu bars, pull-down menus, windows for displaying text and dialog boxes to cope with display space constraint.

The several methods of the invention yield a wide range of reduction upto about 70%, if required, without any manual intervention. Horizontal or vertical scrolling and compressed printing of oversized forms is avoided. The abbreviated text can fit into varying field widths in different forms, though the original information elements are sourced every time from a commonly used unabbreviated data file.

The function format of the invention, with a comprehensive parameters list supported with a database of abbreviation rules with pertinent data and the provision for choice of pre-defined parameter sets ensures consistent results. The control panel showing combination of parameters list used offers total control to the user with complete transparency. The user can fine-tune his or her choices with experience and preserve the preferred parameter sets for future use on textual information obtained or downloaded from any source.

The methods of the invention in general and the conversion of enumeration words sequence to number in particular are quite suited to voice recognition input methods in database, spreadsheet, word processing or other application programs, if and when such input methods are generally accepted as practical. Inputs to numeric and other data fields through keyboard would normally involve the use of numeric digit keys. However, with voice recognition input systems the input capture may be in words form and such enumeration words sequences can be instantly converted to numeric characters using the methods of this invention.

2. In Web sites:
    The methods of the invention can be used in Web sites, so that visitors are able to read the textual information either in original form or in abbreviated versions.

3. In newspaper columns:
    Senior citizens (and perhaps the readership at large) may develop a preference for abbreviated text in newspaper columns, provided the abbreviation database version, control options and control parameters are carefully fine-tuned and consistently used. Sections in newspapers which are specially devoted to such readers can be produced with abbreviated text in larger type size, within the space constraints.

In columns reporting market quotations, the names of companies or items quoted can be abbreviated. The abbreviation options, pertinent database and control parameters, if adopted uniformly and consistently in reporting business performances, would facilitate focused reading by busy investors and executives.

Classified advertisements with abbreviated text within newspaper columns may be more economical and yet readable.

4. In pagers:
    Pager being a tiny portable device, has a tinier panel for message display. Though the pager may not have the computing facility to abbreviate messages on-line, the methods of the invention may be quite feasible for pagers also. The messages can be abbreviated at a central computing facility before transmission to any pager. Use of appropriate versions of abbreviation rules and pertinent data in a central database will ensure consistency of abbreviated text. Task relevant acronyms and word abbreviations may be adopted for common use and uniform communication.

5. In control panels:

Control panels are an essential requirement within aircrafts, vehicles, manufacturing and household equipment, control rooms and computer applications. Modern control panels include context specific messages for obtaining response to faults or errors. Abbreviated text may help to make the most of the space constraints on the panel.

6. In Television screens:

Often films are telecast with subtitles in a different language. The reading convenience to the viewer is inversely proportional to the speed of the character train or the number of display changes in a given time. The speed or number of display changes can be reduced in direct proportion to the reduction obtained with the abbreviated text.

7. In billboards:

Electronic billboards are installed at prominent places to be visible from large distances. The display includes character trains and flashes of advertisement text. Abbreviated text of the invention offers the same optical facility as in television screens.

8. In teleprompters:

Abbreviated text can be instantly produced from plain text for teleprompters, using abbreviation options, pertinent data and control parameters personally selected and fine-tuned by each speaker or reader. The facility for editing and storage of several versions of the database and parameter sets, with complete control and transperency to the user, is specially suited for this user segment.

9. In publication of books:

Use of abbreviated text in books printed with proportionally spaced types, with reduction potential of about 20–25%, may prove economical and may even be preferred by fast readers. The abbreviation options, pertinent database and control parameters can be selected and fine-tuned by the authors and publishers. Thereafter the production of the abbreviated text version of any book can be fully automated.

10. In electronic data bank, database, encyclopedia, dictionary, glossary etc:

Users may find a sort order of words, phrases or captions ignoring phonetically insignificant characters (such as vowels—except the initial of each word, contiguously repeating consonant, apostrophe, hyphen and intervening space(s) between words) more convenient for two reasons. Firstly, spelling errors in words entered for search are minimized. Secondly, the number of keystrokes for search is reduced.

This sort order implies that the producer of the data bank, database, encyclopedia, dictionary, glossary or such other data source has to provide for an additional sort key for the words, phrases or captions (ignoring phonetically insignificant characters); and the end user has to search for the word, phrase or captions after entering these (in full or preceding part) with the insignificant characters excluded. Additionally, (during word processing), a user may spell-check for the normal word or search for its meaning. In case no match is found the system may develop the abbreviated word, phrase or captions, search for it and if a match is found: show it in full form with the meaning.

11. In search engines:

Developers of search engines for information on the Internet, may provide for search routines using the abbreviated text sort order.

BRIEF DESCRIPTION OF THE DRAWINGS

A more complete understanding of the invention may be obtained by reading the following description in conjunction with the appended drawings in which like elements are labelled similarly and in which:

FIGS. 11 to 16 are blow-by-blow listings of progressive abbreviation results from input text to abbreviated text line-by-line, with the corresponding control panel at the top of the listing. Each of these lines are assembled from the relevant memory variables or other data structures located in storage 012 to illustrate the status of abbreviation at each step. The input line is prefixed with '00' and the subsequent lines are prefixed with the corresponding Method-step numbers. The Method-steps are described in detail in the detailed description of the preferred embodiment hereinafter;

FIG. 11 is a blow-by-blow listing of progressive abbreviation for a single line text of undefined output length;

FIG. 12 is a blow-by-blow listing illustrating abbreviation of a single line text to a predetermined desired output length limit. Apart from other abbreviation methods FIG. 12 illustrates the use of less commonly used acronym and word abbreviation. These are used because they provide greater reduction than other abbreviation methods and because the length of the partially abbreviated text exceeds the predetermined abbreviated text length limit of 30;

FIG. 13 is a blow-by-blow listing illustrating abbreviation of a single line text to a predetermined desired output length limit including an abstract segment;

FIG. 14 is a blow-by-blow listing illustrating abbreviation of a single line text with undefined desired output length including an enumeration words sequence;

FIG. 15 is a blow-by-blow listing illustrating abbreviation of a string containing pre-defined row separators into multiple rows of predetermined equal width. The string also contains a protected segment and a prioritized segment;

FIG. 16 is a blow-by-blow listing illustrating abbreviation of a string containing no row separators into multiple rows of predetermined equal width. Row separators are placed in the string by the system using Separate subroutine;

FIG. 17 illustrates how the use of this invention leads to better utilization of available space on a display or while printing. In the upper part of the FIG. the row titles in the table are unabbreviated and therefore take up a lot of space. In the lower part of the FIG. the row titles in the table have been abbreviated and hence a lot of space is saved. This saved space is used to display more useful information. The control panel in the middle shows the various abbreviation options and parameters used;

FIG. 18 is an illustration of the upper table of FIG. 17 with the row titles transformed into abbreviated multiple row columnar titles, suitable for a database listing format, with the corresponding control panel placed at the top. The database may have (i) name of corporation, (ii) year and (iii) rank (Rk) number as sort keys, so that listings can be taken for each corporation for desired sequence of years or each year for desired corporations/ranks. The data in each database listing may be millions of dollars, growth percentage or proportion percentage for the listed corporations or years;

FIG. 19 is an illustration of typical unabbreviated monospace text file, followed by a typical control panel for abbreviation and the corresponding text after abbreviation. The illustration comprises entirely of phonetic shortening methods in preference to abbreviation replacement methods and also does not include the delimited segment methods. The truncation methods are totally avoided in multiple line text abbreviation;

FIG. 20 is an illustration of the typical unabbreviated text file of FIG. 19 converted to proportionally spaced type (maintaining the line length as in FIG. 19), followed by the abbreviated text of FIG. 19 converted to proportionally spaced type and further followed by the abbreviated text of FIG. 19 converted to proportionally spaced larger type for maximized optical facility within the space constraints of the unabbreviated version at the top of FIG. 20.

DETAILED DESCRIPTION OF PREFERRED EMBODIMENT OF THE INVENTION

Figure 1:
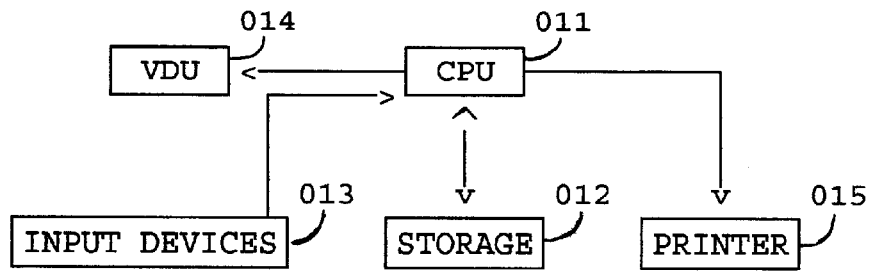
FIG. 1 is a block schematic diagram of a typical computer system including storage 012.

The finely controlled methods of the invention are enabled with a scheme of discriminating between and recognizing the several basic elements of the text. Clear definition of the several basic elements or segments of the text is therefore a prerequisite for the detailed description.

Usually, text file comprises several sentences grouped into paragraphs with or without title lines, indentation or blank line separators. Generally, a text may be an input text string or a text string picked up from a multiple line text file and comprises one or more of the following basic elements or segments:

a) Word: a character sequence comprising entirely of alphabets (or a single alphabet), with or without apostrophe, separated at both ends with space, punctuation, start of text string or end of text string.

b) Abbreviatable word: a word with at least two alphabets, the initial in upper case or lower case and all the other alphabets in lower case.

c) Non-abbreviatable word: a word which is,
  i) a single alphabet or
  ii) a word with at least one alphabet other than the initial in upper case or
  iii) a word abbreviation or
  iv) an acronym.

d) Phrase: comprising an abbreviatable group of words forming a conceptual unit or name of person or entity.

e) Non-alphabet sequence: any contiguous sequence of non-alphabet characters (or a single non-alphabet character).

f) String: a line comprising one or more word, hyphenated word, phrase, numeric digit, punctuation character, bracket character, other symbolic character or intervening blank space.

g) Bundle Word: Any single non-trivial numeric word which connotes a bundle greater than hundred—e.g., thousand, lakh, lac, million, crore, billion, trillion, quadrillion and the like.

h) Enumeration Word: Any single word which,
  i) corresponds to any one or pair of numeric characters barring the word 'zero',
  ii) connotes a bundle—e.g., thousand, lakh, lac, million, crore, billion etc.,
  iii) connects other enumeration words—e.g., 'and', or
  iv) is a derivative of any other enumeration word—e.g., first, second, . . . thousandth, millionth etc. ]

i) Abstract segment: any sequence of characters within a text string, parenthesized with a pair of pre-defined unique characters—e.g., curly brackets—containing an intellectually concised abstraction (comprising one or more words—preferably abbreviatable) of the rest of the string and suffixed to or included in that string.

j) Prioritized segment: any sequence of characters (or a single character) within text string or text file, parenthesized with a pair of pre-defined unique characters—e.g., round brackets—to signal that the sequence is prioritized for deletion or truncation.

k) Protected segment: any sequence of characters (or a single character) within text string or text file, parenthesized with a pair of pre-defined unique characters—e.g., square brackets—to signal that the sequence is protected from abbreviation.

Logical Criteria for Abbreviation of Text String or Text File

A description of the inventors' understanding of a set of sequenced criteria on which the invention is broadly based follows:

1. Abbreviation of text is essentially a logical, prioritized and selective process of deletion of non-text matter such as blank spaces, deletion of less significant non-alphabet characters, replacement of words or word combinations with abbreviations, replacement of alphabet sequences from within words with representative shorter sequences, deletion of less significant alphabets from within words and truncation of long words from the right end.

2. Leading spaces used as word separators may be deleted after converting the initials of words to upper case, provided the preceding word does not end with a capital letter.

3. Special handling of parenthesized segments may include
  a) abbreviation of an intellectually abstracted version parenthesized and suffixed to the text string,
  b) deletion at the outset,
  c) prioritized abbreviation or
  d) protection from abbreviation.

Parenthesis delimitation characters may be deleted after using these for pre-defined special handling of each uniquely parenthesized segment of text.

4. Other non-alphabet characters may be pre-defined as insignificant—e.g., selected punctuation—for prioritized deletion or as highly significant—e.g., symbols: % $ # @—for protection from deletion.

5. Abbreviation or truncation of acronyms or abbreviated words and of words having upper case alphabets apart from initials—e.g., MoU or dBASE, numeric digits and other pre-defined highly significant non-alphabet characters results in loss or distortion of meaning and hence such abbreviations, words or characters are not abbreviatable.

6. Use of acronym comprising initials of any word combination such as phrase, personal name or institutional name, as abbreviation—e.g., PAT for 'Profits after tax'—is common knowledge and results in substantial reduction. Though replacement of such combination with acronym results in total loss of recognition of each original word singly, the acronym may well be easily recognized as such by common usage. Replacement of original word combination with acronym is quite desirable in such cases and may preferably be prioritized. As word abbreviation replacement of any component word from within a phrase (which has a corresponding acronym) renders the phrase no more replaceable with the acronym and as acronyms yield greater reduction than abbreviation of component word(s), it is desirable to prioritize acronym replacement before word abbreviation replacement.

7. Replacement of long word with its abbreviation is also common knowledge—e.g., 'Coy' for 'Company'. Use of such word abbreviation may be prioritized next, provided:
   a) such word abbreviation is commonly used,
   b) the word is not a component of a phrase or institutional name which has a corresponding acronym and
   c) if the replacement with word abbreviation results in greater reduction compared to word reduction based on criterion: 10.

8. Conversion of enumeration words to a sequence of numerics results in substantial reduction without any loss of phonetic content and word recognition facility. It is desirable to prioritize such replacement immediately following replacement with commonly used acronyms and word abbreviations.

9. Shortening of words by replacement of portions within words with corresponding shorter sequence of alphabets or by selective deletion of less significant alphabets from within words other than those which are not abbreviatable in accordance with criterion 5 may be considered if the abbreviation methods, based on the preceding criteria, are inadequate. Pre-defined contiguous sequences of alphabets (comprising portions within words), excluding the initials, may be replaced with pre-defined shorter sequences (obtained by deletion of less significant alphabets therein). It is desirable to prioritize replacement of such characters sequence, immediately following conversion of enumeration words sequences.

10. Significance of any alphabet depends on loss of word recognition facility with deletion of the alphabet from within words. Such loss depends on a combination of factors:
    a) Position of character—initial being the most important for word recognition and the ending character(s) being the least important.
    b) Redundancy of consonant—in certain contiguous consonant occurrences one of the consonant is redundant and insignificant—e.g., 'c' in 'ck', 'n' in 'mn' at the end of word.
    c) Repetition of characters—in contiguously repeating sequence of any consonant, the occurrences in excess of one are less significant.
    d) Relative phonetic significance of the character—words with the consonant(s) deleted cannot be pronounced at all; but attempts to pronounce words with the intervening vowel(s) deleted and supplying vague intervening vowel sounds approximate the complete word pronunciation—e.g., 'significant' cannot be pronounced from 'iiia'; but it can be pronounced from 'sgnfcnt'. In this sense the intervening vowel(s) are phonetically less significant.
    e) Length of the word—very short words with all the vowels deleted may become difficult to recognize—e.g., 'car', 'care', 'core', 'cur', 'cure', 'curia', 'curie' and 'curio'. Hence vowels deletion from within very short words results in complete loss of word recognition.
    f) Contiguity of vowels—in any occurrence of intervening contiguous sequence of vowels, each of the vowels is less significant and selective deletion of only one or a few of such vowels may distort the vowel sound representation—e.g., 'beautiful'. Deletion of all intervening contiguous vowels, in each such occurrence, may be preferable.
    g) Relative optical prominence of characters—lower-case vowels and some consonants—e.g., c, n, r, s, v, x and z—are optically least prominent since these are without height (k), depth (g) or width (m with proportional spacing).
    h) Certain occurrences of a few consonants are silent or least pronounced—e.g., 'r' in 'figure'.

11. Replacement of phrase or word with acronym or word abbreviation which is less commonly used may be resorted to only if:
    a) word abbreviation methods, based on the preceding criteria, do not produce the desired extent of reduction and
    b) if such replacement is supported with a glossary of such equivalents.

12. If a text string, fully abbreviated adopting the preceding criteria, cannot be accommodated within the space constraints, truncation of words of the text string may become necessary. It is preferable that such truncation is subject to predetermined minimum truncated word length limit and is started from the right end of the text string.

13. Truncation results in accelerated loss of word recognition facility, which can be avoided by executing abbreviation methods afresh, starting with an intellectual abstract of the input text string comprising of abbreviatable word(s), if such abstract is enclosed in pre-defined pairs of unique characters and suffixed to the input text string, by the user—e.g., while it is impossible to abbreviate the text string: "Total assets (excluding carried forward losses) net of total liabilities" to six characters without drastic truncation of words, it's intellectual abstract: "Net worth" can be so abbreviated without any truncation.

14. Though word truncation may result in loss of word recognition facility, truncated word combinations within column or row titles in pre-defined forms may be quite recognizable due to the context, repetitive use and familiarity. Though 'Nt' cannot be recognized by itself as 'Net', it may be recognized as such within a truncated word combination—e.g., 'NtCrAs'—more so by those familiar with the relevant information domain—e.g., investors, business managers, finance professionals and accountants.

15. In case drastic truncation is inevitable, it is preferable to prioritize truncation of words from the right end of the text string to bare initials until the desired output length limit is reached.

16. In tabulated forms and database fields, an input text string may be required to be abbreviated and placed as a 17. In personal names it is customary to abbreviate all but one word (normally the surname or family name) to bare initials. A personal name may be recognized if beginning with the occurrence of a pre-defined unique word indicating title, gender, status, etc. After discrimination of personal name the title word may be optionally deleted.
18. An individual end user may have personal, editorial or knowledge domain specific preferences in accepting the aforesaid criteria for abbreviation in general and as regards predefinition of abbreviation database, choice of abbreviation options and control parameters of abbreviation methods in particular. It would be desirable to allow the user to make intelligent and optimal use of these methods without requiring any programming skills.
19. It would be desirable to devise the abbreviation procedure as a function with a comprehensive parameters list so that the procedure can be called and executed from within any spreadsheet application, database application, database management system (DBMS), any other standard or customized application or word processing application.
20. It would be desirable to provide for a pre-defined or predefinable abbreviation data file in several versions and another file of function parameter sets accessible from memory, disk drive or file server in local or wide area networks. With these provisions an individual user may conveniently and recurrently choose from several pre-defined sets of parameters (including reference to abbreviation data file version). The choice can be appropriate to the application from within which the function is called, the language, the structure or length of input text and space constraints within which the abbreviated text output is to be placed.

FIG. 1 is a block schematic diagram of a typical computer system, required to implement the preferred embodiment of this invention, consisting of a central processing unit (CPU) 011. Peripheral equipment includes storage 012, input devices such as keyboard with or without mouse 013, video display unit (VDU) 014 and printer 015. All the aforesaid equipment conform to popular standards and are well known to one of ordinary skill in the art. In future, input devices may include voice input capture devices for conversion of voice to written or printed word. The computer system or any part of it, other than the input devices and the VDU, may be shared within local area networks, wide area networks, the Internet or any other system of linked computer networks. The computer's storage 012 may consist of primary storage, such as RAM and secondary storage, such as disk drives, CD ROMs, DVDs, solid state drives and the like. The specifics as regards what data is read from or written to primary storage and/or secondary storage at each stage of processing impacts the efficiency of processing and safety of data and would be known to one of ordinary skill in the art. Therefore, this detailed description does not differentiate between the different types of storage.

Figure 2:
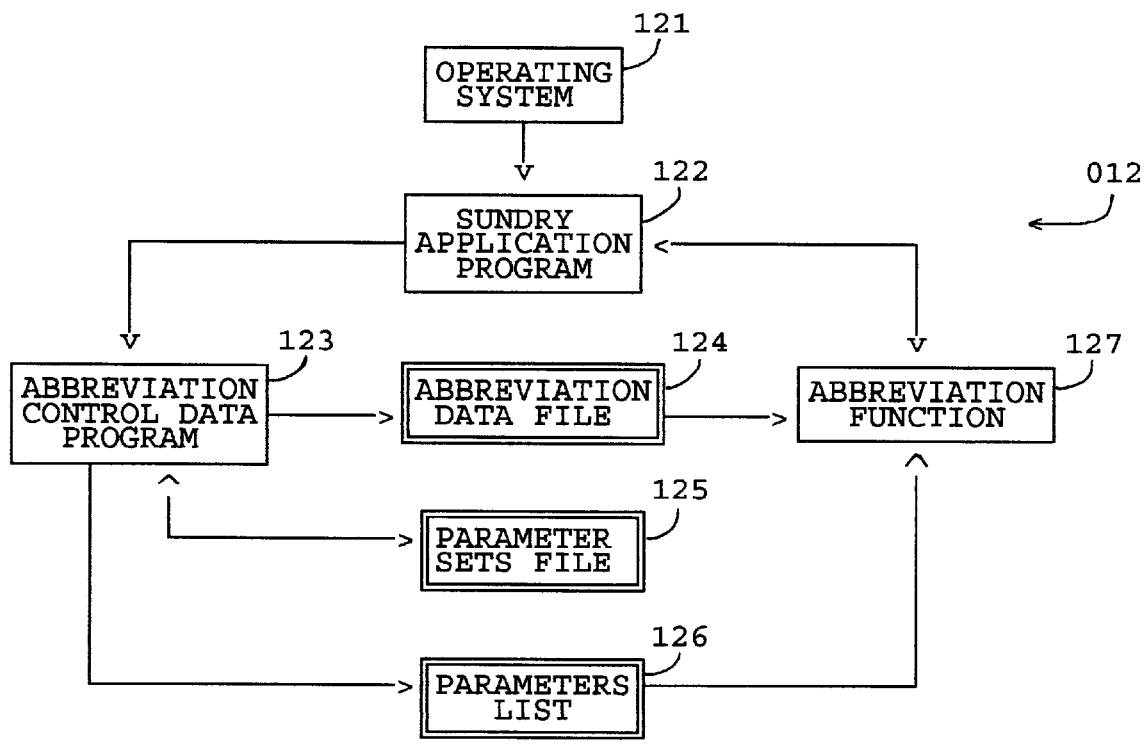
FIG. 2 is a block schematic diagram of the interconnections between the programs (including the abbreviation control data program 123 and the abbreviation function 127) and the data structures within the storage 012.

FIG. 2 broadly presents the typical structures of data and programs within the storage 012 which are required to implement the preferred embodiment of this invention. These include an operating system 121 such as MS-DOS, OS/2 or Windows being popular standards, sundry standard or customized application or utility program 122, an abbreviation control data program 123, an abbreviation data file 124, a parameters set file 125, a parameters list 126, and an abbreviation function 127. Data files and data structures are represented as double lined blocks. The abbreviation control data program 123 presented in greater detail in FIG. 3 and the abbreviation function presented in greater detail in FIG. 4 may be called from within any sundry application program 122. The structure of the abbreviation data file 124 is presented as TABLE 1.

TABLE 1

Structure Of Abbreviation Data File:
File Name: AbData (or the DOS file name of the current version of the file used is passed from parameter: AbrDtaFN)

Fields:

| Name | Data Type | Description |
|---|---|---|
| AbAR | Integer | Abbreviation Rule numbers |
| AbPhWd | String(55) | Unabbreviated phrase, word or characters |
| AbAbrv | String(10) | Acronym or word abbreviation string |

The structure of the parameters list of abbreviation string function 126, in the preferred embodiment, is presented as TABLE 2. The parameters may be initiated as memory variables or included as the parameter list of an abbreviate function of the format:

ABBREVIATE(parameter list)

The Abbreviate function, in the preferred embodiment, would return:
a) In case of text string input: the abbreviated string (in single or multiple rows) and the reduction percentage of the input (Rdctn%).
b) In case of text file input: number of output lines (OutptLns) and the percentage of reduction of the input (Rdctn%).
c) Appropriate error messages, if any.

The user may pass each parameter afresh everytime the function is called. As a convenient alternative the user may choose any parameter set comprising of parameters (numbered P#=1 to 28 in TABLE 2) from a parameters set file 125 and the user may pass only the unique parameters (numbered P#=29 to 34 in TABLE 2) directly every time the function is called.

It may be possible to design the sundry application, from within which the abbreviation function of this invention is called, itself to develop:
a) the parameters: OtptL and StrRws by checking the space constraints of the location to which the output is to be supplied, while abbreviating text string and
b) the parameters: InptL and OtptL by checking the input text file named in parameter:InputFN and the output text file named in parameter:OutptFN, while abbreviating text file.

TABLE 2

Structure Of Parameters List Of Abbreviate Function:

Fields:

| P# | PrmtrNm | Short Description | Data Type | Valid For FnctnSb |
|---|---|---|---|---|
| 1 | FnctnSb | Function sub code: 's' for abbreviating text string, 't' for abbreviating text file to text file, | String(1) | s/t |
| 2 | OptnACc | All capitals convert to lower case | String(1) | s/t |

TABLE 2-continued

Structure Of Parameters List Of Abbreviate Function:

Fields:

| P# | PrmtrNm | Short Description | Data Type | Valid For FnctnSb |
|---|---|---|---|---|
| 3 | OptnAbs | Intellectual abstraction in curly brackets usage | String(1) | s |
| 4 | OptnPri | Prioritized deletion/ truncation of round bracket contents | String(1) | s/t |
| 5 | OptnPro | Protection of square bracket contents from abbreviation | String(1) | s/t |
| 6 | OptnAbB | Pre-defined words barred from abbreviation | String(1) | s/t |
| 7 | OptnTWd | Title word (preceding personal name) deletion | String(1) | s |
| 8 | OptnCAc | Compulsory acronym replacement for phrase | String(1) | s/t |
| 9 | OptnCAb | Compulsory abbreviation replacement for word | String(1) | s/t |
| 10 | OptnEWN | Enumeration words to numerics conversion | String(1) | s/t |
| 11 | OptnESq | Ending sequence replacement | String(1) | s/t |
| 12 | OptnISq | Intervening sequence replacement | String(1) | s/t |
| 13 | OptnRCd | Repeating consonant deletion (i.e., replacement of a sequence of a contiguously repeating consonant with one such consonant) | String(1) | s/t |
| 14 | OptnLAd | LAdStrng based deletion | String(1) | s/t |
| 15 | OptnNAc | Need based acronym replacement for phrase | String(1) | s/t |
| 16 | OptnNAb | Need based abbreviation replacement for word | String(1) | s/t |
| 17 | OptnTrn | Words truncation | String(1) | s |
| 18 | OptnFnl | Text string final truncation | String(1) | s |
| 19 | OptnISd | Intervening space deletion | String(1) | t |
| 20 | OptnLBj | Line breaks joining | String(1) | t |
| 21 | AbrDtaFN | Abbreviation data file name - version specific | String(8) | s/t |
| 22 | PndStrng | String containing punctuations for deletion | String(8) | s |
| 23 | LAdStrng | String containing less significant alphabets for deletion | String(8) | s/t |
| 24 | NDSStrng | String containing non-deletable symbols | String(8) | s |
| 25 | MnWdL | Minimum word length limit | Integer | s/t |
| 26 | MnTrL | Minimum truncated word length limit | Integer | s |
| 27 | MxPNWds | Maximum personal name words limit | Integer | s |
| 28 | PNFWdL | Personal name first word length limit | Integer | s |
| 29 | InputFN | Input text file name | String(8) | t |
| 30 | OutptFN | Output text file name | String(8) | t |
| 31 | OtptL | Desired output length or row width or output record length | Integer | s/t |
| 32 | InptL | Input record length | Integer | t |
| 33 | StrRws | String output rows number | Integer | s |
| 34 | InputStr | Input text string | String-(120) | s |

Generally, the following rules are observed:
1) The option value—i.e., for parameters P#=2 to 20—is set to 'Y', to exercise the option, or else it is left blank, except for OptnAbs:
   a) If OptnAbs='X': the entire text string, including the abstract segment in curly brackets, is abbreviated. If the desired output length limit is not reached, without using truncation options, the OptnAbs is set to 'Y' and abbreviation of the string is tried afresh.
   b) If OptnAbs='Y': the text string, excluding the abstract segment, is abbreviated. If the desired output length limit is not reached, without using truncation options, the OptnAbs is set to 'z' and abbreviation of the string is tried afresh.
   c) If OptnAbs='Z': only the abstract segment is retained and abbreviated.

for OptnPri:
   a) If OptnPri='D': prioritized segments in round brackets are deleted starting from the right end of the text string until the desired output length limit is reached.
   b) If OptnPri='I': each word from the prioritized segments is truncated to bare initials from the right end, starting from the end of file:Shrtn, until the desired output length limit is reached.
   c) If OptnPri='T': each word in the prioritized segments is truncated upto a predetermined minimum truncated word length limit (MnTrL) from the right end, starting from the end of file:Shrtn, until the desired output length limit is reached.

for OptnEWN:
   a) If OptnEWN='X': any bundle word greater than thousand (Th) at the end of numeric abbreviation is retained.
   b) If OptnEWN='Y': any bundle word at the end of numeric abbreviation is retained.
   c) If OptnEWN='Z': the enumeration words sequence in the text string is fully converted to numerics without retaining any bundle word at the end of numeric abbreviation.

for OptnLAd:
   a) If OptnLAd='X': less significant alphabets are deleted from the right end upto a predetermined minimum word length limit (MnWdL), excluding the last alphabet within each word from deletion.
   b) If OptnLAd='Y': less significant alphabets are deleted from the right end upto a predetermined minimum word length limit, including the last alphabet within each word.

for OptnTrn:
   a) If OptnTrn='P': all shortened words are truncated from the right end, such that the length of each word which is in excess of the predetermined minimum truncated word length limit is deleted in required uniform proportion, until the desired output length limit is reached.
   b) If OptnTrn='R': shortened words are truncated from the right end, upto a predetermined minimum truncated word length limit and until the desired output length limit is reached.

for OptnFnl:
   a) If OptnFnl='Y': each word (or basic element) from the text string is truncated from the right end, excluding bare initials of each word, pre-defined non-deletable symbols, numeric digit, decimal point and protected segment, until the desired output length limit is reached or all the words are dealt with.
   b) If OptnFnl='Z': each word (or basic element) from the text string is truncated as in the preceding option, except that the protected segment is not excluded from truncation.

2) Valid value of MnTrL is any integer greater than 1.
3) Valid value of MnWdL is any integer greater than 1 and not less than MnTrL.

The structure of the parameters set file 125 is presented as TABLE 3.

TABLE 3

Structure Of Parameters Set File:

File Name: PSet
Fields:

| Name | Data Type | Short Description |
|---|---|---|
| PrmSetId | String(3) | Parameter Set Identification code:<br>1st character = FnctnSb<br>2nd character = any lower case alphabet group indicator<br>3rd character = any numeric digit set indicator read with 1st and 2nd characters |
| PrmComnt | String(55) | Parameter set comment |
| OptnACc | String(1) | ) |
| OptnAbs | String(1) | ) |
| OptnPri | String(1) | ) |
| OptnPro | String(1) | ) |
| OptnAbB | String(1) | ) |
| OptnTWd | String(1) | ) |
| OptnCAc | String(1) | ) |
| OptnCAb | String(1) | ) |
| OptnEWN | String(1) | ) |
| OptnESq | String(1) | ) |
| OptnISq | String(1) | ) |
| OptnRCd | String(1) | ) |
| OptnLAd | String(1) | > As in TABLE 2 |
| OptnNAc | String(1) | ) |
| OptnNAb | String(1) | ) |
| OptnTrn | String(1) | ) |
| OptnFnl | String(1) | ) |
| OptnISd | String(1) | ) |
| OptnLBj | String(1) | ) |
| AbrDtaFN | String(8) | ) |
| PndStrng | String(8) | ) |
| LAdStrng | String(8) | ) |
| NDSStrng | String(8) | ) |

TABLE 3-continued

Structure Of Parameters Set File:

File Name: PSet
Fields:

| Name | Data Type | Short Description |
|---|---|---|
| MnWdL | Integer | ) |
| MnTrL | Integer | ) |
| MxPNWds | Integer | ) |
| PNFWdL | Integer | ) |

The abbreviation data file 124, the parameters set file 125 and the parameters list 126 are authored using the abbreviation control data program 123. Any record from the parameters set file 125 may be used as a subset (i.e., parameters numbered P# =1 to 28 in TABLE 2) of the parameters list 126.

Figure 3:
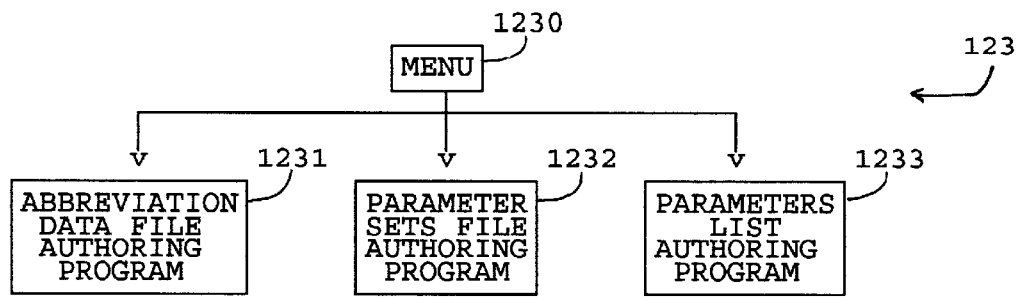
FIG. 3 is a block schematic diagram of the structure of the abbreviation control data program 123.

FIG. 3 presents the abbreviation control data program 123 in greater detail. It consists of a menu 1230 allowing choice of abbreviation data file authoring program 1231, parameter sets file authoring program 1232 and parameters list authoring program 1233. The abbreviation data file authoring program 1231 uses a data capture form structure for on-screen display to create and update several versions of the abbreviation data file 124. Relevant details pertaining to abbreviation rules (number and description) and data validation rules for each field are presented as TABLE 4. A typical abridged version of the abbreviation data file is presented as TABLE 5. A complete and system fixed list of enumeration words with abbreviations, being a subset of Abbreviation Data File with AbAR=2 is presented as TABLE 6. The program is not described further, being a routine matter well known to one of ordinary skill in the art.

TABLE 4

Abbreviation Rule Numbers, Description And Field Data Validation Rules for Abbreviation Data File:

Fields:

| Ab AR | | AbPhWd | AbAbrv |
|---|---|---|---|
| Ab | Abbreviation | | |
| AR | Rule Description | Validation Rules | Validation Rules |
| 1 | Words barred from abbreviation | Any word comprising entirely of an upper case 1st alphabet followed by lower-case alphabet(s) | |
| 2 | Conversion of single words representing numbers up to hundred and bundle words (such as thousand, million etc.) to abbreviations | Any word comprising entirely of alphabets representing numbers, bundles and derivatives such as First from one or Tenth from ten (system defined) | Any numeric digit, alphabet characters or combination (system defined) |
| 3 | Deletion of title word representing status and/or gender in personal name | Any word or abbreviation popularly used in personal name | |
| 4 | Compulsory replacement of phrase with acronym | Any phrase or series of words with initials capitalised, intervening spaces deleted and length <=55 | Any appropriate system formed or user edited acronym |
| 5 | Compulsory replacement of word with abbreviation | Any word of 3 to 25 characters other than 'And', 'Point' and 'Zero' | Any appropriate abbreviation to yield at least 25% reduction for words containing <= 4 characters and at least 40% reduction for longer words |
| 6 | Need based replacement of phrase with acronym | Any phrase or series of words with initials capitalised, intervening spaces deleted and length <=55 | Any appropriate system formed or user edited acronym |
| 7 | Need based replacment of word with abbreviation | Any word of 3 to 25 characters other than 'And', 'Point' | Any appropriate abbreviation to yield at least 25% reduction |

TABLE 4-continued

Abbreviation Rule Numbers, Description And Field Data Validation Rules for Abbreviation Data File:

Fields:

| Ab | Abbreviation | AbPhWd | AbAbrv |
|---|---|---|---|
| AR | Rule Description | Validation Rules | Validation Rules |

| | | | |
|---|---|---|---|
| | | and 'Zero' | for words containing <= 4 characters and at least 40% reduction for longer words |
| 8 | Need based replacment of ending sequence of characters in word with a shorter sequence | Any sequence of lower-case characters | Blank OR any appropriate lower-case shorter sequence to yield at least a 50% reduction |
| 9 | Need based replacement of intervening sequence of characters in word with a shorter sequence | Any sequence of lower-case characters | Blank OR any appropriate lower-case shorter sequence to yield at least a 50% reduction |

Suggested cautions:
a) Do not permit user editing of system defined records with AbAR = 2.
b) Do not permit duplication of field: AbPhWd entries between records with AbAR = 4 and 6; and between records with AbAR = 2,5 and 7.
c) Provide for change of AbAR = 4 to AbAR = 6, AbAR = 5 to AbAR = 7 and vice versa.
d) Provide for creation and editing of several versions of file: AbData appropriate to each usage domain or individual preference, with unique DOS file names passed as parameter: AbrDtaFN.

TABLE 5

Abridged Version Of Typical Abbreviation Data File:

Fields:

| AbAR | AbAbrv | AbPhWd |
|---|---|---|
| 1 | | Abraham |
| 1 | | Lincoln |
| 2 | Bn | Billion |
| 2 | Cr | Crore |
| 2 | 8 | Eight |
| 2 | 18 | Eighteen |
| 2 | 80th | Eightieth |
| 2 | 80 | Eighty |
| 3 | | Mr |
| 3 | | Mr. |
| 3 | | Mrs |
| 3 | | Dr |
| 4 | BS | BalanceSheet |
| 4 | Fed | FederalReserve |
| 4 | P&L | ProfitAndLoss |
| 4 | PAT | ProfitAfterTax |
| 5 | # | Number |
| 5 | Tue | Tuesday |
| 5 | Coy | Company |
| 5 | Corp | Corporation |
| 5 | $ | Dollar |
| 5 | Govt | Government |
| 5 | Inc | Incorporated |
| 5 | % | Percent |
| 6 | ADN | AnyDayNow |
| 6 | BTW | ByTheway |
| 6 | FYI | ForYourInformation |
| 7 | Doc | Document |
| 7 | Spdt | Superintendant |
| 8 | k | ck |
| 8 | g | ing |
| 8 | mt | ment |
| 8 | nt | nent |
| 8 | nt | nant |
| 9 | m | mn |
| 9 | k | ck |
| 9 | g | ing |
| 9 | mt | ment |
| 9 | nt | nent |

TABLE 6

Complete And System Fixed List Of Enumeration Words (with abbreviations, being a subset of Abbreviation Data File with AbAR = 2)

Fields:

| AbPhWd | AbAbrv |
|---|---|
| Billion | Bn |
| Crore | Cr |
| Eight | 8 |
| Eighteen | 18 |
| Eighteenth | 18th |
| Eighth | 8th |
| Eightieth | 80th |
| Eighty | 80 |
| Eleven | 11 |
| Eleventh | 11th |
| Fifteen | 15 |
| Fifteenth | 15th |
| Fifth | 5th |
| Fiftieth | 50th |
| Fifty | 50 |
| First | 1st |
| Five | 5 |
| Fortieth | 40th |
| Forty | 40 |
| Four | 4 |
| Fourteen | 14 |
| Fourteenth | 14th |
| Fourth | 4th |
| Hundred | 00 |
| Hundredth | 00th |
| Lac | Lc |
| Lakh | Lk |
| Million | Mn |
| Nil | 0 |
| Nine | 9 |
| Nineteen | 19 |
| Nineteenth | 19th |
| Nineth | 9th |
| Ninetieth | 90th |
| Ninety | 90 |
| One | 1 |
| Quadrillion | Qd |
| Second | 2nd |
| Seven | 7 |

TABLE 6-continued

Complete And System Fixed List Of Enumeration Words
(with abbreviations, being a subset of Abbreviation
Data File with AbAR = 2)

Fields:

| AbPhWd | AbAbrv |
|---|---|
| Seventeen | 17 |
| Seventeenth | 17th |
| Seventh | 7th |
| Seventieth | 70th |
| Seventy | 70 |
| Six | 6 |
| Sixteen | 16 |
| Sixteenth | 16th |
| Sixth | 6th |
| Sixtieth | 60th |
| Sixty | 60 |
| Ten | 10 |
| Tenth | 10th |
| Third | 3rd |
| Thirteen | 13 |
| Thirteenth | 13th |
| Thirtieth | 30th |
| Thirty | 30 |
| Thousand | Th |
| Three | 3 |
| Trillion | Tr |
| Twelfth | 12th |
| Twelve | 12 |
| Twentieth | 20th |
| Twenty | 20 |
| Two | 2 |

Note:
In some Asian countries One Hundred Thousand is reckoned as a Lakh (Lac), One Hundred Lakh is reckoned as a Crore and hence One Hundred Crore is equivalent to One Billion.

The parameters set file authoring program 1232 uses a data capture form structure for on-screen display to create and update the parameters set file 125 covering parameters as presented in TABLE 3. The program is not described further being a routine matter well known to one of ordinary skill in the art. The parameters list authoring program 1233 uses a data capture form structure for on-screen display to create the parameters list 126. The program is not described further being a routine matter well known to one of ordinary skill in the art.

Figure 4:
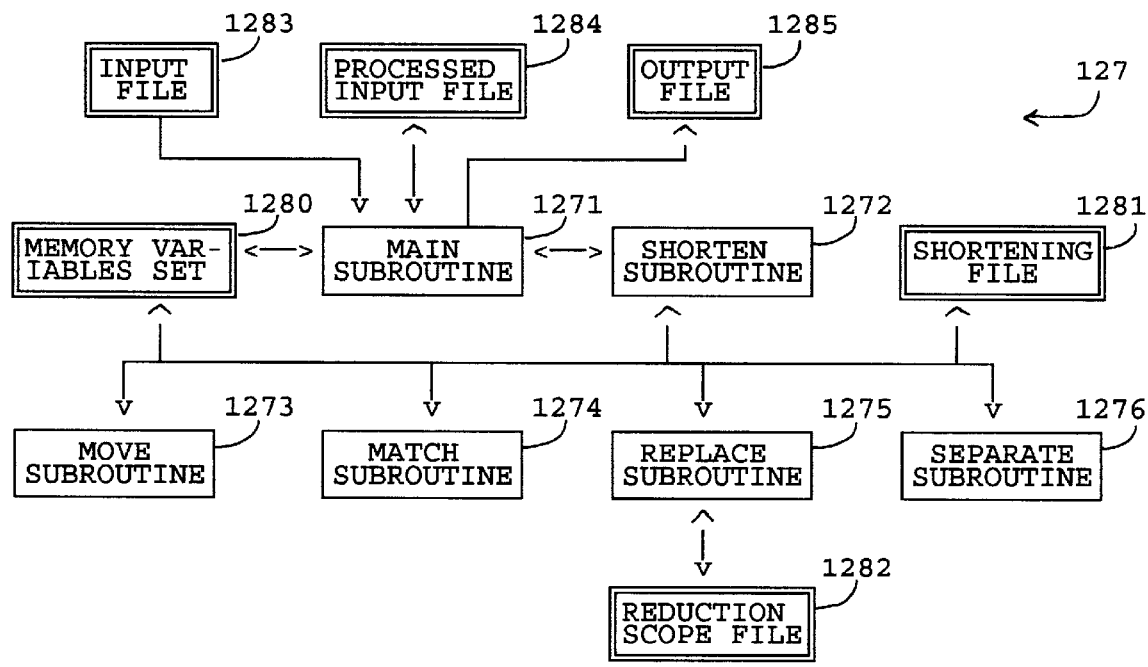
FIG. 4 is a block schematic diagram of the subroutines and the data structures comprising the abbreviation function 127.

FIG. 4 presents in greater detail the abbreviation function 127, which is the crux of this invention. This presentation shows all subroutines, memory variables set, shortening file and reduction scope file, which files are used by the subroutines. Data files and data structures are represented as double lined blocks. Execution of the abbreviation function starts with the Main subroutine 1271 which in turn calls the Shorten subroutine 1272. The Shorten subroutine may recursively call the Move subroutine 1273, Match subroutine 1274, Replace subroutine 1275 and Separate subroutine 1276. Apart from the abbreviation data file 124 and the parameters list 126, which are accessed by the abbreviation function 127, the subroutines also access the memory variables set 1280 and the shortening file 1281. The reduction scope file 1282 is accessed only from the Replace subroutine 1275. The input file 1283, the processed input file 1284 and the output file 1285 are used from within the Main subroutine while abbreviating text file inputs only and not while abbreviating text string or word input. The memory variables set, comprises individual variables described within each method hereinafter and other variables that may be required to control the execution of conditional, sequenced and/or recursive steps of the methods of the abbreviation function depending on the programming details well known to one of ordinary skill in the art. The structures of the shortening file 1281, the reduction scope file 1282, the input file 1283, the processed input file 1284 and the output file 1285 are presented in TABLEs 7 to 11 hereinafter.

The shortening file 1281 has fields which are structured to:
a) hold each word (or basic element), separated from the word separation and processing string, in separate records in original sequence (i.e., in sequence of field:ShSq),
b) hold, along with the first word of phrase, less commonly used matched acronym for need based replacement; or hold, along with the word, less commonly used word abbreviation for need based replacement,
c) hold indication if each word (or basic element) has reduction scope (i.e., open for reduction, by acronym or word abbreviation replacement or phonetic shortening),
d) hold indication if each word (or basic element) is covered by any of the abbreviation methods, rule numbers or category numbers—number greater than zero indicating that the word is not open for abbreviation or truncation except in the last step of text string truncation, if required,
e) hold indication if each word originally had the initial in capital letter and if it had any of its other alphabets capitalized by the system to control the phonetic shortening methods and
f) in general facilitate execution of the methods of this invention within shortening file until the desired output length limit is reached or each word (or basic element) is dealt with.

The Shorten subroutine 1272 calls the Match subroutine 1274 wherein the abbreviation data file 124 is searched for acronyms or word abbreviations corresponding to phrases or words contained in the input text string. The commonly used acronyms or word abbreviations, if found, are replaced compulsorily and other acronyms or word abbreviations, if found, are held in corresponding records of shortening file 1281 for need based replacement at a later stage. The Shorten subroutine 1272 calls the Replace subroutine 1275 for need based replacement of phrases or words with acronyms or word abbreviations using the reduction scope file 1282 to keep track of reduction scope length of the acronyms or word abbreviations found and held for need based replacement. The records in reduction scope file are sequenced in the descending order of reduction scope length, the objective being to achieve the required reduction with the least number of need based replacements in the records of the shortening file as referenced from the first few records of the reduction scope file.

If the abbreviated output is required to be placed in multiple row column widths, the Shorten subroutine 1272 calls the Separate subroutine 1276 to separate the input text string into required number of portions without splitting words (except to minimize word truncation) before shortening the portions. Thereafter each portion is duly abbreviated to the desired output length limit.

Generally, abbreviation of multiple line text requires additional files—namely an input file 1283 from which the input records are first read, a processed input file 1284 into which the input records are copied with control data to keep track of line breaks, paragraph breaks, blank lines and indentation and an output file 1285 to which the abbreviated records are written. The pattern of line breaks, blank lines and indentation are reproduced in the output file 1285, if required. Optionally line breaks and blank lines are joined to save display space, indicating the joints with one or two '@' character(s).

If a single line text string is being abbreviated, the function returns the output string. If a multiple line text in a file is being abbreviated, each abbreviated output string is accumulated upto the predetermined output record length, reckoned in terms of monospace or proportional spacing, and each accumulated record is added to the pre-defined output text file 1285.

TABLE 7

Structure Of Shortening File:
File Name:Shrtn

Fields:

| Name | Data Type | Description |
|---|---|---|
| ShSq | Integer | Record sequence number. |
| ShSWrd | String (26) | Word (or basic element) for abbreviation or commonly used acronym or word abbreviation replacement (after OptnCAc & OptnCAb are used). |
| ShAbrv | String (10) | Less commonly used acronym or word abbreviation held for need based replacement later. |
| ShRS | Integer | Reduction scope indicator (only 0, 1, 6 or 7 being valid). ShRS = 0 indicates that field:ShSWrd is not open for reduction. ShRS is set to 6 or 7, if less commonly used acronym or abbreviation is held in ShAbrv. |
| ShAR | Integer | Abbreviation rule indicator - default value being zero. AbAR numbers 1–5, are copied directly from file:AbData, as applicable and numbers 6 & 7 are copied from ShRS after need based replacement of less commonly used acronym or word abbreviation. All non-abbreviatable words (or basic elements) are numbered 20. Protected segment is numbered 22 ShAR > 0 indicates that the word is not open for word truncation, except in the last stage of text string truncation, if required. |
| ShCap | Integer | Indicating original case status of initial of word or capitalization of other alphabets of word to control phonetic shortening methods (only 0, 1, 10 or 11 being valid). |

In the preferred embodiment, the following integer variables, derived from the field value(s) in this file, are used:
a) SwrdLen = Number of characters contained (excluding trailing space(s)) in field:ShSWrd of each record in file:Shrtn.
b) AbrvLen = Number of characters contained (excluding trailing space(s)) in field:ShAbrv of each record in file:Shrtn.
c) TotLen = Sum of SWrdLen of all records in file:Shrtn.

TABLE 8

Structure Of Reduction Scope File:
File Name:Scope

Fields:

| Name | Data Type | Description |
|---|---|---|
| ScAcAbRS | Integer | Need based acronym or word abbreviation replacement reduction scope length |
| ScSq | Integer | Sequence number copied from ShSq of file:Shrtn |

TABLE 9

Structure Of Input File:
File Name:The DOS file name of the current file used is passed from parameter:InputFN.

Fields:

| Name | Data Type | Description |
|---|---|---|
| InRcord | String (120) | Input text file record |

Note:
Double spaced input files are converted to single spaced files before processing, as blank lines are reckoned to be paragraph breaks.

TABLE 10

Structure Of Processed Input File:
File Name:PrInp

Fields:

| Name | Data Type | Description |
|---|---|---|
| PrRcord | String (122) | Input record for abbreviation |
| PrTyp | String (1) | Record Type:<br>F = first line after blank line, line break or paragraph break<br>S = single line - i.e., between 2 of blank line, line break or paragraph break<br>I = intervening line between PrTyp 'F' and 'L' lines<br>L = last line before blank line, line break or paragraph break<br>B = blank line |
| PrIndSpc | Integer | Number of spaces indentation |

TABLE 11

Structure Of Output File:
File Name:The DOS file name of the current file used is passed from parameter:OutptFN.

Fields:

| Name | Data Type | Description |
|---|---|---|
| OtRcord | String (120) | Output text file record |

The subroutines are presented in greater detail in flow chart format in FIGS. 5 to 8 and 9 to 10.

Separate control panel formats for text string abbreviation and text file abbreviation are presented in TABLES 12 and 13. The panels may be used for capturing user's choice of data file version, options or other control parameters or to display or print these choices, if required.

TABLE 12

Text String Output Control Panel:

String Output: PrmSetId = sal, AbrDtaFN = abdata2

| ACc | Abs | Pri | Pro | AbB | TWd | CAc | CAb | EWN | ESq | ISq | RCd | LAd | NAc | NAb | Trn | Fnl |
|---|---|---|---|---|---|---|---|---|---|---|---|---|---|---|---|---|
| Y | XYZ | DIT | Y | Y | Y | Y | Y | XYZ | Y | Y | Y | XY | Y | Y | PR | YZ |
| PndStrng | LAdStrng | NDSStrng | MnWdl | MnTrL | MxPNWds | | | PNFWdL | | OtptL | StrRws | | | | | |
| ,;: | aeiour | #$%+-@/ | 03 | 02 | 03 | | | 08 | | 25 | 01 | | | | | |

TABLE 13

Text File Output Control Panel:

Text Output: PrmSetId = ta1, AbrDtaFN = abdata2

| ACc | Pri | Pro | AbB | CAc | CAb | EWN | ESq | ISq | RCd | LAd | NAc | NAb | ISd | LBj |
|---|---|---|---|---|---|---|---|---|---|---|---|---|---|---|
| Y | D | Y | Y | Y | Y | XYZ | Y | Y | Y | XY | Y | Y | Y | Y |
| LAdStrng | MnWdL | InputFN | OutptFN | OtptL | InptL | | | | | | | | | |
| aeiou | 04 | getty | text12 | 060 | 078 | | | | | | | | | |

Notes:
1) The heading line of each panel holds PrmSetId and AbrDtaFN.
2) The 1st line of each panel holds the option names with the prefix 'Optn' dropped.
3) The 2nd line of each panel holds valid entries for each option being one or a choice of upper case alphabets apart from blank.
4) the 3rd and 4th lines holds other parameter labels and typical entries.

The basic embodiment of the invention with some variations is designed to abbreviate text string or word and with other variations to abbreviate text file. These variations are explained with reference to each method or step of the invention hereinafter. Each method of the invention is numbered 1 to 33 and in case any method comprises a plurality of steps, each such step is designated with a unique lower-case alphabet suffix to the method number. The one or two digit numeric designating the method or the numeric-alphabet designating a method-step is used as the reference character in the flow charts (i.e., in FIGS. 5 to 8 and 9 to 10). These designating reference characters are placed at the end of relevant method description or method-step statement, as the case may be.

The methods that are used in the preferred embodiment, numbered 1 to 33, are as follows:

Method 1: Creation of Abbreviation Data File

The system provides for creation and editing of abbreviation data file 124, by the user or developer using the file structure described in TABLE 1 hereinbefore with valid inputs as specified in the format presented in TABLE 4. The method of creation and editing is not described further, being a routine matter known to one of ordinary skill in the art.

Method 2: Creation of Parameters Set File

The system requires creation and editing of parameters set file 125, by the user, with valid inputs into the file structure described in TABLE 3 hereinbefore. Several parameter sets may be pre-defined and stored in the file for selective use as and when the function is called. The method of creation and editing is not described further, being a routine matter known to one of ordinary skill in the art.

Method 3: Generation of Complete Parameter List

A user may be allowed to develop the parameter list by passing each parameter afresh each time the function is called. For convenience and consistency of results the user may be enabled to define instantly the unique parameters—i.e., input text DOS file name (InputFN), output text DOS file name (OutptFN), output length (OtptL), input length (InptL), number of string output rows (StrRws) and input text string (InputStr)—and to choose any parameter set from the parameter sets file 125 to complete the parameters list 126 everytime the function is called. With this the function is ready for execution.

Method 4: Start of Main Program

Figure 5:
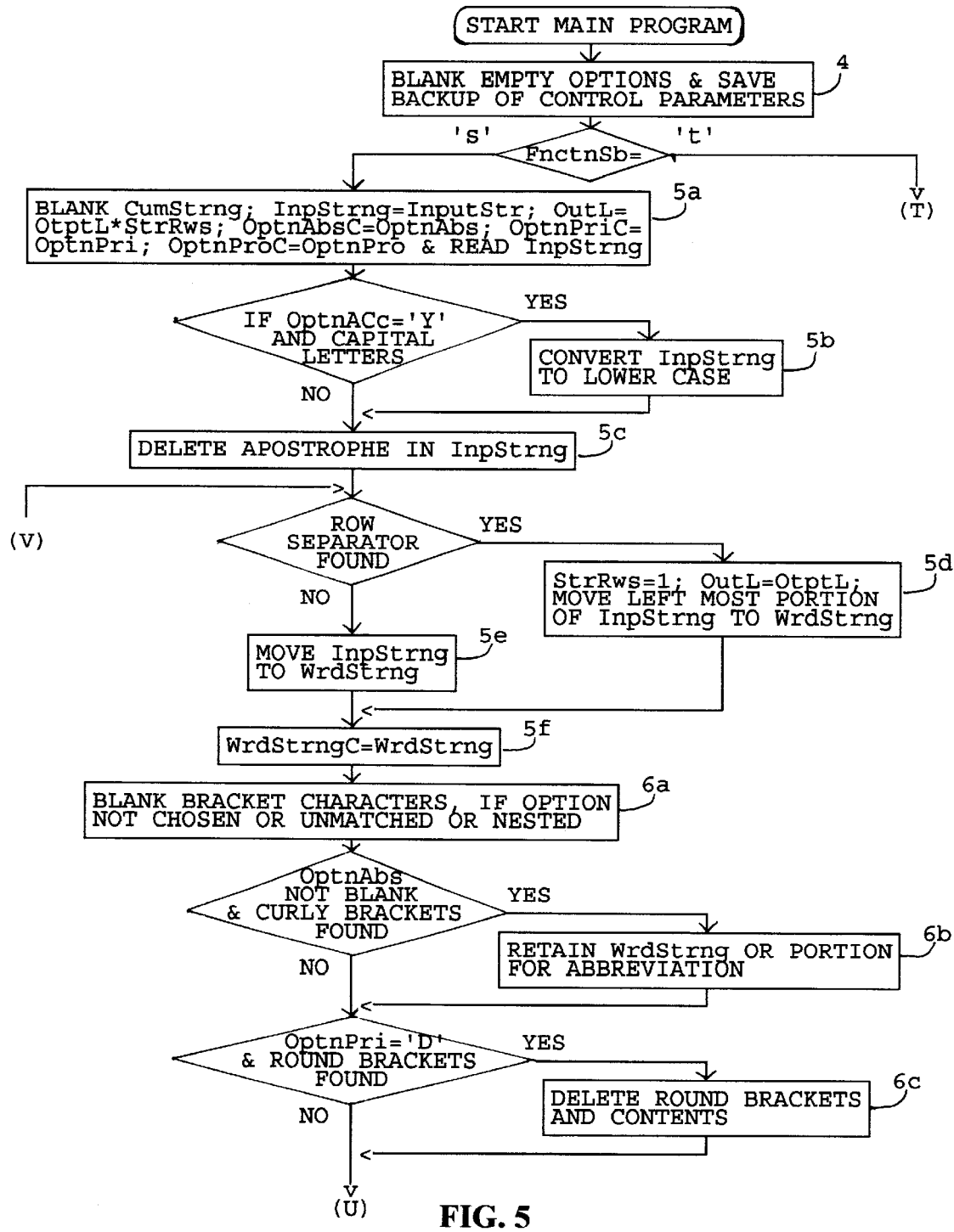
FIG. 5 is a flow chart representation of the Main subroutine 1271 within abbreviation function 127 as it relates to abbreviation of text string or word.

This method is illustrated in FIG. 5

The abbreviation methods of the invention use related entries in records of file:AbData and the pre-defined characters passed in the parameters:PndStrng, LAdStrng and NDSStrng. The parameter list also includes certain parameters which indicate to the system what methods or control features the user has opted for. However, even if the user chooses certain options, in the absence of related entries in file:AbData and parameters:PndStrng, LAdStrng and NDSStrng, the options are not effective. To prevent wasteful processing, the system, checks for and blanks the 'empty' options, at the outset. A backup of the control parameters is made so that later the original values can be restored, if required 4.

For abbreviation of text file (i.e., if parameter:FnctnSb= 't'): the system skips to Method 10.

Method 5: String Initial Steps, Separation and Movement to WrdStrng

This method is illustrated in FIGS. 5, 15 and 16.

An input text string may be abbreviated into a single row string or a string comprising multiple rows. Abbreviation of input text string into multiple row string is covered by two options:

i) Manual separation—i.e., delimitation of input text string into several portions by the user using a unique row separator character (i.e., vertical bar '|'), before calling the abbreviate function.

ii) Automated system separation of input text string into predetermined number of rows (StrRws).

In the former option each separated portion is processed separately to the desired row width (OtptL). Each separate abbreviated output is then accumulated into a string (CumStrng) separated with system supplied row separator (s).

In the latter option the unseparated input text string is first processed as a whole upto and including Method 16, before system placement of row separators (using Methods 17 and 31). The number of row separators is one less than the desired number of several rows (StrRws).

For the control of processing of input text string as a whole before system placement of row separators, it is necessary to set desired output length limit, OutL=OtptL*StrRws. After placement of row separators, input text string is recycled back to Method 5 and each portion of the string is processed separately to the desired row width (OtptL) as in the former option. In this latter option also, each separate abbreviated output is accumulated into CumStrng, separated with system supplied row separators.

In the initial steps, the contents of input text string parameter (InputStr) are moved to a separate input processing string (InpStrng) in which the initial steps of abbreviation are executed. If option for conversion of all capital letters input to lower case is chosen (i.e., OptnACc='Y') and if all alphabet characters are capital letters all capital letters are converted to lower case. All apostrophes are deleted from the InpStrng.

The initial steps are concluded by moving the whole or each separate portion of InpStrng to word (or basic element) separation and processing string (WrdStrng), left justified. The WrdStrng is also copied to WrdStrngC so that in case the processing has to be aborted and tried afresh, the WrdStrng is available in original form.

The specific steps of the method, designated (a) to (f), are:
a) Blanking CumStrng;
   Copying InputStr to InpStrng and setting OutL=OtptL, if StrRws=1; Else OutL=OtptL*StrRws
   If OptnAbs is not blank: Setting OptnAbsC=OptnAbs;
   Note: This is done to hold a copy of the parameter value intact while OptnAbs parameter value may be changed from 'X' to 'Y' or 'Y' to 'Z'. The need for change in OptnAbs parameter value arises, if OptnAbs='X' or 'Y' and the InpStrng cannot be abbreviated to the OutL limit without resorting to word truncation.
   Similarly, setting OptnPriC=OptnPri and OptnProC=OptnPro to have backups in case the paramater values are changed in process 5a.
b) If OptnACc='Y' and InpStrng has all alphabets in capitals: converting InpStrng to lower case 5b.
   Note: The abbreviation methods are ineffective in any input text string which consists of all capital letters, unless OptnACc='Y'.
c) Deleting apostrophe from InpStrng 5c.
d) Locating within InpStrng row separator—i.e., vertical bar character '|'—and, if found, setting StrRws=1 & OutL=OtptL; and moving each separate portion of InpStrng to WrdStrng 5d.
e) If row separator is not found, then moving the whole of InpStrng to WrdStrng, left justified 5e.
f) Setting WrdStrngC=WrdStrng 5f.

Method 6: String Brackets Handling
   This method is illustrated in FIGS. 5, 13 and 15.
   For abbreviating text string, delimited segment options include:
i) OptnAbs (abstract segment):
   A matched pair of unique delimitation characters—i.e., curly brackets—not nested within any matched pair of unique characters, containing a substantially and intellectually concised abstraction (comprising one or more words—preferably abbreviatable) of the text string and suffixed to that string for:
   a) If OptnAbs='X': abbreviating the entire string, including the portions contained within curly brackets. If the desired output length limit (OutL) is not reached without resorting to word truncation, OptnAbs is set to 'Y' and abbreviation of the string is tried afresh.
   b) If OptnAbs='Y': retaining and abbreviating the string, excluding the curly brackets and their contents. If OutL limit is not reached without resorting to word truncation, OptnAbs is set to 'Z' and abbreviation of the string is tried afresh.
   c) If OptnAbs='Z': retaining and abbreviating only the contents of the curly brackets.
ii) OptnPro (protected segment):
   A matched pair of unique delimitation characters—i.e., square brackets—not nested within any other matched pair of square or round brackets, delimiting the segment(s) of string to be protected from abbreviation until final truncation (i.e., Method 27)
iii) OptnPri (prioritized segment):
   A matched pair of unique delimitation characters—i.e., round brackets—not nested within any other matched pair of square or round brackets, delimiting the segments of string to be prioritized for:
   a) If OptnPri='D': deleting completely.
   b) If OptnPri='I': truncating words to bare initial, excluding pre-defined non-deletable characters.
   c) If OptnPri='T': truncating words upto a predetermined minimum truncated word length limit (MnTrL), excluding pre-defined non-deletable characters.

The specific bracket handling steps for text string abbreviation, designated (a) to (c), are:
a) Blanking the bracket character if corresponding delimited segment option is not chosen—i.e., curly brackets for OptnAbs, square brackets for OptnPro and round brackets for OptnPri; and blanking all occurrences of unmatched brackets; and blanking any bracket character found within a pair of matched curly brackets; and blanking any bracket character found within a pair of outer most (round or square) matched brackets 6a.
   Note: This is done to give precedence to the outer pair of brackets.
b) Retaining entire WrdStrng or portion for abbreviation, if containing pair of curly brackets as follows 6b:
   If OptnAbs='X': entire WrdStrng, left justified.
   If OptnAbs='Y': after deleting the curly brackets and contents from WrdStrng, left justifying the remaining portion(s).
   If OptnAbs='Z': after deleting all but the contents of curly brackets from WrdStrng, left justifying the remaining portions and setting OptnAbs=blank.
c) If OptnPri='D' and if matching pair(s) of round brackets found: deleting the round bracket pair(s) and contents (one pair and contents at a time) from the right end, until OutL limit is reached 6c.

Method 7: Deletion of Punctuation
   This method is illustrated in FIGS. 6, 13, 15 and 16.
   Occurrence of punctuations matching any of those contained in PndStrng is replaced with space within WrdStrng, except within protected segments (i.e., contained within square brackets) with OptnPro='Y'7.

Figure 6:
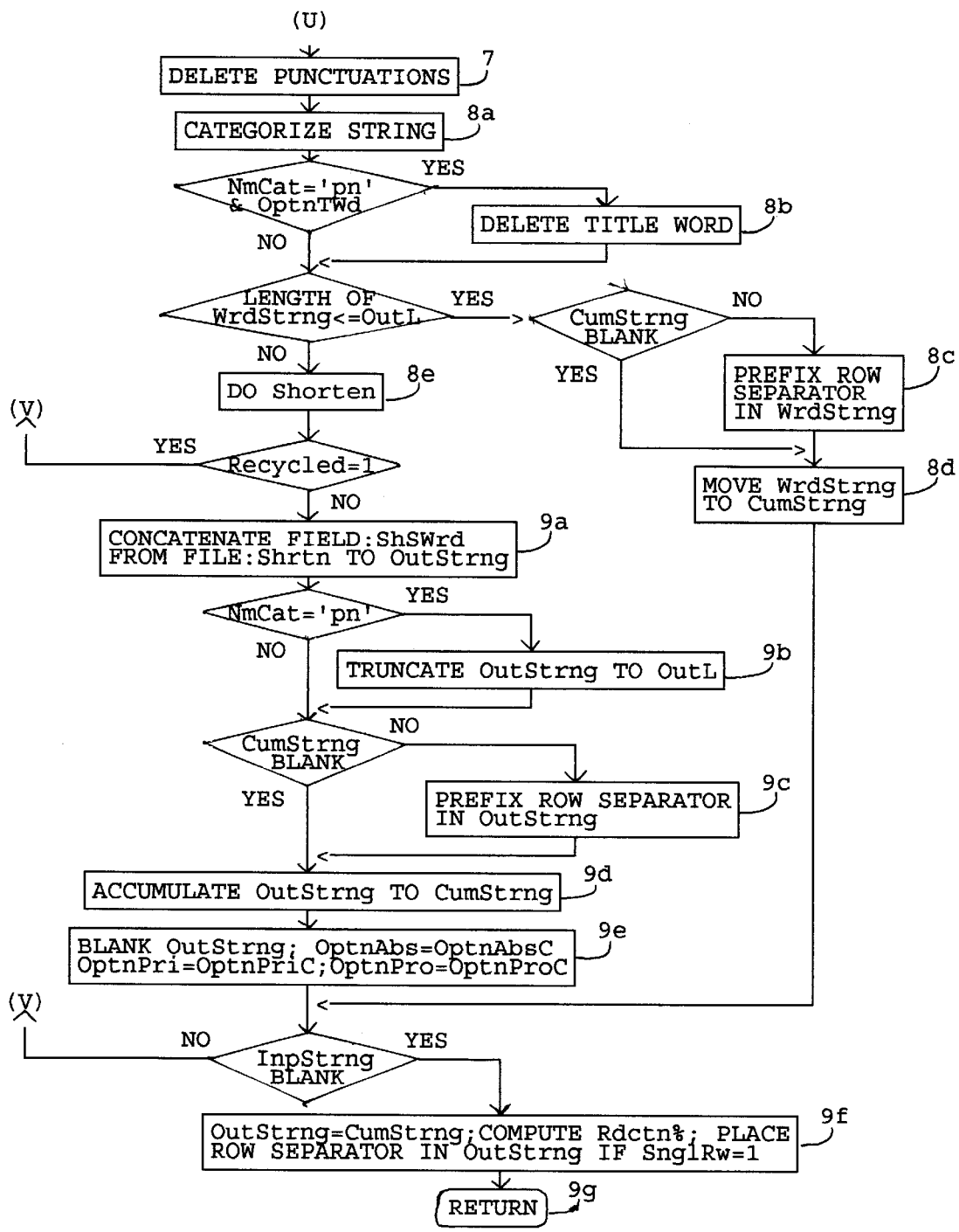
FIG. 6 is a continuation of the flow chart representation from FIG. 5.

Method 8: String Categorization
   This method is illustrated in FIGS. 6 and 15.
   File:AbData is accessed and searched for a record with field:AbAR=3 and field:AbPhwd matching the left end of WrdStrng. If a match is found the WrdStrng is categorized as personal name by setting memory variable NmCat='pn' 8a.
   If deletion of personal name title word is chosen (i.e., OptnTWd='Y'), then the title word is deleted from WrdStrng 8b.
   If the length of WrdStrng<=OutL:

i) if CumStrng is not blank: prefixing a row separator in WrdStrng 8c, ii) moving WrdStrng directly to CumStrng 8d, iii) if InpStrng is not blank: cycling back to Method—step 5d or 5e, else transferring control to Method—step 9f, Else if the length of WrdStrng>OutL: calling the Shorten subroutine (Methods 13 to 27) 8e.

Method 9: String Output Steps

This method is illustrated in FIGS. 6, 11, 12, 13, 14, 15 and 16.

On returning from Shorten subroutine, if the variable: Recycled=1: it is set to zero and control is transferred back to Method-step 5d or 5e.

File:Shrtn is accessed sorted in ascending order of field: ShSq and each record is read. After reading each record, ShSWrd is concatenated to variable:OutStrng, ensuring that if a ShSWrd contains a protected segment (i.e., ShAR=22) and OutStrng is not blank, the first character of ShSWrd (if an alphabet) is converted to upper case, before concatenation.

Accordingly, the specific string output steps, designated (a) to (g), are:

a) Concatenating ShSWrd from each record of file:Shrtn to OutStrng as explained hereinbefore 9a.

b) If NmCat='pn': truncating OutStrng to OutL 9b.

c) If CumStrng is not blank: prefixing a row separator to OutStrng 9c.

d) Accumulating OutStrng to CumStrng 9d.

e) Blanking OutStrng and setting OptnAbs=OptnAbsC, OptnPri=OptnPriC and OptnPro=OptnProC 9e.

f) If InpStrng is not blank: transferring control back to Method-step 5d or 5e to abbreviate the next separated portion;

else if InpStrng is blank: moving CumStrng to OutStrng; computing Rdctn% using the formula:

$$Rdctn\% = (1-(\text{length of OutStrng/length of InputStr}))*100;$$

and if SnglRw=1 : placing row separators to separate the OutStrng into StrRws number of output rows of equal length (i.e., OtptL) 9f.

g) Terminating the program and returning the abbreviated text string with Rdctn% 9g.

Method 10: Text File Initial Steps

Figure 7:
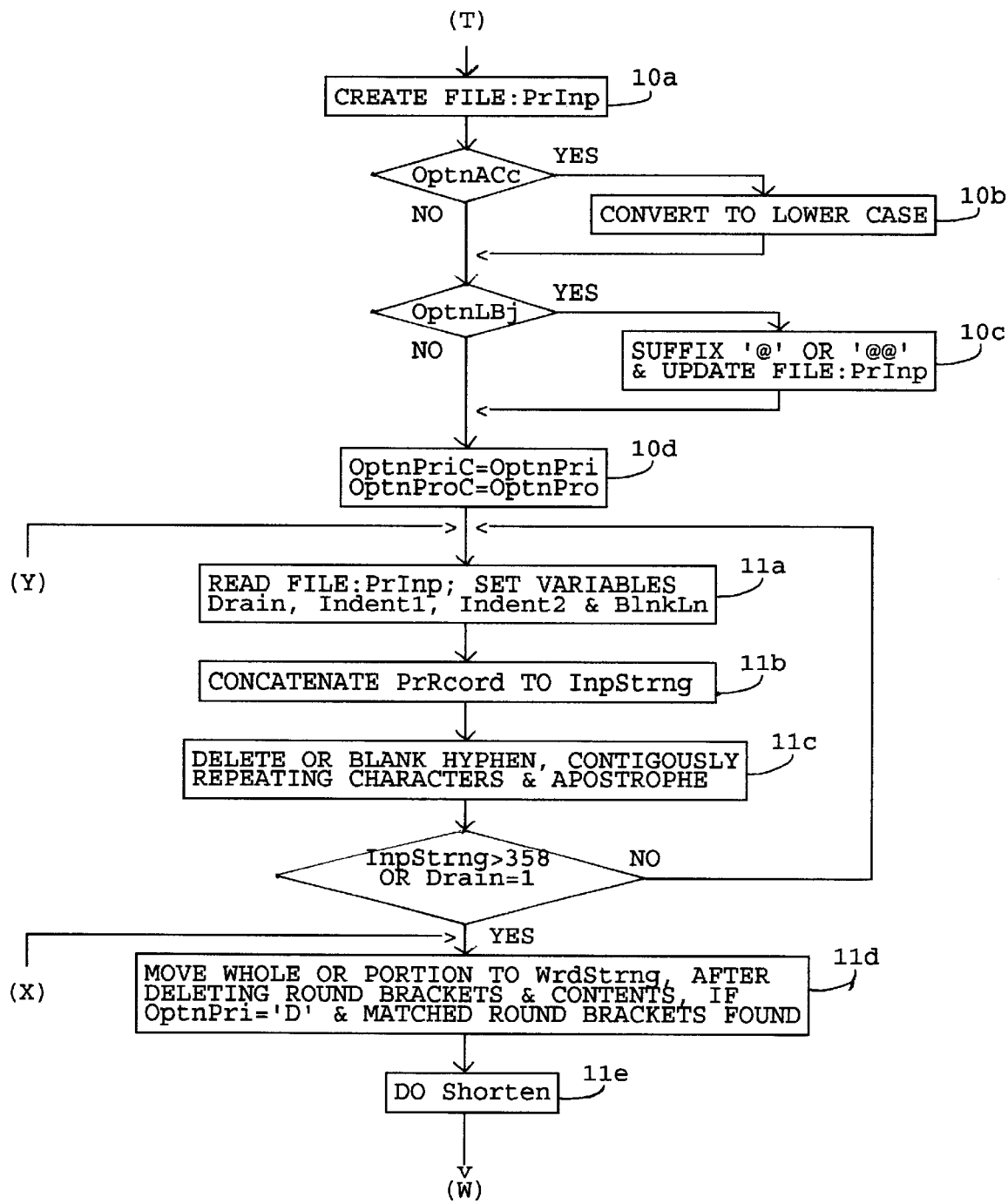
FIG. 7 is a flow chart representation of the Main subroutine 1271 within abbreviation function 127 as it relates to abbreviation of (multiple line) text, branching off from FIG. 5.

This method is illustrated in FIG. 7

One of the concerns in abbreviation of text file is reproduction of paragraph and item patterns with indentation and intervening blank lines. The file:PrInp is structured to take care of reproduction of the patterns of paragraphs and items with indentation and intervening blank lines. Each record in file:Input is read in data file sequence, copied to field:PrRcord and the record is appended to file:PrInp. Thereafter each record in file:PrInp is read and classified and the fields:PrTyp & PrIndSpc in file:PrInp are updated. The valid PrTyp entries are:

F=first record in block,

Note: The concept of blocks of records is explained hereinafter.

S=single (i.e., first and last) record in block,

I=intervening record in block,

L=last record in block and

B=blank record between blocks.

If input file contains sequences of more than one blank lines, only one blank line from each such sequence is copied to file:PrInp.

The records in file:PrInp may be considered as separate blocks of records, each block within file:PrInp starting with a first record being:

i) the first record of the file, ii) any record immediately following a blank record, iii) any record immediately following a record which has a line break or iv) any record which has an indentation change from the preceding record, provided the preceding record is not the first record of the block;

and ending with a last record being:

i) the last record of the file, ii) any record immediately preceding a blank record or iii) any record which has a line break.

A line break is recognized, at the end of current record, if the first word (or basic element) of the next record (together with a leading space) fits in within the current record without exceeding InptL parameter. Indentation change from the first record of a block to the second record of the block is not considered as an indentation change because such change is customary in the second line of a paragraph or a numbered item of a series of items. A record preceded and succeeded by line breaks or blank lines is considered as a first and last record in itself—i.e., a single record block.

The abbreviation methods are ineffective on input text file if consisting of all capital letters, unless OptnACc is chosen. To render the methods effective it is necessary to convert all upper case alphabets, except the first alphabet of each sentence, to lower-case alphabets. If OptnACc='Y' and the input file has all capital records, only those records which occur in a contiguous sequence of more than one all capital records are converted to lower case. Thus a fully capitalized title in a single line is not converted to lower case and is outputted as it is without abbreviation. The system does not convert partial capital letter sequences contained within each record of file:PrInp, so that highlighted portions or acronyms are not changed or abbreviated.

If reproduction of line breaks, blank lines and indentation changes is not desired, the option for joining line breaks may be chosen (i.e., OptnLBj='Y'). If this option is chosen, a unique character—i.e., '@'—is suffixed to each last record of each block, except to that of the last block of the file. One more of the unique character is suffixed to the last record if it is followed by a blank line. The blank record itself is deleted from file:PrInp. All records other than the first record and the last record of file:PrInp are updated with PrTyp set to 'I' (i.e., intervening record). The field:PrIndSpc is set to 0 (i.e., no indentation) in all records of file:PrInp. As a result all the records of file:PrInp are processed as a single block.

The specific steps of the method, designated (a) to (d), are:

a) Creating file:PrInp by copying each record from file:Input in sequence to field:PrRcord, classifying the records using field:PrTyp, holding the left indentation space of the record in field:PrIndSpc and appending each record to file:PrInp 10a.

b) If OptnACc='Y' and if a sequence of more than one record has all capital letters: converting all alphabets, except the initials of each sentence, to lower case 10b.

c) If OptnLBj='Y': setting PrTyp=I for all records, except the first and last record of file:PrInp, setting PrIndSpc=0 for all records of the file, suffixing '@' sign to all records in file:PrInp with PrTyp='L' or 'S', suffixing another '@' sign if any of these records is followed by a blank line, and deleting the blank line 10c.

d) Setting OptnPriC=OptnPri and OptnProC=OptnPro to have backups in case the parameter values are changed in subsequent recursive method-steps 10d.

Method 11: Text File InpStrng Building & Movement to WrdStrng

This method is illustrated in FIG. 7.

The system processes each block of records from file::PrInp and outputs it completely before processing the next block. While processing a block, if the last record of a block has been read from file:PrInp a variable:Drain is set to 1 to signal that no record of the next block is to be read until the current block is fully processed and outputted. If a block is followed by a blank line a variable:BlnkLn is set to 1 to signal that a blank line is to be outputted before outputting the records of the next block.

The processing of each block involves concatenation and accumulation of records from file:PrInp to an input processing string (InpStrng) and movement of portions of InpStrng to WrdStrng.

The system uses WrdStrng to facilitate discrimination and categorization of each word (or basic element). Some important concerns in selecting a position within InpStrng to break and transfer the preceding portion to WrdStrng are:
i) to ensure that segments of text which are enclosed within matching pairs of delimiting brackets are processed as a whole, unbroken,
ii) to ensure that word sequences, which could be potential phrases, are not split,
iii) to augment the InpStrng such that the probability of finding matching pairs of delimiting brackets is enhanced and
iv) not to unduly fragment the InpStrng for WrdStrng processing.

This is taken care of by looking for opening brackets or sequence of non-alphabet character(s) (except the more frequently occurring comma and intervening space) for determining the breaking position.

For text file, bracket delimited segment option parameters include:
i) Protecting the contents of square brackets unabbreviated (OptnPro) and
ii) Prioritizing deletion of contents of round brackets, including the brackets (OptnPri).

The options are to be executed only if matching pair of opening and closing brackets of the same type is located. This requires that each sequence is checked for equal number of opening and closing brackets. Further, if a pair of square brackets (i.e., outer pair) includes within itself a pair (i.e., nested pair) of round brackets or vice versa, then the outer pair of brackets is given precedence.

The InpStrng is first checked for opening brackets. If OptnPri='D' and matching pair of round brackets is found, then the matched pair of round brackets and their contents are deleted. If OptnPro='Y' and matching pair of square brackets is found, the matching pair of square brackets and their contents, together with the preceding portions of InpStrng, are moved to WrdStrng. If OptnPro='Y' or OptnPri='D' and matching pair of round or square brackets is not found, then the whole of InpStrng is moved to WrdStrng and OptnPro or OptnPri is blanked, as the case may be.

If OptnPro or OptnPri is blank, then the InpStrng is searched for occurrence of a sequence of one or more non-alphabet characters (including all punctuation except comma), ignoring intervening spaces. If non-alphabet sequence is found, then the left portion of InpStrng, including non-alphabet sequence, is moved to WrdStrng. Else if sequence of one or more non-alphabet characters, ignoring intervening spaces, is not found, then the whole of InpStrng is moved to WrdStrng.

After the whole or a portion of InpStrng is transferred to WrdStrng, the system calls the Shorten subroutine (Methods 13 to 27).

The specific steps of the method, designated (a) to (e), are:
a) Reading in sequence each record from each block of file: PrInp and setting variable:Drain=0; and other variables as follows 11a:
  i) If PrTyp='F': setting Indent1=PrIndSpc and Indent2= PrIndSpc of next record in file:PrInp.
  ii) If PrTyp='S': setting Drain=1, Indent1=PrIndSpc and Indent2=Indent1.
  iii) If PrTyp='L': setting Drain=1.
  iv) If PrTyp='B': setting BlnkLn=1 (to indicate that a blank line is to be added before adding next record to output file) and reading the next record.
b) Concatenating the current PrRcord to InpStrng for further processing 11b.
c) Deleting hyphen at the end of InpStrng, if preceded by a lower-case alphabet and next PrRcord has a lower-case alphabet as its first character; replacing intervening hyphens with a space, if immediately preceded and succeeded by alphabets; deleting characters repeating contiguously more than once within InpStrng, provided the repeating characters are not alphabets, numerics and brackets, and deleting apostrophe in InpStrng 11c.
d) While length of InpStrng>358 or Drain=1: moving the whole or portions of InpStrng to WrdStrng (as explained hereinabove), after deleting matched pair of round brackets and their contents, if OptnPri='D' and matched round brackets found 11d.
e) If WrdStrng is not blank: calling the Shorten subroutine (Methods 13 to 27) to abbreviate the WrdStrng 11e.

Method 12: Text File Output Steps

Figure 8:
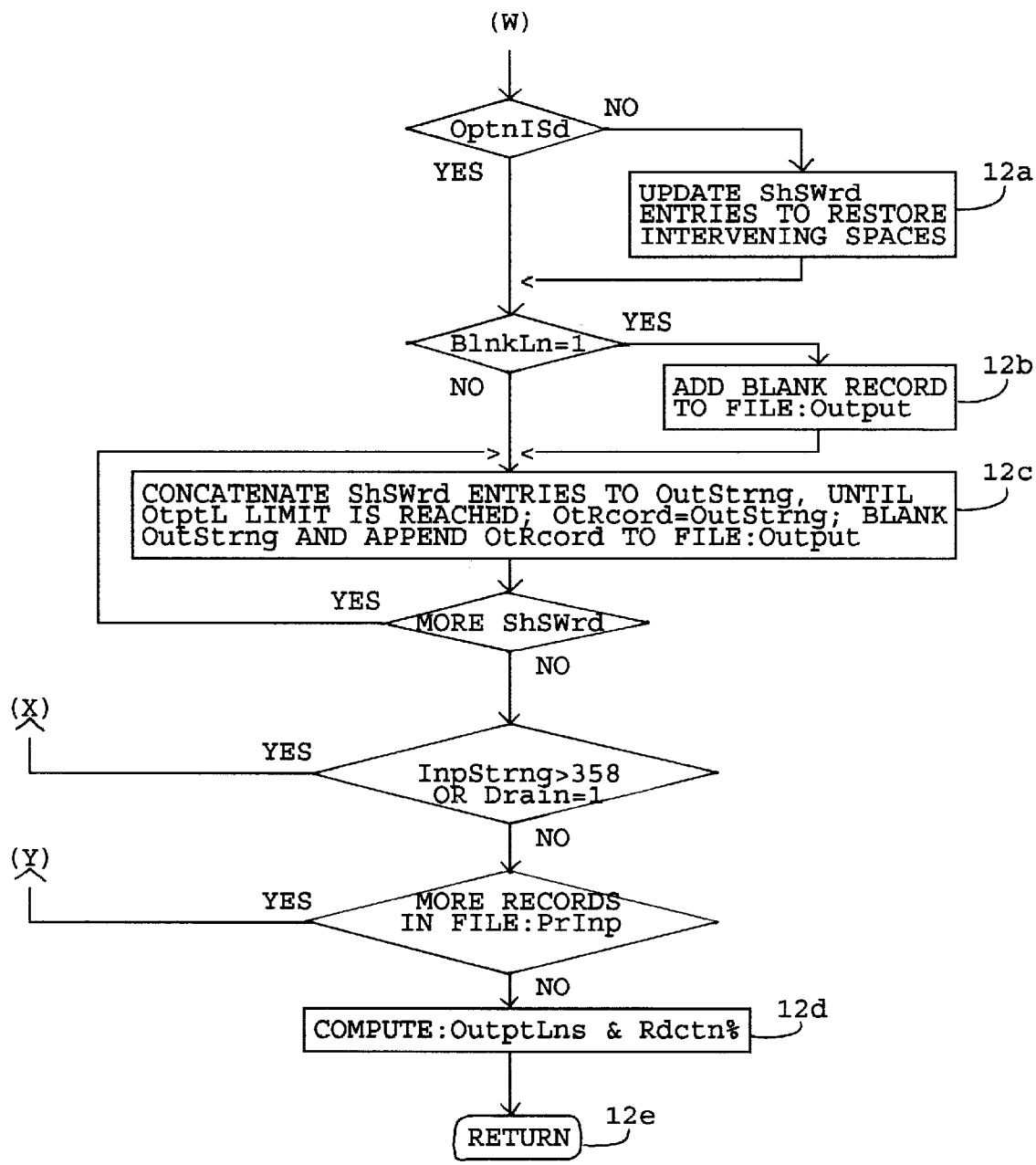
FIG. 8 is a continuation of the flow chart representation from FIG. 7.

This method is illustrated in FIGS. 8, 19 and 20.

On returning from the Shorten subroutine, the system checks if the deletion of intervening space option (OptnISd) is chosen. If the option is not chosen: records in file:Shrtn, having ShAR=4, 6 or 20, are updated with ShCap=1. The system then reads all records in file:Shrtn sorted in ascending order of field:ShSq and if in any record field:ShCap=0, converts the upper case initial of ShSWrd to lower case and updates the record in file:Shrtn. If 1st character of ShSWrd is an alphabet and last character of ShSWrd in previous record is an alphabet or '.' or ShAR=22, then a leading space is prefixed to ShSWrd and the record is updated in file:Shrtn.

If BlnkLn=1, a blank record is added to file:Output and BlnkLn is set to 0. File:Shrtn is accessed sorted in ascending order of field:ShSq, each record read and ShSWrd concatenated to OutStrng, while the length of OutStrng (excluding trailing spaces) does not exceed OtptL. If first output record of current block of input lines is being concatenated in OutStrng, the OutStrng is prefixed with indentation spaces= Indent1 and for the subsequent records the OutStrng is prefixed with indentation spaces=Indent2.

If word/element in field:ShSWrd of next record cannot be accommodated in OutStrng (i.e., within OtptL limit) OtRcord is set to OutStrng. So also if Drain=1, InpStrng is blank and ShSWrd from the last record is concatenated, OtRcord is set to OutStrng. Thereupon, OtRcord is appended to file:Output and OutStrng is blanked.

If there are more ShSWrd entries in file:Shrtn they are concatenated to OutStrng as explained hereinbefore before proceeding further. If length of InpStrng>358 or Drain=1, control is transferred to Method-step 11d. Else if there are more records in file:PrInp to be processed, OptnPri is set to OptnPriC, OptnPro is set to OptnProC and control is transferred to Method-step 11a.

Finally, the number of lines in output text file (OutptLns) are counted and reduction percentage of the input (Rdctn%) is computed using the formula: Rdctn%=(1−(cumulative length of output records/cumulative length of input records))*100, and the abbreviation methods are terminated.

The specific steps of the method, designated (a) to (e), are:
a) Updating field:ShSWrd in file:Shrtn records to restore intervening spaces 12a.
b) If BlnkLn=1: adding a blank record to file:Output 12b.
c) Concatenating ShSWrd from file:Shrtn records to OutStrng with indentation spaces prefixed, subject to OtptL limit;
setting OtRcord=OutStrng and blanking OutStrng; and appending OtRcord to file:Output 12c.
d) If more records in file:Shrtn: transferring control back to Method-step 12c;
if length of InpStrng>358 or Drain=1: transferring control to Method-step 11d;
if more records in file:PrInp to be processed:
transferring control to Method-step 11a; and
computing OutptLns and Rdctn% 12d.
e) Exiting from abbreviate function and returning to calling program 12e.

(Start of SHORTEN Subroutine)
Method 13: Word or Basic Element Separation & Transfer for Shortening This method is illustrated in FIGS. 9, 11, 12, 13, 14, 15 5 and 16.

The system recognizes occurrence of word (or basic element) in WrdStrng as follows:
If first character in Wrdstrng (i.e., of word) is an alphabet, that word ends with the character immediately preceding the next located space or non-alphabet character.
Else if first character in Wrdstrng is a opening square bracket and OptnPro='Y', then the corresponding closing square bracket is located and the contents of the square brackets are recognized as a non-abbreviatable element (i.e., protected segment).
Else if first character in Wrdstrng (i.e., of basic element) is a non-alphabet, that element ends with the character immediately preceding the next located space or alphabet character.

The categories of word (or basic element) as defined hereinbefore are:
i) Protected segment, if OptnPro='Y'.
ii) Abbreviatable word.
iii) Non-abbreviatable word.
iv) Opening or closing round bracket, if OptnPri='D', 'I' or 'T'.
v) Non-alphabet sequence.

The following memory variables temporarily hold the processing information for updation of fields:ShSWrd, ShRS, ShAR and ShCap in file:Shrtn.
i) MvStrng—holds the separated word (or basic element).
ii) MvRS—indicates whether the categorized word is open to reduction (i.e., to shortening methods and abbreviation replacement methods).
iii) MVAR—indicates whether the categorized word is open to truncation.
iv) MvCap—indicates if the initial of the word is an upper case alphabet.

Only abbreviatable words are marked as open for reduction with MvRS set to 1. Other basic elements are identified and marked as not open for reduction with MvRS set to 0 and not open for truncation with MVAR set to 20 or 22, if protected segment. If option for barring words from abbreviation (OptnAbB) is chosen and the word is found in field:AbPhWd in any record of file:AbData with field:AbAR=1, or the word is an acronym or word abbreviation (i.e., matches the string in field:AbAbrv in any record of file:AbData with field:AbAR=4, 5, 6 or 7), the word is also marked as not open for reduction with MvRS set to 0 and not open for truncation with MVAR set to AbAR.

At the outset file:Shrtn is emptied. Further specific steps of the method, designated (a) to (h), are:
a) Reading WrdStrng from the left end and deleting leading space 13a.
b) Separating, moving to MvStrng and categorizing each word (or basic element) of WrdStrng 13b.
c) If (i) FnctnSb='t', (ii) OptnISd is blank and (iii) the word is an abbreviatable word with initial letter in upper case: setting MvCap=1 13c.
d) If the initial of abbreviatable word is lower case: converting the initial to upper case 13d.
e) If FnctnSb='t' and non-abbreviatable word is preceded by any other word, with the case status of the initial of the non-abbreviatable word being the same as that of the last alphabet of the preceding word: prefixing non-abbreviatable word with a leading space 13e.
f) Marking words (or basic elements) as open for reduction with MvRS=1 or not open for reduction with MvRS=0 and setting MvAR to AbAR or other values apart from default 0 (zero), as explained in detail hereinbefore 13f.
g) Moving contents of MvStrng, MvRS, MvAR and MvCap into correponding fields and appending records to file:Shrtn by calling Move subroutine 13g.
h) If WrdStrng is not blank: transferring control back to Method-step 13a.

Figure 9:
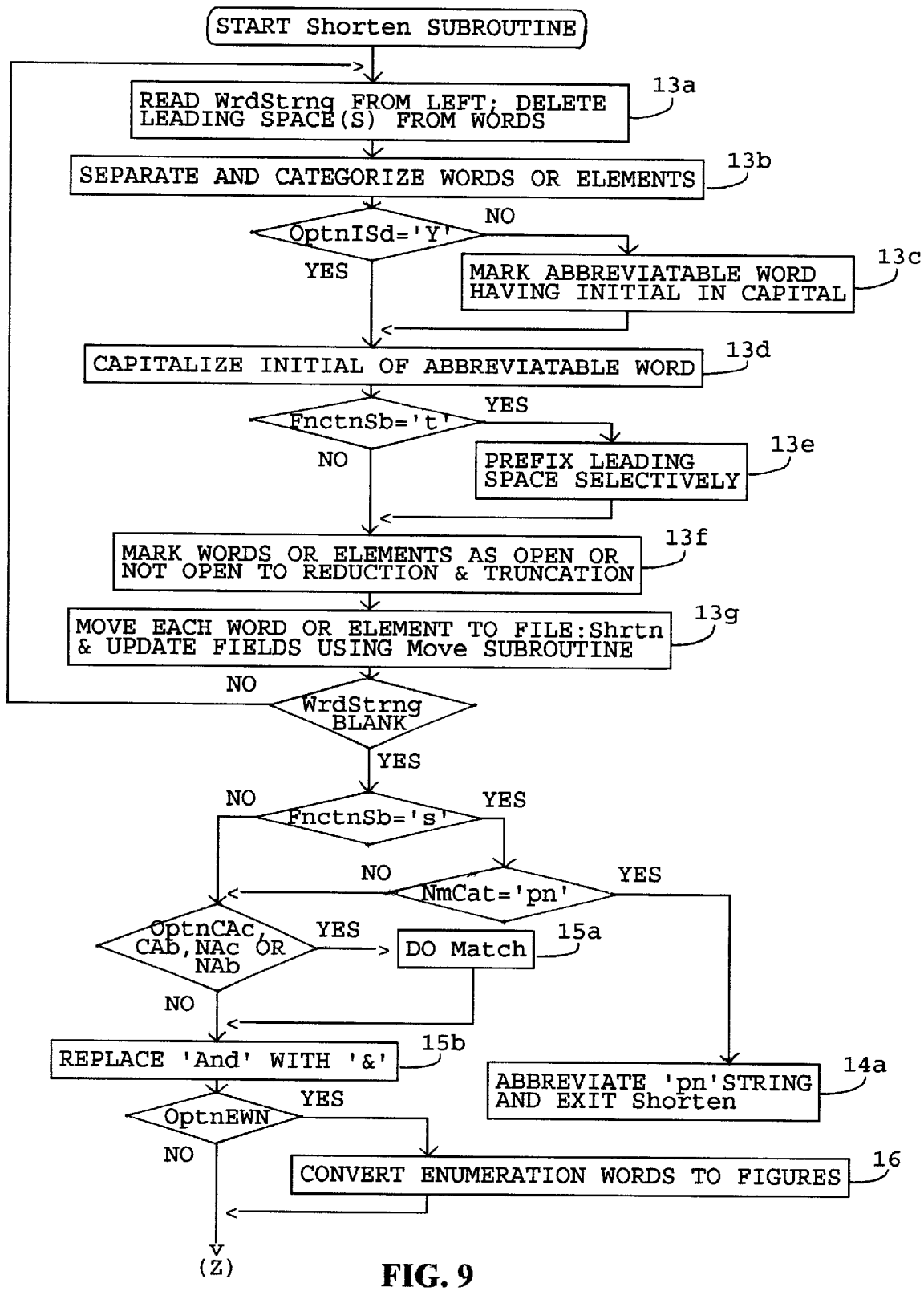
FIG. 9 is a flow chart representation of the Shorten subroutine.

Method 14: Processing of Personal Name Strings
This method is illustrated in FIGS. 9 and 15.

This method is not applicable if abbreviating text file or if string or separated portion is not a personal name (i.e., if NmCat< >'pn').

The system accesses file:Shrtn. If OptnTWd=blank, the title word record in file:Shrtn is marked as not open for reduction and truncation by setting ShRS=0 and ShAR=3. If the maximum number of personal name words (MxPNWds) limit is exceeded the records open for reduction are deleted from file:Shrtn starting from end of file, until the number of records is brought within limit. Thereafter, field:ShSWrd in any record with field:ShRS=1, except the first record normally holding surname, is truncated to bare initials. The sum of SWrdLen (length of ShSWrd) of all records in file:Shrtn (i.e., TotLen) is updated. ShSWrd in the record holding surname is truncated, subject to PNFWdL (i.e., not less than personal name first word length) limit, while TotLen>OutL. Processing of personal name string stops at this stage and the Shorten subroutine is exited 14a.

Method 15: Acronym & Word Abbreviation Matching, Replacement or Retention
This method is illustrated in FIGS. 9, 13, 14 and 16.

If a text string is being processed then, TotLen is required to be brought within desired output length. limit (OutL) but not lower. There are no such minimum and maximum restrictions for text file which may include any number of output records and the shortening process continues until all options are exhausted. If FnctnSb='s': TotLen is updated from file:Shrtn.

If option(s) for compulsory acronym replacement (OptnCAc), need based acronym replacement (OptnNAc), compulsory abbreviation replacement (OptnCAb) or need based abbreviation replacement (OptnNAb) are chosen: a common Match subroutine (Method 29) is called for compulsory and need based acronym and word abbreviation search, replacement or retention 15a.

In file:Shrtn, if a record is found with field:ShSWrd='And' and field:ShSWrd in preceding and succeeding records does not contain enumeration words (i.e., words matching those in records of file:AbData with field:AbAR=2), the 'And' is replaced with '&' and the record is updated with ShRS=0 and ShAR=20. Else if field:ShSWrd='And' in any record and field: ShSWrd in preceding and succeeding records contains enumeration words, then the record is updated with ShAbrv='&', ShRS=1 and ShAR=2 15b.

Method 16: Enumeration Words to Numerics Conversion

This method is illustrated in FIGS. 9, 14, 15, 19 and 20.

This method is not executed if OptnEWN=blank or (FnctnSb='s' and TotLen<=OutL).

This method converts enumeration word sequences to sequences of numeric characters using a string manipulation approach (i.e., not mathematical) as described hereinafter 16.

Unlike the enumeration word sequences, the converted sequences of numeric characters can be arithmetically manipulated (i.e., added, subtracted, multipled and the like). In case of single word numeric, replacement of word with corresponding digit(s) gives the correct conversion (e.g., 'Two' gives '2', 'Twenty' gives '20' etc) but in case of multiple word numeric sequences such replacement is not enough (e.g., 'Twenty Two' gives '202'). In such cases the extra zero(s) have to be removed. In enumeration word sequences of large numbers, bundle words such as 'Thousand', 'Million' etc may occur. These bundle words, essentially, represent a series of zeros—i.e., they have to be replaced with the appropriate series of zeros. The details regarding removal of excess zeros and addition of missing zeros are explained in the detailed descriptions hereinafter. If a bundle word such as 'Million' occurs at the end of an enumeration word sequence, then replacing the bundle word with it's bundle word abbreviation—e.g., 'Mn'—saves more space rather than replacing it with ',000,000'. This abbreviation method can abbreviate enumeration word sequences expressed in varying styles by different people (see examples given hereinafter). Also, the system can detect whether an enumeration word sequence is invalid for abbreviation using the method described hereinafter—e.g., 'Four Hundred Fifty Twenty'.

The method comprises the following specific steps, designated (a) to (z), together with relevant explanations and notes:

a) Replacing enumeration words with abbreviations:
   Accessing file:Shrtn and reading each record.
   If ShRS=1 accessing file:AbData and locating and reading any record with AbAR=2 and AbPhWd=ShSWrd. Setting ShAbrv=AbAbrv and ShAR=2. If AbAbrv is a bundle word abbreviation (i.e., 'Tr', 'Bn', 'Cr', 'Mn', 'Lk', 'Lc' or 'Th') setting ShSWrd=AbAbrv. Updating record in file: Shrtn.
   Note: In case abbreviation of a numeric sequence is aborted (due to invalid enumeration word sequence) as explained hereinafter in some of the steps of this method, the bundle words are left in abbreviated form.
b) The word abbreviations in file:Shrtn corresponding to bundle words (i.e., thousand, lakh, million, etc) are further replaced with figure—i.e., sequences of punctuation and zeros. Replacement of bundle word abbreviation with figure depends on it's combination with the next bundle word abbreviation to the right. If there is no bundle word abbreviation to the right then it depends on itself.

e.g.,
   1) the enumeration word sequence "Four trillion sixteen million" after abbreviation word replacement becomes "4 Tr 16 Mn". The bundle word abbreviation 'Mn'is not replaced with figure since there is no bundle word abbreviation or other enumeration word abbreviation to it's right. But the bundle word abbreviation 'Tr' gets replaced with ',000,'since 'Mn' is the next bundle word abbreviation to it's right.
   2) the enumeration word sequence "sixteen million five" after abbreviation word replacement becomes "16 Mn 5". The bundle word abbreviation 'Mn' is replaced with ',000,' since there is a non-bundle enumeration word abbreviation to it's right.

Specifically the substeps are:
   i) Accessing file:Shrtn sorted in descending order of field:ShSq and reading each record starting with the first record.
   ii) Reading next record until end of file.
   iii) If ShAR=2
      Set variable:PrvBndl='- -'
   iv) If ShAbrv contains any numeric digit and PrvBndl='- -'
      Set PrvBndl='00'
      Else if ShAbrv is one of 'Th;Mn;Bn;Tr;Lk;Lc;Cr'
      Set variable:CrntBndl=ShAbrv
      Set variable:JtBndl=CrntBndl without trailing spaces and PrvBndl concatenated to it.
      Depending upon the JtBndl, set ShAbrv to the appropriate figure as listed in TABLE 14:

TABLE 14

| If JtBndl is one of, | | | | | | Set ShAbrv, |
|---|---|---|---|---|---|---|
| ThTr | ThBn | ThMn | ThCr | ThLk | ThLc | .000 |
| TrBn | BnMn | MnTh | Th00 | | | , |
| TrMn | BnTh | Mn00 | | | | ,000, |
| TrTh | Bn00 | | | | | ,000,000, |
| BnCr | CrLk | CrLc | LkTh | LcTh | | ; |
| BnLk | BnLc | CrTh | | | | ;00; |
| Lk00 | Lc00 | | | | | ;00, |
| Cr00 | | | | | | ;00;00, |
| TrCr | | | | | | ,000; |
| TrLk | TrLc | | | | | ,000;00; |

Update field:ShAbrv in current record in file:Shrtn.
   Set PrvBndl=CrntBndl
   Reading next record in file:Shrtn if not end of file.
   If ShAR=2
   Transferring control to start of Substep (iv)
   Else if ShAR< >2
   Transferring control to Substep (ii)
   Else if ShAR< >2
   Transferring control to Substep (ii)
   Note: Joined bundle word abbreviations with '00' as last two characters (e.g., 'Th00' or 'Mn00') represent, in abbreviated form, the occurrence of the last bundle word in the enumeration words string together with the occurrence of numeric digit(s) to their right.

Further steps for conversion to final figure form are:
c) File:Shrtn is accessed sorted in ascending order of field:ShSq. The enumeration word abbreviations (i.e., numeric digits and alphabets) and sequences of punctuation and zeros (with all intervening and trailing spaces deleted) are concatenated from each (next) contiguous sequence of records (with ShAR=2) from file:Shrtn into a string variable:FgrStrng. If '&' is found after a bundle word abbreviation replacement in FgrStrng (i.e., after '00' or ',' or ';') then it is superfluous and is deleted. Otherwise the '&' is treated as a break in the enumeration words sequence—i.e., accumulation of subsequent enumeration words to FgrStrng is stopped—and FgrStrng is processed further with the accumulated words (excluding '&').

d) Moving all alphabet characters, at the right end of FgrStrng, to a variable:EndStrng, to accumulate the results of enumeration word processing.

e) Searching for a punctuation or a blank space in FgrStrng, starting from the right end.

f) If punctuation or blank space is located, then moving the portion to the right of the located character to variable:FgrSub (being a subset of FgrStrng) and moving the located character itself to a variable:Punctn.

g) If 1st and 2nd digits in FgrSub, from the left, are both zeros and 3rd digit is a non-zero numeric; then prefixing FgrSub with '1'.

h) Right aligning FgrSub.

i) If rightmost character in FgrSub is a non-zero numeric and character preceding is a zero(0), then deleting the zero and shifting all the characters preceding the deleted zero one position to the right.

If Punctn=',' or '.':

j) If 3rd and 4th digits, reckoned from the right end of FgrSub, are both zeros(00), then deleting the two zeros and shifting all the characters preceding the deleted zeros two positions to the right.

k) If number of numeric digits in FgrSub>3 (i.e., enumeration word sequence is invalid), then aborting the method for the current enumeration word sequence and transferring control to Method-step 16c.

l) Else if number of numeric digits in FgrSub is one, then prefixing numeric digit with two zeros, else if number of numeric digits in FgrSub is two, then prefixing numeric digits with one zero.

If Punctn=';':

m) If number of numeric digits in FgrSub>2 (i.e., enumeration word sequence is invalid), then aborting the method for the current enumeration word sequence and transferring control to Method-step 16c.

n) Else if number of numeric digits in FgrSub is one, then prefixing numeric digits with one zero. If Punctn=blank o) If 3rd and 4th digits, reckoned from the right end of FgrSub, are both zeros(00), then deleting both zeros and shifting all characters preceding the deleted zeros, two positions to the right.

p) If number of numeric digits in FgrSub>5 (i.e., enumeration word sequence is invalid), then aborting the method for the current enumeration word sequence and transferring control to Method-step 16c.

q) Else if number of digits in FgrSub=5
If the 4th digit, reckoned from the right end, is zero and 5th digit is a non-zero numeric, then deleting the 4th digit and shifting 5th digit one position to the 35 right.
Else (i.e., if enumeration word sequence is invalid) aborting the method for the current enumeration word sequence and transferring control to Method-step 16c.

r) Concatenating (Punctn, FgrSub and EndStrng), with all spaces deleted, to EndStrng.

s) If FgrStrng is not blank: transferring control back to Method-step 16e above, after blanking Punctn & FgrSub.

t) Replacing punctuations ';' and '.' with ',' in EndStrng.

u) If OptnEWN='X' or 'Z' and the rightmost numeric digit in EndStrng is suffixed with 'Th': replacing the suffix with ',000'.

v) If OptnEWN='Z':
If rightmost numeric digit in EndStrng is suffixed with 'Lk' or 'Lc': replacing the suffix with '1,00,0001'.
If rightmost numeric digit in EndStrng is suffixed with 'Mn': replacing the suffix with ',000,000', and so on.

w) Setting ShSWrd=EndStrng and updating record in file:Shrtn at the position of the first enumeration word record and deleting the subsequent contiguous enumeration word records in file:Shrtn.

x) If file:Shrtn contains more sequences of contiguous enumeration word records transferring control back to Method-step 16c.

y) Updating ShSq in all records in file:Shrtn, starting with ShSq=1 and incrementing by 1 in each subsequent record.

z) If single line text string input, updating TotLen.

The inputs may include varying combinations of enumeration words. The versatility of this method is indicated in the following examples of inputs and corresponding output figures:

| | | |
|---|---|---|
| 1. One Million | 1 Mn | (if OptnEWN = X or Y) |
| 2. One Million | 1,000,000 | (if OptnEWN = Z) |
| 3. One Million One | 1,000,001 | |
| 4. One Million and One | 1,000,001 | |
| 5. Ten Lakh One | 10,00,001 | |
| 6. Ten Lakh and One | 1000001 | (after final truncation, in case of space constraint) |
| 7. One thousand six hundred fifty | 1,650 | |
| 8. Sixteen hundred fifty | 1650 | |
| 9. Four trillion sixteen million | 4,000,016 Mn | (if OptnEWN = X or Y) |
| 10. Sixteen million five | 16,000,005 | |
| 11. Two thousand and fifteen | 2,015 | |
| 12. Two thousand fourteen crore | 2,014 Cr | (if OptnEWN = X or Y) |
| 13. One hundred twenty seven | 127 | |
| 14. Hundred and twenty seven | 127 | |
| 15. One hundred and twenty seventh | 127th | |

As illustrated in the examples above, particularly example nos. 3, 4, 5, 6, 7, 8, 13, and 14, this method can handle variations in style of expressing enumeration words sequences.

Inputs to numeric fields or date fields through keyboard are largely in the form of numeric digits without any scope for abbreviation. However if the inputs to numeric fields or date fields are captured through voice recognition devices with the enumeration words spoken in varying styles, the direct result of voice recognition being enumeration word sequences (not numeric digits), the enumeration words to numerics conversion methods, described hereinbefore, are very useful and complementary.

Variations of enumeration words and corresponding abbreviations as system fixed within file:AbData (with AbAR=2) and other key words (e.g., 'and', 'point' and 'zero') or variations in methods corresponding to the language of the text abbreviated will be obvious in the context of the language of the text.

In some countries '.' is used instead of ',' and ',' is used instead of '.' in numbers. The above methods can be easily adapted for such countries.

Figure 10:
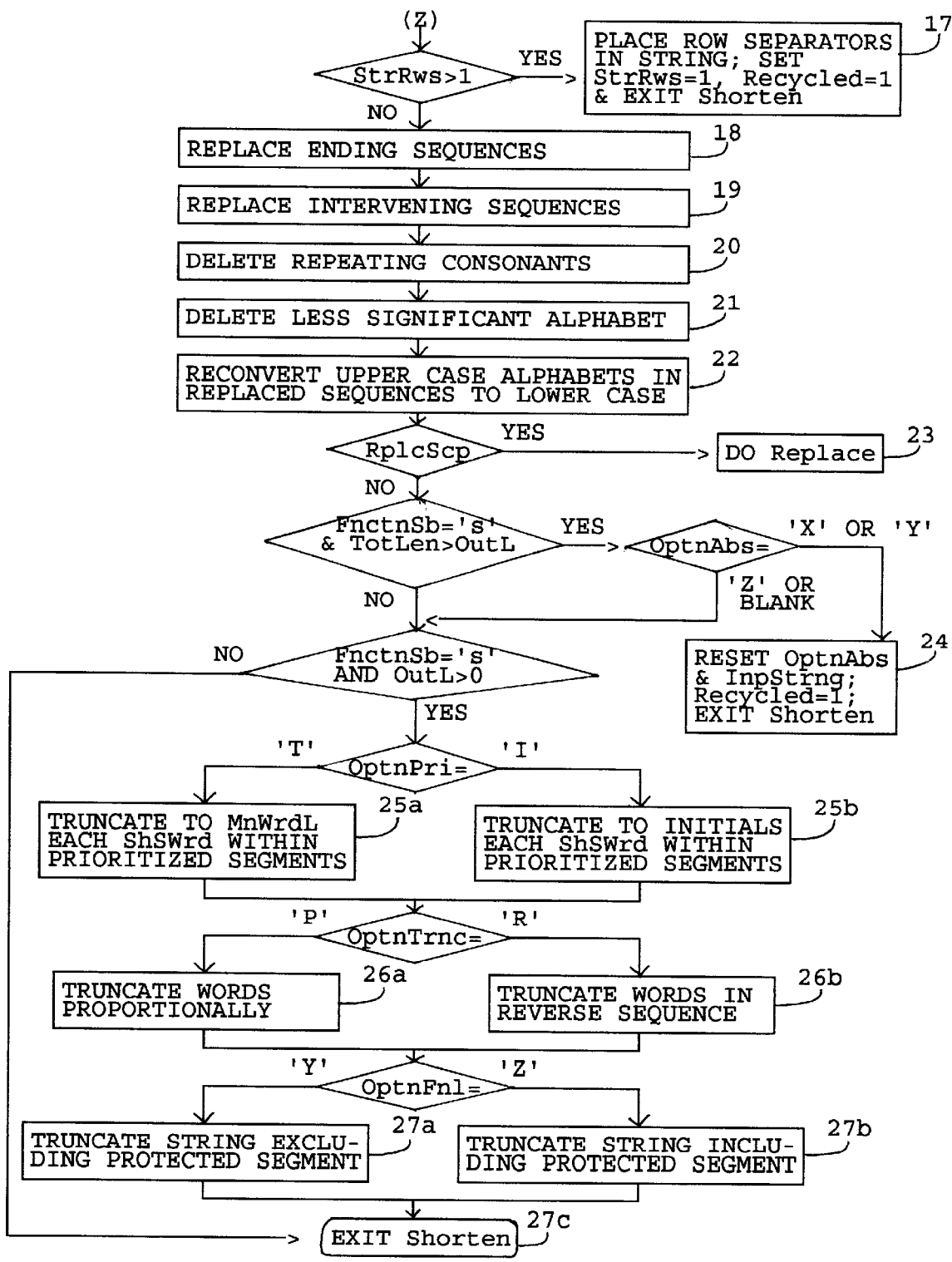
FIG. 10 is a continuation of the flow chart representation from FIG. 9.

Method 17: Multiple Row String Processing & Separation
This method is illustrated in FIGS. 10 and 16.
This method is executed only if FnctnSb='s' and StrRws>1.

When a text string has to be abbreviated into predetermined number of rows of predetermined width without user supplied vertical bar separators (indicated by StrRws>1), the system uses Separate subroutine to decide the placement of row separators within the string so that the methods of phonetic shortening and truncation, if necessary, are executed separately for each row.

As explained in TABLE 7, SWrdLen=number of characters contained (excluding trailing spaces) in field:ShSWrd of each record in file:Shrtn. TotLen is the sum of SWrdLen of all records in file:Shrtn, at any stage of processing. The desired output length limit of multiple rows, OutL= OtptL*StrRws. The maximum reduction potential of phonetic shortening methods (ShrtPot) can be estimated as the sum of (SWrdLen-MnWdL), for all records with field:ShRS>0 and SWrdLen>MnWdL in file:Shrtn, at any stage of processing. If the TotLen exceeds OutL, the required reduction RqdRdn=TotLen-OutL, at any stage of processing. The RqdRdn in relation to ShrtPot can be stated as a proportion ShrtPrp=RqdRdn/ShrtPot. ShrtPrp in excess of a certain fixed value—e.g., 0.70—indicates the need for prior use of other methods of need based replacement options (OptnNAc and OptnNAb) or abstract segment options (OptnAbs).

The incidence of reduction by need based replacement options and abstract segment options may be quite disproportionate between different portions of the input text string being abbreviated. Therefore, if the use of need based replacement options or abstract segment options is inevitable, then it is desirable to use such options before separating the string into desired number of rows for further abbreviation.

Before deciding the use of need based replacement options or abstract segment options, it is necessary to check the ShrtPrp. If the ShrtPrp is not excessive the Separate subroutine is executed directly without using the other options.

In case the ShrtPrp is excessive—e.g., >0.70—and there is scope for need based replacement, such replacements are executed first, provided scope for such replacement has been found earlier within Match subroutine and variable:RplcScp has been set to 1. Thereafter, ShrtPrp is calculated and checked afresh. If ShrtPrp is excessive even after need based replacement and if there is scope for abstract segment options, such options are executed. After execution of the options, if the ShrtPrp is not excessive the Separate subroutine is executed.

In case ShrtPrp continues to be excessive, the RqdRdn is expressed as a percentage of OutL. If the percentage (i.e., TotShrtPc) is insignificant—e.g., <10%—Separate subroutine is executed.

In case ShrtPrp continues to be excessive even after using the aforesaid options and if RqdRdn as a percentage of OutL (TotShrtPc) is significant—e.g., >=10%—then separation of input text string for abbreviation before final abbreviation is not desirable. Instead the string is abbreviated as a whole to OutL limit. The finally abbreviated string is then separated into the desired number of several rows of the desired equal length. This may result in uncontrolled splitting of words between rows, but this is inevitable to minimize word truncation.

Accordingly, the specific steps of this method, designated (a) to (d), are:
a) Calculating ShrtPrp=RqdRdn/ShrtPot,
b) If ShrtPrp<=0.70:
   If RplcScp=1: Setting RplcScp=0 and updating records in file:Shrtn having ShRS=6 or 7 with ShRS=1 and ShAbrv=blank,
   Calling Separate subroutine,
c) Else if ShrtPrp>0.70:
   i) If (OptnNAc or OptnNAb) and RplcScp=1:
      Calling Replace subroutine
      Setting RplcScp=0
      Recalculating ShrtPrp
      If ShrtPrp<=0.70:
         Calling Separate subroutine
      Else if ShrtPrp>0.70 and OptnAbs='X' or 'Y'
         Setting OptnAbs='Y' or 'Z' respectively
         Restoring all control parameters to the original values from the backup saved in Method 4
         Setting InpStrng=WrdStrngC
         Setting Recycled=1
         Exiting Shorten subroutine
      Else if ShrtPrp<=1.00 or TotShrtPc<=10
         Calling Separate subroutine
      Else
         Setting SnglRw=1
   ii) Else if OptnAbs='X' or 'Y':
      Setting OptnAbs='Y' or 'Z' respectively
      Restoring all control parameters to the original values from the backup saved in Method 4
      Setting InpStrng=WrdStrngC
      Setting Recycled=1
      Exiting Shorten subroutine
      Else if ShrtPrp<=1.00 or TotShrtPc<=10
         Calling Separate subroutine
   iii) Else
      Setting SnglRw=1,
d) IF SnglRw=0
   Setting Recycled=1
   Setting StrRws=1
   Setting CumStrng=blank
   Exiting the Shorten subroutine 17.
(End of Method 17)

For each of the Methods 18 to 21, of the preferred embodiment, (described hereinafter) file:Shrtn is accessed sorted in the descending order of field:ShSq to process each record with ShRS>0 (i.e., holding abbreviatable words). Within each word (i.e., ShSWrd) the methods are executed starting from the right end of the word. These methods are executed subject to MnWdL (i.e., predetermined minimum word length limit parameter) restriction for field:ShSWrd and a TotLen restriction for all the records in file:Shrtn as follows:

i) Any method is executed repeatedly for any abbreviatable word or shortened word entry, only while the execution of the method will not reduce the length of the word to less than MnWdL.
ii) If abbreviating text file or if row output length for text string abbreviation is not defined (i.e., OtptL=0) the methods are executed fully;
   else the methods are executed until TotLen reduces to OutL (i.e., to the predetermined abbreviated text length limit).

When any of the Methods 18 to 20 are executed the replaced alphabets are converted to upper case to identify and mark the alphabets so that these are not abbreviated further.

Method 18: Ending Character Sequences Replacement

This method is illustrated in FIGS. 10, 11, 12 and 13.

If replacement of ending sequences is chosen (i.e., OptnESq='Y'): File:AbData is accessed and searched to find any record with field:AbAR=8 and field:AbPhWd matching the ending character sequence of ShSWrd. The ending character sequence comprises a sequence of continuous alphabets in ShSWrd starting with an alphabet not being the initial of ShSWrd and ending with the last alphabet of ShSWrd. If match found, the sequence is replaced with it's corresponding shorter sequence, converted to upper case (so that subsequent reduction methods upto Method 21 are not applied to the replaced sequence) and ShCap is changed to 10 from 0 or to 11 from 1, as the case may be 18.

Method 19: Intervening Character Sequences Replacement

This method is illustrated in FIG. 10.

If replacement of intervening sequences is chosen (i.e., OptnISq='Y') a method similar to that of Method 18 is followed, except that file:AbData is accessed and searched to find any record with field:AbAR=9 and field:AbPhWd matching any intervening character sequences (instead of the ending sequences) of ShSWrd 19. An intervening character sequence comprises a sequence of continuous alphabets in ShSWrd starting with an alphabet not being the initial of ShSWrd and ending with a subsequent alphabet of ShSWrd not being the last alphabet.

Method 20: Repeating Consonant Deletion

This method is illustrated in FIGS. 10, 11 and 13.

If deletion of repeating consonant is chosen (i.e., OptnRCd='Y'): ShSWrd is read starting from the right end and each occurrence of contiguously repeating consonant is replaced with a single such consonant in upper case and ShCap is changed to 10 from 0 or to 11 from 1, as the case may be 20.

Method 21: Less Significant Alphabet Deletion

This method is illustrated in FIGS. 10, 11, 12, 13, 15 and 16.

This method is executed only if LAdStrng is not blank and OptnLAd='X' or 'Y'.

Less significant alphabet deletion, as described hereinafter, is done in two stages. In the first stage vowels occurring in LAdStrng are deleted from all the words in file:Shrtn. If necessary, in the second stage other alphabets occurring in LAdStrng are deleted from the words.

The steps are:

a) If OptnLAd='X': each occurrence of single or contiguous sequence of LAdStrng alphabets (vowel or non-vowel) is deleted entirely, starting from the right end, in the ShSWrd entry but excluding the last alphabet and the initial.

b) If OptnLAd='Y': each occurrence of single or contiguous sequence of LAdStrng alphabets (vowel or non-vowel) is deleted entirely, starting from the right end, in the ShSWrd entry but excluding the initial 21.

Method 22: Finishing of Shortening Options

This method is illustrated in FIGS. 10, 11, 12 and 13.

While executing OptnESq, OptnISq and OptnRCd, the matched or repeating consonant sequences are replaced in upper case to avoid confusion with subsequent abbreviation methods. Before proceeding further in Shorten subroutine it is necessary to search for records having sequences replaced in upper case with ShCap=10 or 11 and to convert them back to lower case. ShSWrd in each record with ShCap=10 or 11 in file:Shrtn is accessed and upper case alphabets if any, other than the initials, are converted back to lower case. Thereafter, ShCap is changed from 10 to 0 or from 11 to 1, as the case may be 22.

Method 23: Calling Subroutine for Need Based Replacement

This method is illustrated in FIGS. 10 and 12.

At this stage, if required, it is necessary to utilize less commonly used acronyms and word abbreviations matched and retained earlier using Match subroutine, for need based replacement. This is done by calling Replace subroutine 23, if (OptnNAc='Y' or OptnNAb='Y') and provided scope for such replacement has been found earlier with Match subroutine and variable:RplcScp has been set to 1.

Method 24: Recycling of String Containing Abstract Segment

This method is illustrated in FIGS. 10 and 13.

This method is executed if OptnAbs='X' or 'Y'.

At this stage while abbreviating a text string containing a delimited abstract segment the system checks if OutL limit is reached and if not reached and if:

i) OptnAbs='X': setting Recycled=1, restoring all other control parameters to the original values from the backup saved in Method 4 and setting OptnAbs='Y'.

ii) OptnAbs='Y': setting Recycled=1, restoring all other control parameters to the original values from the backup saved in Method 4 and setting OptnAbs='Z'.

Further, iii) If InpStrng or CumStrng is not blank:

InpStrng is prefixed with WrdStrngC (without trailing spaces) and a row separator (i.e., '|'), Else: InpStrng=WrdStrngC.

iv) Shorten subroutine is exited for recycling and abbreviating the string afresh 24.

(End of Method 24)

In the preferred embodiment, the Methods 25 to 27 and 31 presented hereinafter do not apply to text file inputs and to text string inputs with parameter:OtptL=0.

In case of text string inputs which are required to be outputted into predetermined field widths in single or multiple rows, all the methods and options of the invention for phonetic shortening or replacement of phrases or words with acronyms or word abbreviations (commonly used or less commonly used) may not produce the desired results. Methods of truncation, involving loss of phonetic content may be necessary. Therefore the invention includes several options for truncation controlled with the non-deletable symbols string, passed as parameter:NDSStrng.

The truncating routines described hereinafter are pursued only while TotLen continues to be in excess of OutL. Records with ShAR>0 holding words barred from abbreviation methods, enumeration word to numerics conversions, personal name title word, acronym or word abbreviation replacements, protected segments within square brackets, non-abbreviatable words, opening or closing round brackets and non-alphabet sequences are not open for truncation, except in final truncation (i.e., Method 27).

Method 25: Word Truncation within Prioritized Segment

This method is illustrated in FIG. 10.

If the option for prioritized truncation of segments of input text string contained within round brackets is chosen (i.e., OptnPri='T' or 'I'): File:Shrtn is accessed sorted in descending order of field:ShSq and each record is read. The records which follow the record containing ')' in field: ShSWrd and which precede the record containing '(' in field: ShSWrd are recognized as prioritized segment word records.

If OptnPri='T': field:ShSWrd in records corresponding to prioritized segment is truncated to the predetermined minimum truncated word length limit (MnTrL), starting from the right end of ShSWrd, until TotLen<=OutL 25a.

If OptnPri='I': field:ShSWrd in records corresponding to prioritized segment is truncated to bare initial, starting from the right end of ShSWrd, until TotLen<=OutL 25b.

Method 26: Word Truncation within Non-prioritized Segments

This method is illustrated in FIGS. 10 and 16.

This method is executed if OptnTrnc='P' or 'R'.

If OptnTrn='P': file:Shrtn is accessed. Total truncation potential (TotTrPot) is updated, TotTrPot being the sum of (SWrdLen-MnTrL) of all records in file:Shrtn with ShAR=0 and SWrdLen>MnTrL, at any stage of processing. Next, truncation factor (TrncFctr) that needs to be applied on the length of each ShSWrd entry which is in excess of MnTrL is calculated, using the formula: TrncFctr=(((TotLen−OutL)/TotTrPot) or 1.00) whichever is lower.

Thereafter, file:Shrtn is accessed sorted in descending order of field:ShSq and length of truncation (TrncLen) required of field:ShSWrd in each record corresponding to non-prioritized segment(s), with ShAR=0, is calculated using the formula: TrncLen=((SWrdLen-MnTrL)*TrncFctr) rounded off to the nearest integer. Thereupon, the field:ShSWrd is truncated upto TrncLen number of characters (starting from the right end). This step is repeated until TotLen<=OutL or end of file 26a.

If OptnTrn='R': file:Shrtn is accessed sorted in descending order of field:ShSq and field:ShSWrd in each record corresponding to non-prioritized segment(s), with ShAR=0, is truncated to MnTrL until TotLen<=OutL or end of file 26b.

Method 27: Final Truncation of Text String

This method is illustrated in FIG. 10.

Finally, if TotLen>OutL and OptnFnl='Y': file:Shrtn is accessed sorted in the descending order of field:ShSq to read each character from the right end of field:ShSWrd in every record. At this stage all records, excluding those relating to protected segment(s) are considered to be open for truncation. If read character is not a:

i) numeric digit,
ii) decimal point '.',
iii) character contained in NDSStrng or
iv) initial of a word, then it is deleted. These steps within each record are continued until TotLen<=OutL or end of file 27a.

If TotLen>OutL and OptnFnl='Z'; the above method is executed, with one variation—i.e., the protected segment is not excluded from truncation 27b.

At this stage Shorten subroutine is exited 27c. *(End of Shorten subroutine)*

Method 28: Word Movement from WrdStrng to File:Shrtn (MOVE Subroutine)

The Move subroutine is called from Method 13.

The recursive operations, while MvStrng is not blank are:

i) MvStrng is read from the left end, the first word (or basic element), separated with space from next word, if any, (or the preceding 25 characters of the first word, if it is exceeding 25 characters) is moved to MvSWrd.
ii) Unmoved portion of MvStrng is left justified.
iii) ShSq is incremented by 1.
iv) Field values are set as follows:
   ShSWrd=MvSWrd, ShRS=MvRS, ShAR=MvAR and ShCap=MvCap.
v) The record is appended to file:Shrtn.

Method 29: Acronym & Word Abbreviation Matching, Replacement & Retention (MATCH Subroutine)

This method is illustrated in FIGS. 11 and 12.

The Match subroutine is called from Method-step 15a.

Match subroutine is designed to search for combination of words (i.e., phrases—including institutional names), which may have (i) varying number of intervening spaces, (ii) non-case specific initials and (iii) intervening line breaks or page breaks in text files. The subroutine uses glossaries of phrases and words wherein intervening spaces, if any, have been deleted, after converting initials of words to upper case. The initials of all abbreviatable words (i.e., with ShRS=1) in file:Shrtn are already converted to upper case (as described in Method-step 13d hereinbefore) to facilitate comparison of phrases and words in file:AbData and file:Shrtn for replacement with acronyms and abbreviations.

Acronyms are prioritized over word abbreviations in compulsory as well as need based search and replacement. Compulsory acronyms and word abbreviations are prioritized over need based acronyms and word abbreviations. Compulsory acronyms and word abbreviations are located and replaced first, even if FnctnSb='s' and TotLen<=OutL. Need based acronyms and word abbreviations are located and retained in field:ShAbrv of file:Shrtn. Later on, if shortening methods (i.e., up to Method 22) have been executed and TotLen is not within required limits, then the acronyms and abbreviations are used if they yield greater reduction than the shortening methods for each phrase or word as the case may be (see Method 30 hereinafter).

Accordingly, the specific steps of this method, designated (a) to (f), are:

a) If OptnCAc, then file:AbData is accessed and searched to locate a record with field:AbAR=4 and with field:AbPhWd containing a phrase matching any sequence of abbreviatable words in field:ShSWrd of contiguous records of file:Shrtn. If matching phrase is found, the record corresponding to the first word of the phrase is read from file:Shrtn and the fields in the record are updated with ShSWrd=AbAbrv, ShRS=0 and ShAR=4. If the last word of the phrase is in plural form (i.e., the word ends with 's' or 'es') in file:Shrtn it is still considered a valid match and an 's' is suffixed to the acronym in field:ShSWrd of the first word record. The records corresponding to the other words of the phrase are deleted from file:Shrtn.

b) If OptnCAb, then file:AbData is accessed and searched to locate a record with field:AbAR=5 and with field:AbPhwd containing a word matching any abbreviatable word in field:ShSWrd of any record of file:Shrtn. If matching word is found, the record corresponding to the matching word is read from file:Shrtn and the fields in the record are updated with ShSWrd=AbAbrv, ShRS=0 and ShAR=5. If the word is in plural form in file:Shrtn it is still considered a valid match and an 's' is suffixed to the abbreviation in field:ShSWrd of the matched word record.

Note: At this stage TotLen is determined for file:Shrtn, if FnctnSb='s'. Steps (c), (d) and (e) hereinafter are not executed if FunctbSb='s' and TotLen<=OutL.

c) If OptnNAc, then file:AbData is accessed and searched to locate a record with field:AbAR=6 and with field:AbPhWd containing a phrase matching any sequence of abbreviatable words in field:ShSWrd of contiguous records of file:Shrtn. If matching phrase is found, the record corresponding to the first word of the phrase is read from file:Shrtn and the fields in the record are updated with ShAbrv=AbAbrv, ShRS=6 and ShAR=0. If the last word of the phrase is in plural form in file:Shrtn it is still considered a valid match and an 's' is suffixed to the acronym in field: ShAbrv of the first word record. The records corresponding to the other words of the phrase are read from file:Shrtn and the fields in each record are updated with ShAbrv=blank, ShRS=6 and ShAR=0.

d) If OptnNAb, then file:AbData is accessed and searched to locate a record with field:AbAR=7 and with field:AbPhWd containing a word matching any abbreviatable word in field:ShSWrd of any record of file:Shrtn. If matching word is found, the record corresponding to the matching word is read from file:Shrtn and the fields in the record are updated with ShAbrv=AbAbrv, ShRS=7 and ShAR=0. If the word is in plural form in file:Shrtn it is still considered a valid match and an 's' is suffixed to the word abbreviation in field:ShAbrv of the matched word record.
e) If any need based acronym or word abbreviation is found, then variable:RplcScp is set to 1.
f) All records are updated in file:Shrtn with field:ShSq set to 1 in first record and incremented by 1 in each subsequent record.

Method 30: Need Based Acronym & Word Abbreviation Replacement (REPLACE Subroutine)

The Replace subroutine is called from Method 17 or 23.
The Replace subroutine is executed if RplcScp=1 and (FnctnSb='t' or TotLen>OutL)

The Replace subroutine is called for actual replacement of the less commonly used acronyms and word abbreviations matched and retained earlier (see Method 29 hereinbefore) for need based use. Each such acronym or word abbreviation is actually used only if required and if it gives more reduction than what has already been achieved through preceding methods. To minimize the number of acronyms or word abbreviations used, the system first replaces the acronym or word abbreviation which gives the largest reduction than the next largest and so on until the required length limit, if any, is reached.

Accordingly, the specific steps of this method, designated (a) to (d), are:
a) Accessing file:Shrtn sorted in ascending order of field:ShSq and reading each record.
   If ShRS=6, developing cumulative total of reduction potential (RdnPot) of each contiguous sequence of records in file:Shrtn with ShRS=6, the sequence holding the component words of a phrase in field:ShSWrd and the first record of the sequence holding the corresponding acronym in field:ShAbrv. RdnPot is calculated as total of (SWrdLen–AbrvLen) of all records in file:Shrtn which together form that phrase. If RdnPot>0, setting ScAcAbRS=RdnPot and ScSq=ShSq of first word of phrase and adding record to file:Scope.
   If ShRS=7 (i.e., word abbreviation) then calculating RdnPot=SWrdLen-AbrvLen. If RdnPot>0, setting ScAcAbRS=RdnPot and ScSq=ShSq and adding record to file:Scope.
   This step is repeated until end of file:Shrtn.
b) Accessing file:Scope sorted in descending order of field:ScAcAbRS and reading each record. For each record read from file:Scope, locating and reading record in file:Shrtn with field:ShSq=ScSq. Setting ShSWrd=ShAbrv, ShAbrv=blank, ShAR=ShRS & ShRS=0 and updating record in file:Shrtn. Deleting those records immediately following the updated acronym record which have ShAbrv=blank and ShRS=6. Recalculating TotLen. If FnctnSb='t' or TotLen>OutL repeating this step for the next record in file:Scope until end of file.
c) All records are updated in file:Shrtn with field:ShSq set to 1 in first record and incremented by 1 in each subsequent record.
d) All records in file:Shrtn with field:ShRS=6 or 7 are updated after setting ShRS=0, ShAR=0 and ShAbrv=blank.

Method 31: Multiple Rows String Separation Before Recycling (SEPARATE Subroutine)

This subroutine is called from within Method 17:
i) if ShrtPrp<=1.00, after using need based replacement options and abstract segment options, if necessary, and if scope for such options existed, or
ii) if the required reduction (RqdRdn) as a percentage of OutL is insignificant—e.g., <10%

The object of this subroutine is to separate the InpStrng into the desired number (StrRws) of rows. This is achieved by concatenating words (or basic elements) from file:Shrtn in sequence back into Wrdstrng (prefixed with a blank space if the WrdStrng is not blank) to build each row. Then, each such row (i.e., WrdStrng) is concatenated back into InpStrng, after prefixing WrdStrng with a row separator if the InpStrng is not blank. The separators are required to be placed at calculated positions, so that:
i) When the InpStrng is recycled after such placement and each of the separated unabbreviated row (WrdStrng) is abbreviated after separation, OutL (set to OtptL) limit is achieved for each row with uniform abbreviation.
   Note: The abbreviation is considered to be uniform if the total number of characters reduced in abbreviation after separation of each row approximates the sum of (SWrdLen-MnWdL)*ShrtPrp of all the abbreviatable words in the row.
ii) Unutilized blank space(s) are avoided in each of the abbreviated separate rows, unless the unabbreviated input text string is shorter than OutL.
iii) Splitting of words between rows is minimized.
iv) Words which are too long to be accommodated in the current WrdStrng and which will cause unutilized space in the current WrdStrng, if accommodated in the next WrdStrng, are split between the WrdStrngs (i.e., current row and next row) such that each split portion has at least two alphabets each. If the word is abbreviatable, the splitting is done after shortening (i.e., deleting occurrences of recurring consonant and less significant alphabet from within the word, starting from the right end, subject to PSL limit).

The calculated positions are decided using the following word length parameters and cumulative length parameters:
UAL i.e., unabbreviated length=SWrdLen of the currently read record.
PSL i.e., proportionally shortened length, is developed as follows for the currently read record:
   if ShRS=1
      if SWrdLen>MnWdL and ShrtPrp<=1
         PSL=SWrdLen-((SWrdLen-MnWdL)*ShrtPrp rounded off to an integer)
      if SWrdLen>MnWdL and ShrtPrp>1
         PSL=MnWdL
      if SWrdLen<=MnWdL
         PSL=SWrdLen
   if ShRS=0
      PSL=SWrdLen
CumUAL i.e., Cumulative UAL of all records upto and including the currently read record, corresponding to ShSWrd entries concatenated from file:Shrtn in sequence into current WrdStrng,
CumPSL i.e., Cumulative PSL of all records upto and including the currently read record, corresponding to ShSWrd entries concatenated from file:Shrtn in sequence into current WrdStrng,
PvCumPSL i.e., Cumulative PSL of all records upto but excluding the currently read record, corresponding to ShSWrd entries concatenated from file:Shrtn in sequence into current WrdStrng,
The specific steps of this method, designated (a) to (p), are:
a) Setting InpStrng=blank.
b) Accessing file:Shrtn in sequence of field:ShSq.
c) Setting CumUAL=0, CumPSL=0, PvCumPSL=0 and WrdStrng=blank.

d) Reading first record in file:Shrtn.
e) If CumUAL>0: setting PvCumPSL=CumPSL.
f) Developing UAL, PSL, CumUAL and CumPSL values as described hereinbefore.
g) If CumPSL<=OtptL or StrRws=1:
   If ShRS=1:
      concatenating ShSWrd entry to WrdStrng, separated with intervening single space if WrdStrng is not blank.
   If ShRS=0:
      enclosing ShSWrd entry in square brackets (to protect from abbreviation) and concatenating it to WrdStrng.
   Deleting the record from file:Shrtn,
   If CumPSL=OtptL:
      stopping further concatenation of ShSWrd entries to current WrdStrng by transferring control to step (j).
h) If CUmPSL>OtptL:
   Unutilized space (UuSpc), is calculated using the formula, UuSpc=OtptL−PvCumPSL,
   i) If UuSpc=1 or (RqdRdn=0 and UuSpc/OtptL<=0.4):
      stopping further concatenation of ShSWrd entries to current WrdStrng by transferring control to step (j).
   ii) If (PSL−UuSpc=1 and CumPSL<CumUAL) or (PSL−UuSpc=1 and ShRS=1):
      If ShRS=1:
         concatenating ShSWrd entry to WrdStrng, separated with intervening single space if WrdStrng is not blank.
      If ShRS=0:
         concatenating ShSWrd entry to WrdStrng, enclosed in square brackets.
      Deleting the record from file:Shrtn.
      Stopping further concatenation of ShSWrd entries to current WrdStrng by transferring control to step (j).
   iii) If PSL−UuSpc>=2 or CumPSL=CumUAL:
      If ShRS=1 and OptnRCd='Y':
         deleting repeating consonant from ShSWrd starting from the right end, until SWrdLen<=PSL.
      If ShRS=1 and OptnLAd='X' or 'Y':
         deleting less significant alphabets or sequence (contained in LAdStrng) from ShSWrd starting from the right end, until SWrdLen<=PSL. This step is describedin greater detail in Method 21 hereinbefore.
      If SWrdLen>=UuSpc+2:
         concatenating UuSpc number of characters from ShSWrd entry to WrdStrng, protected by enclosing in square brackets.
         deleting UuSpc number of characters from the ShSWrd entry, left aligning the entry, setting ShRS=0 and updating the current record.
      If SWrdLen<UuSpc+2:
         concatenating the ShSWrd entry in current record to WrdStrng, protected by enclosing in square brackets.
         deleting the current record from file:Shrtn.
         Stopping further concatenation of ShSWrd entries to current WrdStrng by transferring control to step (j).
i) Transferring control back to step (d).
j) Concatenating WrdStrng to InpStrng (left justified and excluding trailing spaces), prefixed with a row separator if InpStrng is not blank.
k) If StrRws=1: transferring control to step (o).
l) Decrementing StrRws by 1.
m) Recalculating ShrtPrp.
n) If more records in file:Shrtn: transferring control back to step (c).

o) Setting OptnPro='Y' and blanking OptnACc, OptnAbB, OptnCAc, OptnCAb, OptnNAc, OptnNAb, OptnEWN, PndStrng, OptnAbs, OptnAbsC and OptnPri.
   Note: This is necessary because the blanked options relate to abbreviation methods already executed on the whole of the InpStrng before separation.
p) Exiting the Separate subroutine.
(End of Separate subroutine)

Method 32: Adaptation of Abbreviation Methods for Proportional Spacing

The Preferred Embodiment described hereinbefore, reckons length of every character (including space), word, string, output string or output record in terms of number of monospace character(s).

Unlike monospaced type, characters in proportionally spaced types have varying widths depending upon the shape. Hence the length of any character, a sequence of characters, word or string has to be reckoned in units of measure such as centimeters, millimeters, points etc—i.e., in terms of a unit of measure suitable for measuring proportionally spaced text (UoMp). A point is equal to 0.351 millimeters as per US standards.

The methods of the invention can be adapted for abbreviation of proportionally spaced text, with modification of some of the parameters and variables used in the detailed description of the preferred embodiment as follows:
i) InptL and OtptL are input by the user in terms of UoMp. Hence OutL (=OtptL*StrRws) is also reckoned in terms of UoMp.
ii) TotLen is reckoned as the sum of UoMp length of all words or basic elements,
iii) In Method 12, OtptL in terms of UoMp is used for deciding the last word (depending on length of the word in terms of UoMp) that can be accommodated in each record of output file before initiating next record,
iv) In Methods 17 and 31 while executing system separation of input text string for multiple rows:
   a) ShrtPot is reckoned as the sum of UoMp length of the ending portion (i.e., after excluding the MnWdL number of preceding characters) of every word which is open for reduction,
   b) RqdRdn is reckoned as TotLen in terms of UoMp less OutL in terms of UoMp. Negative values of RqdRdn are reckoned as zero, as in monospaced text,
   c) ShrtPrp is reckoned as RqdRdn in terms of UoMp divided by ShrtPot in terms of UoMp,
   While separating text string for multiple rows the abbreviation of each row, after separation is considered to be uniform for each row if the total reduction of each row in terms of UoMp, after separation, approximates the ShrtPrp multiplied by the sum of UoMp length of the ending portion (after excluding the MnWdL number of preceding characters) of every word (which was open for reduction) soon after separation,
v) In Method 26, TotTrPot is converted to UoMp by multiplying it with average length of lower case alphabets in that font and type size and
vi) In Method 30, RdnPot is reckoned as the sum of UoMp length of all words comprising a phrase less the UoMp length of corresponding acronym in respect of each contiguous sequence of records with ShRS=6, or UoMp length of each word less the UoMp length of the corresponding word abbreviation in respect of each record with ShRS=7, provided the result is a positive value.

Proportionally spaced text results in overall reduction of display space required as compared to monospaced text.

Further reduction of display space, if required in proportionally spaced text, can be achieved using the several abbreviation methods of the invention. If greater optical facility is needed, larger types may be used, though this would offset the space saving obtained through abbreviation methods.

Method 33: Abbreviated Text Sort Order

This method is a subset of the invention to develop a sort order for electronic data bank, database, encyclopedia, dictionary, glossary or such other data source.

The data source is provided with an additional sort key consisting of words, phrases and captions after deleting phonetically insignificant characters (such as vowels—except the initial of each word—contiguously repeating consonant, apostrophe, hyphen and intervening space(s) between words).

The user of the data source searches for the word, phrase or caption of interest after keying in the phonetically significant characters fully or partly starting from the left end.

Alternatively, the data source system may instantly develop the abbreviated text for such of the entries in data source which have the initials matching that of the entry keyed in and thereupon match the results with the entry keyed in fully or partly.

Additionally, if a spell-check in word processing is not successful, the system may develop the abbreviated text (using the method), search for it and if found: show it in full script with correct spelling and meaning.

(End Of Method 33)

Example of One of the Uses of the Invention in an Application

This invention may be used in any database or other application. If a user wants to place a text string in a multiple row field with limited space in a data entry/viewing screen (e.g., see FIGS. 17 and 18), the user may pick up (using a pick up table) the unabbreviated text string from a standard strings list used commonly throughout the organization. Next, the application sets parameter: InputStr=(string picked up) and develops the parameters:OtptL and StrRws by checking the display space constraints (i.e., row width and number of rows) of the multiple row field. The rest of the parameter list may be completed using a selected parameters set from a pre-defined database. The application then calls the abbreviation function (and passes the parameters list) and places the abbreviated text string (in multiple rows) returned by the abbreviation function into the multiple row field.

If the user wants to put the same text string into a single row field of width 25 characters in a different data entry/viewing screen (e.g., see FIG. 17), the user may pick up the same text string from the standard strings file. The database program will again call the abbreviation function, this time with parameters:OtptL=25 and StrRws=1, which will return an abbreviated text string not exceeding 25 characters to be put in the single row field.

The abbreviated text string which is generated need not be stored in the database when the data entry/viewing screen is closed. Instead an identification number of the unabbreviated string in the standard strings list is stored. The next time the data entry/viewing screen is opened the database program instantaneously reproduces and displays the abbreviated text string in the field.

The advantages of using this invention (as illustrated by this example) are:

i) Any text string is instantaneously abbreviated by the system into single or multiple rows of width fitting the display space constraint, ii) A given text string to be put in a field of given space is abbreviated uniformly throughout the organization on each occassion, provided the same parameters set, the same font and same type size are used, iii) Since the abbreviated text strings are generated afresh every time, any changes in abbreviation data file versions or the parameter sets is instantaneously reflected in the abbreviated text strings, iv) Since only one copy of each unabbreviated text string is stored and the abbreviated text strings are not stored in the database, unnecessary duplication is avoided.

(End of Example)

Incorporating the Invention in a Software Program

To use the invention in an existing or new program the developer would have to source code the invention as a function using any computer language and then incorporate it into his/her existing or new program. This means that the program has to be compiled after this new function is added to the program's Map/Library structure and statements calling the function have been added wherever the abbreviation feature is required to be used in the program.

Variations

Although the inventors recommend the Preferred Embodiment (described hereinbefore) the following variations/extensions of the Preferred Embodiment may be possible.

1) The sequence of the methods may be varied or one or more methods may be omitted.
2) The lengths/widths of Input & Output strings, Input and Output files, fields in files, string variables etc in the Preferred Embodiment and Figures are merely indicative. The methods of the invention will work just as well with smaller or larger lengths/widths.
3) A method, wherein preposition words such as 'the', 'an' etc are deleted, may be added.
4) Execution of any of the methods 18 to 21 is aborted if the length of any word becomes less than MnWdL after execution. As a variation, the execution may not be aborted if the length becomes less than MnWdL after execution, but further execution of any of the methods 18 to 21 for the word is discontinued.
5) In Method 21, a sequence of contiguous less significant alphabets in a word is deleted entirely or not at all depending on the MnwdL, in both stages. As a variation, less significant alphabets (even in a contiguous sequence) may be deleted one at a time until MnWdL limit is reached.
6) Fields in file:Shrtn may be varied (including change in name, length etc) with approximately the same functionality.
7) In Method 30, need based replacement is done starting with the replacement which gives largest reduction followed by next largest reduction etc until required reduction is achieved. As a variation, acronyms may be replaced first followed by word abbreviations or vice versa. As another variation, one or more replacements may be made such that trailing blank spaces in the text are minimized.
8) In the preferred embodiment, if a phrase contains any word that is barred from abbreviation (i.e., if the word is included in file:AbData with field AbAR=1 and OptnAbB='Y') then the phrase is not replaced with its acronym. As a variation, the phrase may be replaced by its acronym eventhough it contains a barred word. In Method 13 while transferring words from WrdStrng to file:Shrtn, if a barred word is encountered the system may check if any phrase in file:AbData contains the word. If so and if that occurrence of the word is contained in a matching phrase in WrdStrng, then that word is not marked as unabbreviatable in file: Shrtn.
9) In the preferred embodiment, while abbreviating text string into abbreviated text string comprising predetermined number of rows, all such rows are abbreviated to the same width. As a variation, different widths may be predetermined for each such row and the separation and abbreviation of each row may be carried out accordingly.
10) In the preferred embodiment, a word can have only one corresponding word abbreviation. As a variation, a word may have more than one word abbreviations.
1) Values such as desired output length limit, minimum word length limit, minimum truncated word length limit and the like may also be predetermined by a program, prior to abbreviation of each text, as per pre-programmed algorithms.

Many more variations of the preferred embodiment of the invention are possible without departing from the spirit, the essential criteria and the rules and methods of the invention as presented in the background and the description of the invention. The preferred embodiment is therefore to be considered in all respects as illustrative and not restrictive, the scope of the invention being indicated by the appended claims, rather than by the foregoing description; and all variations which come within the meaning and range of equivalency of the claims are therefore intended to be covered by our claims stated hereinafter.

We claim:

1. A method for abbreviating text to cope with display or print space constraint in computer software such that loss of word recognizability is minimized, wherein said text includes a plurality of words, said space constraint is defined in terms of a predetermined abbreviated text length limit and said method comprises the steps of:
    a) selecting one or more words from the text as being abbreviatable words;
    b) shortening only those abbreviatable words whose length exceeds a predetermined minimum word length limit while the length of the text is in excess of the predetermined abbreviated text length limit, said shortening comprising at least one of:
        (i) replacing a sequence of alphabets in any abbreviatable word with a shorter sequence, wherein said sequence of alphabets does not include the initial of the abbreviatable word; and
        (ii) deleting one or more alphabets from any abbreviatable word, but excluding from deletion the initial of the abbreviatable word; and
    c) truncating only those abbreviatable words whose length exceeds a predetermined minimum truncated word length limit while the length of the text is in excess of the predetermined abbreviated text length limit.

2. The method of claim 1 further comprising at least one of:
    replacing in the text a sequence of words, being a phrase, with its corresponding commonly used acronym, if an entry containing the phrase and the acronym is found in a predetermined list; and
    replacing in the text an abbreviatable word with its corresponding commonly used word abbreviation, if an entry containing the abbreviatable word and the word abbreviation is found in a predetermined list.

3. The method of claim 1 further comprising at least one of:
    replacing in the text a sequence of words, being a phrase, with its corresponding acronym, if an entry containing the phrase and the acronym categorized as less commonly used is found in a predetermined list and the length of the text is greater than the predetermined abbreviated text length limit even after shortening the abbreviatable words in the text; and
    replacing in the text an abbreviatable word with its corresponding word abbreviation, if an entry containing said abbreviatable word and said word abbreviation categorized as less commonly used is found in a predetermined list, such replacement yields greater reduction than the reduction that is obtained by shortening said abbreviatable word and the length of the text is greater than the predetermined abbreviated text length limit even after shortening the abbreviatable words in the text.

4. The method of claim 1 further comprising converting a continuous sequence of at least two enumeration words in the text, of which at least one of the enumeration words is a bundle word, into a shorter sequence using a predetermined list of enumeration words and corresponding abbreviations, wherein said bundle word is a single enumeration word which connotes a value greater than hundred and said shorter sequence contains at least four numeric characters.

5. The method of claim 4 further comprising step (a) and at least one of steps (b), (c), and (d):
    a) replacing bundle word abbreviations with predetermined corresponding figures, each said corresponding figure comprising either a punctuation character or a sequence of one or more punctuation characters and numeric zero(s);
    b) inserting into the sequence of converted figures a numeric one;
    c) locating and deleting occurrences of superfluous numeric zero(s), if any, from the sequence of converted figures; and
    d) inserting into the sequence of converted enumeration words one or more numeric zero(s).

6. The method of claim 1 further comprising truncating the abbreviated text finally, starting from the right end, until the text is reduced to the predetermined abbreviated text length limit or the entire text is dealt with, but excluding from truncation the initial alphabet of any word and at least one of:
    a) any numeric character or decimal point;
    b) any character contained in a predetermined set of non-deletable symbols; and
    c) predetermined protected segments.

7. The method of claim 1 wherein the abbreviatable words on which the abbreviating steps are carried out include partially abbreviated words.

8. The method of claim 1 wherein the length of any word is the number of characters in the word.

9. The method of claim 1 wherein the selecting step includes:
    locating sequences of one or more contiguous alphabets preceded by a space, punctuation or beginning of text and followed by a space, punctuation or end of text and recognizing such sequences as words; and
    locating words containing at least two alphabets and no upper case alphabets other than the first alphabet and classifying such words as abbreviatable words.

10. The method of claim 1 wherein the replacing step comprises at least one of:
    replacing a contiguous sequence of alphabets in any abbreviatable word with a shorter sequence of at least one alphabet, if an entry containing said contiguous sequence of alphabets and its corresponding shorter sequence is found in a predetermined list; and replacing a sequence comprising a contiguously repeating consonant in any abbreviatable word with a shorter sequence of only one such consonant.

11. An abbreviated text generated by employing the method in claim 10.

12. The method of claim 10 wherein the replaced shorter sequence is identified so that said shorter sequence is not further shortened using the shortening step subsequently.

13. The method of claim 1 wherein the deleting step comprises deleting a contiguous sequence of one or more vowels from any abbreviatable word, provided said contiguous sequence is deleted entirely and the length of said abbreviatable word after deleting said contiguous sequence would not become less than the predetermined minimum word length limit.

14. An abbreviated text generated by employing the method in claim 13.

15. The method of claim 1 wherein the truncating step includes at least one of:

truncating only the truncatable part of every abbreviatable word in an approximately equal proportion such that the text is reduced to the predetermined abbreviated text length limit, said truncatable part comprising that part of every such word which is in excess of the predetermined minimum truncated word length limit; and truncating abbreviatable words to the predetermined minimum truncated word length limit, starting from the right end of the text, while the length of the text is in excess of the predetermined abbreviated text length limit.

16. An abbreviated text generated by employing the method in claim 15.

17. The method of claim 1 wherein the selecting step includes at least one of:

classifying a word as a non-abbreviatable word, if said word is found in a predetermined list of words barred from abbreviation; and classifying a word as a non-abbreviatable word, if said word is an acronym or a word abbreviation appearing in a predetermined list.

18. The method of claim 1 further comprising dealing with predetermined delimited segments in an exceptional manner, where said dealing includes at least one of:

a) abbreviating only the delimited segment containing an abstract after deleting the rest of the text;

b) protecting the delimited segment from abbreviation;

c) prioritizing deletion of the delimited segment before abbreviating the rest of the text; and d) prioritizing truncation of the delimited segment before truncating the rest of the text.

19. An abbreviated text generated by employing the method in claim 18.

20. The method of claim 1 wherein the unit of measure for the predetermined abbreviated text length limit and for the length of the text is either a monospaced character or a unit of measure suitable for measuring proportionally spaced text.

21. A computer-readable medium embodying the method in one of claims 1–3, 4–6, 7, 8–12, 13, 15–18, 20.

22. An abbreviated text generated by employing the method in claim 1.

23. The method of claim 1 wherein the shortening step (b) is executed irrespective of the predetermined abbreviated text length limit, the truncating step (c) is not executed and the abbreviated text is split into two or more lines each not exceeding the predetermined abbreviated text length limit.

24. A computer system for abbreviating text to cope with display or print space constraint such that loss of word recognizability is minimized, wherein said text includes a plurality of words and said system comprises:

a) means for selecting one or more words from the text as being abbreviatable words;

b) means for shortening only those abbreviatable words whose length exceeds a predetermined minimum word length limit while the length of the text is in excess of a predetermined abbreviated text length limit, said shortening means comprising at least one of:

(i) means for replacing a sequence of alphabets in any abbreviatable word with a shorter sequence, wherein said sequence of alphabets does not include the initial of the abbreviatable word; and (ii) means for deleting one or more alphabets from any abbreviatable word such that the initial of the abbreviatable word is excluded from deletion;

c) means for truncating only those abbreviatable words whose length exceeds a predetermined minimum truncated word length limit while the length of the text is in excess of the predetermined abbreviated text length limit; and d) means for controlling abbreviation of the text, said means comprising one or more predetermined abbreviation data lists, abbreviation options and abbreviation control parameters.

25. The system of claim 24 further comprising at least one of:

means for replacing in the text a sequence of words, being a phrase, with its corresponding commonly used acronym, if an entry containing the phrase and the acronym is found in a predetermined list; and means for replacing in the text an abbreviatable word with its corresponding commonly used word abbreviation, if an entry containing the abbreviatable word and the word abbreviation is found in a predetermined list.

26. The system of claim 24 further comprising at least one of:

means for replacing in the text a sequence of words, being a phrase, with its corresponding acronym, if an entry containing the phrase and the acronym categorized as less commonly used is found in a predetermined list and the length of the text is greater than the predetermined abbreviated text length limit even after shortening the abbreviatable words in the text; and means for replacing in the text an abbreviatable word with its corresponding word abbreviation, if an entry containing said abbreviatable word and said word abbreviation categorized as less commonly used is found in a predetermined list, such replacement yields greater reduction than the reduction that is obtained by shortening said abbreviatable word and the length of the text is greater than the predetermined abbreviated text length limit even after shortening the abbreviatable words in the text.

27. The system of claim 24 further comprising means for converting a continuous sequence of at least two enumeration words in the text, of which at least one of the enumeration words is a bundle word, into a shorter sequence using a predetermined list of enumeration words and corresponding abbreviations, wherein said bundle word is a single enumeration word which connotes a value greater than hundred and said shorter sequence contains at least four numeric characters.

28. The system of claim 27 further comprising means as in means (a) and at least one of means (b), (c), and (d):
   a) means for replacing bundle word abbreviations with predetermined corresponding figures, each said corresponding figure comprising either a punctuation character or a sequence of one or more punctuation characters and numeric zero(s);
   b) means for inserting into the sequence of converted figures a numeric one;
   c) means for locating and deleting occurrences of superfluous numeric zero(s), if any, from the sequence of converted figures; and
   d) means for inserting into the sequence of converted enumeration words one or more numeric zero(s).

29. The system of claim 24 wherein the controlling means includes means for dealing with predetermined delimited segments in an exceptional manner, where said dealing means includes at least one of:
   a) means for abbreviating only the delimited segment containing an abstract after deleting the rest of the text;
   b) means for protecting the delimited segment from abbreviation;
   c) means for prioritizing deletion of the delimited segment before abbreviating the rest of the text; and
   d) means for prioritizing truncation of the delimited segment before truncating the rest of the text.

30. The system of claim 24 wherein the controlling means includes means for determining the points of separation while abbreviating text into predetermined plural number of rows of predetermined row widths.

31. The system of claim 30 wherein the determining means includes means for ensuring that said points of separation are determined such that at least one of the following conditions are satisfied:
   a) each separated portion of the text when abbreviated results in uniform reduction, with the length reduction within each row after separation bearing approximately the same proportion to the sum of the excess length of every abbreviatable word over a predetermined minimum word length limit;
   b) unutilized blank spaces are minimized in each of the abbreviated separate rows;
   c) splitting of words between rows is minimized; and
   d) words or sequences of characters which are too long to be accommodated at the end of any row and which will cause unutilized space in the row if accommodated in the next row, are split between the rows such that each split portion has at least two characters.

32. The system of claim 24 wherein the controlling means includes a file which facilitates abbreviation of the text by holding words or sequences obtained from the text along with an indication for every word that is abbreviatable.

33. The system of claim 24 wherein the abbreviation data list means includes at least one of:
   a) a list of at least one entry containing a word barred from abbreviation;
   b) a list of at least one entry containing an enumeration word and its abbreviation;
   c) a list of at least one entry containing a phrase and its commonly used acronym;
   d) a list of at least one entry containing a word and its commonly used word abbreviation;
   e) a list of at least one entry containing a phrase and its less commonly used acronym; and
   f) a list of at least one entry containing a sequence of alphabets and its shorter sequence for replacement in a word.

34. The system of claim 24 wherein the abbreviation option means includes at least one of:
   a) an option for prioritized deletion or truncation of a delimited segment in the text;
   b) an option for protection of a delimited segment from abbreviation in the text;
   c) an option for barring predetermined words from abbreviation in the text;
   d) an option for compulsorily replacing a phrase with its commonly used acronym in the text;
   e) an option for compulsorily replacing a word with its commonly used abbreviation in the text;
   f) an option for abbreviating an enumeration word sequence into a sequence containing at least one numeric character in the text;
   g) an option for replacing an ending sequence of alphabets in a word with a shorter sequence;
   h) an option for replacing an intervening sequence of alphabets in a word with a shorter sequence;
   i) an option for replacing a sequence of a contiguously repeating consonant in a word with one such consonant;
   j) an option for deleting a less significant alphabet in a word;
   k) an option for need based replacement of a phrase with its less commonly used acronym in the text;
   l) an option for truncating a word in the text; and
   m) an option for final truncation of the text.

35. The system of claim 24 wherein the abbreviation control parameter means includes at least one of:
   a) a group of one or more punctuations for deletion in the text;
   b) a group of one or more less significant alphabets for deletion in a word;
   c) a group of one or more non-deletable symbols;
   d) a minimum word length limit;
   e) a minimum truncated word length limit;
   f) an abbreviated text length limit;
   g) a separated row output width value; and
   h) a number of separated output rows value.

36. A method for abbreviating text to fit into a display or print space constraint in computer software such that loss of word recognizability is minimized, wherein said text includes a plurality of words, said display or print space constraint comprises a predetermined plural number of rows of predetermined row widths and said method comprises the steps of:
   a) selecting one or more words from the text as being abbreviatable words;
   b) replacing in the text a sequence of words comprising a phrase with its corresponding acronym, if an entry containing the phrase and its corresponding acronym is found in a predetermined list;
   c) after replacing phrases with corresponding acronyms as described in step (b), separating the text into at least two row strings such that the number of said row strings does not exceed the predetermined plural number of rows and each said row string is associated with its corresponding predetermined row width;

d) in any row string, shortening only those abbreviatable words whose length exceeds a predetermined minimum word length limit while the length of said row string is in excess of its corresponding predetermined row width, said shortening comprising at least one of:

(i) replacing a sequence of alphabets in any abbreviatable word with a shorter sequence, wherein said sequence of alphabets does not include the initial of the abbreviatable word; and (ii) deleting one or more alphabets from any abbreviatable word, but excluding from deletion the initial of the abbreviatable word; and e) in any row string, truncating only those abbreviatable words whose length exceeds a predetermined minimum truncated word length limit while the length of said row string is in excess of its corresponding predetermined row width.

37. The method of claim 36 further comprising converting a continuous sequence of at least two enumeration words in the text, of which at least one of the enumeration words is a bundle word, into a shorter sequence using a predetermined list of enumeration words and corresponding abbreviations, wherein said bundle word comprises a single enumeration word which connotes a value greater than hundred and said shorter sequence contains at least four numeric characters.

38. The method of claim 37 further comprising step (a) and at least one of steps (b), (c), and (d):

a) replacing bundle word abbreviations with predetermined corresponding figures, each said corresponding figure comprising either a punctuation character or a sequence of one or more punctuation characters and numeric zero(s);

b) inserting into the sequence of converted figures a numeric one;

c) locating and deleting occurrences of superfluous numeric zero(s), if any, from the sequence of converted figures; and d) inserting into the sequence of converted enumeration words one or more numeric zero(s).

39. The method of claim 36 further comprising truncating any row string finally, starting from the right end, until said row string is reduced to its corresponding predetermined row width or the entire row string is dealt with, but excluding from truncation the initial alphabet of any word and at least one of:

a) any numeric character or decimal point;

b) any character contained in a predetermined set of non-deletable symbols; and c) predetermined protected segments.

40. The method of claim 36 wherein the abbreviatable words on which the abbreviating steps are carried out include partially abbreviated words.

41. The method of claim 36 wherein the length of any word is the number of characters in the word.

42. The method of claim 36 wherein the selecting step includes:

locating sequences of one or more contiguous alphabets preceded by a space, punctuation or beginning of text and followed by a space, punctuation or end of text and recognizing such sequences as words; and locating words containing at least two alphabets and no upper case alphabets other than the first alphabet and classifying such words as abbreviatable words.

43. The method of claim 36 wherein the replacing step comprises at least one of:

replacing a contiguous sequence of alphabets in any abbreviatable word with a shorter sequence of at least one alphabet, if an entry containing said contiguous sequence of alphabets and its corresponding shorter sequence is found in a predetermined list; and replacing a sequence comprising a contiguously repeating consonant in any abbreviatable word with a shorter sequence of only one such consonant.

44. The method of claim 43 wherein the replaced shorter sequence is identified so that said shorter sequence is not further shortened using the shortening step subsequently.

45. The method of claim 36 wherein the deleting step comprises deleting a contiguous sequence of one or more vowels from any abbreviatable word, provided said contiguous sequence is deleted entirely and the length of said abbreviatable word after deleting said contiguous sequence would not become less than the predetermined minimum word length limit.

46. The method of claim 36 wherein the truncating step includes at least one of:

truncating only the truncatable part of every abbreviatable word in an approximately equal proportion such that the row string is reduced to its corresponding predetermined row width, said truncatable part comprising that part of every such word which is in excess of the predetermined minimum truncated word length limit; and truncating abbreviatable words to the predetermined minimum truncated word length limit, starting from the right end of the row string, until the row string is reduced to its corresponding predetermined row width.

47. The method of claim 36 wherein the selecting step includes at least one of:

classifying a word as a non-abbreviatable word, if said word is found in a predetermined list of words barred from abbreviation; and classifying a word as a non-abbreviatable word, if said word is an acronym or a word abbreviation appearing in a predetermined list.

48. The method of claim 36 further comprising dealing with predetermined delimited segments in an exceptional manner, where said dealing includes at least one of:

a) abbreviating only the delimited segment containing an abstract after deleting the rest of the text;

b) protecting the delimited segment from abbreviation;

c) prioritizing deletion of the delimited segment before abbreviating the rest of the text; and d) prioritizing truncation of the delimited segment.

49. The method of claim 36 wherein the separating step (c) further comprises:

ca) in the text which has to be separated into row strings, selecting a word for splitting into two split portions;

cb) shortening the selected word using the shortening step (d) in said claim 36, if the selected word is an abbreviatable word;

cc) splitting the selected word such that each split portion has at least two characters;

cd) separating the text into at least two row strings such that one of the row strings ends with the first split portion and the next row string begins with the second split portion; and cd) identifying each split portion to prevent further shortening.

50. The method of claim 36 wherein the unit of measure for the predetermined row widths and for the length of the row strings is either a monospaced character or a unit of measure suitable for measuring proportionally spaced text.

51. An abbreviated text generated by employing the method in claim 36.

* * * * *